US012500683B2

(12) United States Patent
McCall et al.

(10) Patent No.: US 12,500,683 B2
(45) Date of Patent: Dec. 16, 2025

(54) TECHNOLOGIES TO COMPENSATE FOR ERRORS IN TIME SYNCHRONIZATION DUE TO CLOCK DRIFT

(71) Applicant: Intel Corporation, Santa Clara, CA (US)

(72) Inventors: David McCall, Dallas, TX (US); Kevin Stanton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 831 days.

(21) Appl. No.: 17/561,398

(22) Filed: Dec. 23, 2021

(65) Prior Publication Data

US 2022/0123849 A1 Apr. 21, 2022

Related U.S. Application Data

(60) Provisional application No. 63/277,465, filed on Nov. 9, 2021.

(51) Int. Cl.
*H04J 3/06* (2006.01)
*H04W 56/00* (2009.01)

(52) U.S. Cl.
CPC .......... *H04J 3/0658* (2013.01); *H04J 3/0647* (2013.01); *H04W 56/001* (2013.01)

(58) Field of Classification Search
CPC ...... H04J 3/0658; H04J 3/0647; H04J 3/0667; H04J 3/0682; H04W 56/001; H04W 56/0035; H04L 7/002
See application file for complete search history.

(56) References Cited

U.S. PATENT DOCUMENTS 9,229,897 B2 *  1/2016  Iyer ..................... G06F 13/4291
10,993,101 B2    4/2021  Macieira
(Continued)

FOREIGN PATENT DOCUMENTS

CA     2266836 A1 *  9/1999  ............ H04J 3/0682
CN  105553598 B  *  9/2017
(Continued)

OTHER PUBLICATIONS

PE2E Search English translation of CN 110350996 (Year: 2019).*
(Continued)

*Primary Examiner* — Sujoy K Kundu
*Assistant Examiner* — Vladislav Y Agureyev
(74) *Attorney, Agent, or Firm* — Schwabe, Williamson & Wyatt, P.C.

(57) ABSTRACT

The present disclosure provides techniques for measuring and compensating for clock drift errors in time-aware networks and time-sensitive applications, where a time-aware system (TAS) measures clock drift, and compensates for the measured clock drift, and makes predictions of future clock drift values based on history and other physical measurements. Existing messages used for measuring link delay and/or used for time synchronization can be used for frequency measurement (and thus clock drift measurement), and this measured drift can be applied as a correction factor whenever synchronization is determined and/or used. The predicted clock drift rate can be based on various probability distributions including linear, Kalman filters, and/or others. Other embodiments may be described and/or claimed.

27 Claims, 15 Drawing Sheets

(56) References Cited

U.S. PATENT DOCUMENTS

| | | | | |
|---|---|---|---|---|
| 11,668,834 | B2* | 6/2023 | Reid | B64G 1/1085 |
| | | | | 342/357.395 |
| 11,668,843 | B2* | 6/2023 | Gunning | G01S 19/256 |
| | | | | 701/468 |
| 11,899,120 | B2* | 2/2024 | Grayson | G01S 19/258 |
| 2006/0233291 | A1* | 10/2006 | Garlepp | H04L 7/0276 |
| | | | | 375/355 |
| 2014/0126610 | A1* | 5/2014 | Hui | H04W 56/001 |
| | | | | 375/E1.037 |
| 2015/0341874 | A1* | 11/2015 | Nguyen-Dang | H04W 52/0219 |
| | | | | 370/350 |
| 2016/0262122 | A1* | 9/2016 | Aldana | H04W 24/10 |
| 2016/0359577 | A1* | 12/2016 | Bar Bracha | H04M 3/56 |
| 2016/0359610 | A1* | 12/2016 | Karthik | H04J 3/0664 |
| 2017/0003736 | A1* | 1/2017 | Turon | G06F 1/3296 |
| 2019/0007195 | A1* | 1/2019 | Udovydchenkov | H04L 7/0087 |
| 2021/0399989 | A1* | 12/2021 | Wang | H04L 47/2491 |
| 2023/0053772 | A1* | 2/2023 | Zinner | H04J 3/0667 |
| 2024/0259322 | A1* | 8/2024 | Dalal | G06F 13/1652 |
| 2024/0356687 | A1* | 10/2024 | Speicher | H04W 56/0015 |
| 2024/0388373 | A1* | 11/2024 | Zinner | H04L 43/0852 |

FOREIGN PATENT DOCUMENTS

| | | | | |
|---|---|---|---|---|
| CN | 108449791 | A * | 8/2018 | G04G 3/04 |
| CN | 110350996 | A * | 10/2019 | |
| CN | 111654908 | A * | 9/2020 | |
| EP | 0946003 | A2 * | 9/1990 | H04W 56/009 |
| EP | 3288200 | A1 * | 2/2018 | H04J 3/0667 |
| GB | 2353450 | A * | 2/2001 | H04J 3/0682 |

OTHER PUBLICATIONS

"Errata to IEEE Standard for Local and Metropolitan Area Networks—Time and Synchronization for Time-Sensitive Applications Correction Sheet", IEEE Std 802.1AS-2020, pp. 1-2 (Mar. 19, 2021).

"IEEE Standard for Local and Metropolitan Area Networks—Timing and Synchronization for Time-Sensitive Applications," IEEE Std 802.1AS-2020 (Revision of IEEE Std 802.1AS-2011), pp. 1-421, (Jun. 19, 2020).

Belliardi et al., "Use Cases IEC/IEEE 60802", v1.3, 74 pages (Sep. 13, 2018), https://www.ieee802.org/1/files/public/docs2018/60802-industrial-use-cases-0918-v13.pdf.

Mccall et al., "The 60802 challenge of meeting time accuracy goals across long daisy-chains using 802.1AS™-2020 An analysis and a proposed path forward", IEEE 802.1 TSN / 60802 Interim, version 1, 110 pages (Sep. 20, 2021).

Mccall et al., "The 60802 challenge of meeting time accuracy goals across long daisy-chains using 802.1AS™-2020 An analysis and a proposed path forward" IEEE 802.1 TSN / 60802 Interim, version 2, 123 pages (Sep. 24, 2021).

Mccall et al., "The 60802 challenge of meeting time accuracy goals across long daisy-chains using 802.1AS™-2020 An analysis and a proposed path forward", IEEE 802.1 TSN / 60802 Interim, version 3, 123 pages (Sep. 24, 2021).

Mccall et al., "60802 Dynamic Time Sync Error—Error Model & Monte Carlo Method Analysis", IEEE 802.1 TSN / 60802 Plenary, version 1, 95 pages (Nov. 10, 2021).

David Mccall et al., "60802 Dynamic Time Sync Error—Error Model & Monte Carlo Method Analysis", IEEE 802.1 TSN / 60802 Plenary, version 2, 124 pages (Nov. 15, 2021).

Gunter Steindl, "IEC/IEEE 60802—IA profile, An example of timeliness use case to be covered by IEEE 802.1AS-Rev", IEC/IEEE 60802, 10 pages (2018), http://www.ieee802.org/1/files/public/docs2018/60802-Steindl-TimelinessUseCases-0718-v01.pdf.

Ying Zhang, "Revisiting Time, Clocks, and Synchronization", arXiv:2106.16140v1 [cs.NI], 7 pages (May 20, 2021).

Maciej Lipinski et al., "White Rabbit: a PTP Application for Robust Sub-nanosecond Synchronization", IEEE International Symposium on Precision Clock Synchronization for Measurement, Control and Communication, pp. 25-30 (Sep. 12, 2011), https://white-rabbit.web.cern.ch/documents/White_Rabbit-a_PTP_application_for_robust_sub-nanosecond_synchronization.pdf.

"PROFINET over TSN Guideline", PROFIBUS Nutzerorganisation e.V., version 1.31, Order No. 7.252, 46 pages (Jul. 2021).

Dreher et al., "Precision Clock Synchronization—The Standard IEEE 1588", Hirschmann Automation and Control GmbH, Neckartenzlingen, Germany, Tech. Rep., Rev 1.2., 20 pages (accessed Nov. 2021), https://www.industrialnetworking.com/pdf/Hirschmann_IEEE_1588.pdf.

"Compute Express Link™ (CXL™) Specification", Revision 2.0, version 1.0, 628 pages (Oct. 26, 2020).

"IEEE Standard for Local and metropolitan area networks Virtual Bridged Local Area Networks", IEEE Std 802.1Q™-2005, 303 pages (May 19, 2006).

Dave Cavalcanit et al., "Wireless TSN—Definitions, Use Cases & Standards Roadmap", Avnu Alliance® White Paper, version 1, 16 pages (Mar. 4, 2020), https://avnu.org/wp-content/uploads/2014/05/Avnu-WirelessTSN-white-paper-V1.0_Final.pdf.

Kevin B. Stanton, "Tutorial: The Time-Synchronization Standard from the AVB/TSN suite IEEE Std 802.1AS™-2011", IEEE Plenary, San Diego, CA, 45 pages (Jul. 2014), https://www.ieee802.org/1/files/public/docs2014/as-kbstanton-8021AS-tutorial-0714-v01.pdf.

Kevin B. Stanton, "802.1AS Tutorial", 802.1 AVB TG / Nov. 2008 Plenary, 42 pages (Nov. 13, 2008), https://www.ieee802.org/1/files/public/docs2008/as-kbstanton-8021AS-overview-for-dot11aa-1108.pdf.

Extended European Search Report issued Mar. 27, 2023 for EP Application No. 22201174.4, 12 pages.

Pahlevan Maryam et al: "Simulation Framework for Clock Synchronization in Time Sensitive Networking", 2019 IEEE 22nd International Symposium on Real-Time Distributed Computing (ISORC), IEEE, May 7, 2019 (May 7, 2019), 8 pages.

Striffler Tobias et al: "The 5G Transparent Clock: Synchronization Errors in Integrated 5G-TSN Industrial Networks", 2021 IEEE 19th International Conference on Industrial Informatics (INDIN), IEEE, Jul. 21, 2021 (Jul. 21, 2021), 6 pages.

Geoffrey M Garner et al: "Synchronization of Audio/Video Bridging Networks Using IEEE 802.1 AS", IEEE Communications Magazine, IEEE Service Center, Piscataway, US, vol. 49, No. 2, Feb. 1, 2011 (Jul. 21, 2021), 8 pages.

Baniabdelghany Haytham et al: "Extended Synchronization Protocol Based on IEEE802.1 AS for Improved Precision in Dynamic and Asymmetric TSN Hybrid Networks", 2020 9th Mediterranean Conference on Embedded Computing (MEGO), IEEE, Jun. 8, 2020 (Jun. 8, 2020), 8 pages.

\* cited by examiner

| Bits | | | | | | | | | Octets | Offset |
|---|---|---|---|---|---|---|---|---|---|---|
| 0 | 1 | 2 | 3 | 4 | 5 | 6 | 7 | | | |
| messageType 1102 | | | | majorSdoId 1101 | | | | 1 | 0 |
| versionPTP 1104 | | | | minorVersionPTP 1103 | | | | 1 | 1 |
| messageLength 1105 | | | | | | | | 2 | 2 |
| domainNumber 1106 | | | | | | | | 1 | 3 |
| minorSdoId 1107 | | | | | | | | 1 | 4 |
| flags 1108 | | | | | | | | 2 | 5 |
| correctionField 1109 | | | | | | | | 8 | 8 |
| messageTypeSpecific 1110 | | | | | | | | 4 | 16 |
| sourcePortIdentity 1111 | | | | | | | | 10 | 20 |
| sequenceId 1112 | | | | | | | | 2 | 30 |
| controlField 1113 | | | | | | | | 1 | 32 |
| logMessageInterval 1114 | | | | | | | | 1 | 33 |

| Bits 7 6 5 4 3 2 1 0 | Octets | Offset |
|---|---|---|
| Destination Address 1201 | 6 | 0 |
| Source Address 1202 | 6 | 6 |
| Length/Type 1203 | 2 | 12 |
| Subtype 1204 | 1 | 14 |
| OUI or CID 1205 | 3 | 15 |
| Message Identifier 1206 | 2 | 18 |
| X 1207 | 4 | 20 |
| ToDo$_{X,i}$ 1208 | 10 | 24 |
| sourcePortIdentity 1209 | 10 | 34 |
| logMessageInterval 1210 | 1 | 44 |
| rateRatio 1211 | 8 | 45 |
| gmTimeBaseIndicator 1212 | 2 | 53 |
| lastGmPhaseChange 1213 | 12 | 55 |
| scaledLastGmFreqChange 1214 | 4 | 67 |
| domainNumber 1215 | 1 | 71 |
| majorSdoId 1216 (h01) \| reserved 1217-1 | 1 | 72 |
| minorSdoId 1218 (h07) | 1 | 73 |
| reserved 1217-2 | 0 | 74 |
| FCS 1219 | 4 | |

Figure 12

TECHNOLOGIES TO COMPENSATE FOR ERRORS IN TIME SYNCHRONIZATION DUE TO CLOCK DRIFT

RELATED APPLICATIONS

The present disclosure claims priority to U.S. Provisional App. No. 63/277,465 filed on Nov. 9, 2021, the contents of which is hereby incorporated by reference in its entirety.

TECHNICAL FIELD

The present disclosure is generally related to data processing, service management, resource allocation, compute management, network communication, application partitioning, network topologies and engineering, edge computing frameworks, time-aware networks, timing and synchronization for time-sensitive application, and communication system implementations, and in particular, to techniques for measuring and compensating for clock drift errors in time-aware networks and time-sensitive applications.

BACKGROUND

Precise time information may be important for distributed systems such as those that rely on automation technologies. Institute of Electrical and Electronics Engineers (IEEE) "Standard for a Precision Clock Synchronization Protocol for Networked Measurement and Control Systems", IEEE Std 1588-2019 (16 Jun. 2020) ("[IEEE1588]"), the contents of which are hereby incorporated by reference in its entirety, describes the Precision Time Protocol (PTP). PTP provides precise synchronization of clocks in packet-based networked systems. Synchronization of clocks can be achieved in heterogeneous systems that include clocks of different inherent precision, resolution, and stability.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 11 depicts an example PTP message header.

FIG. 12 depicts an example time sync message format.

DETAILED DESCRIPTION

Figure 1:
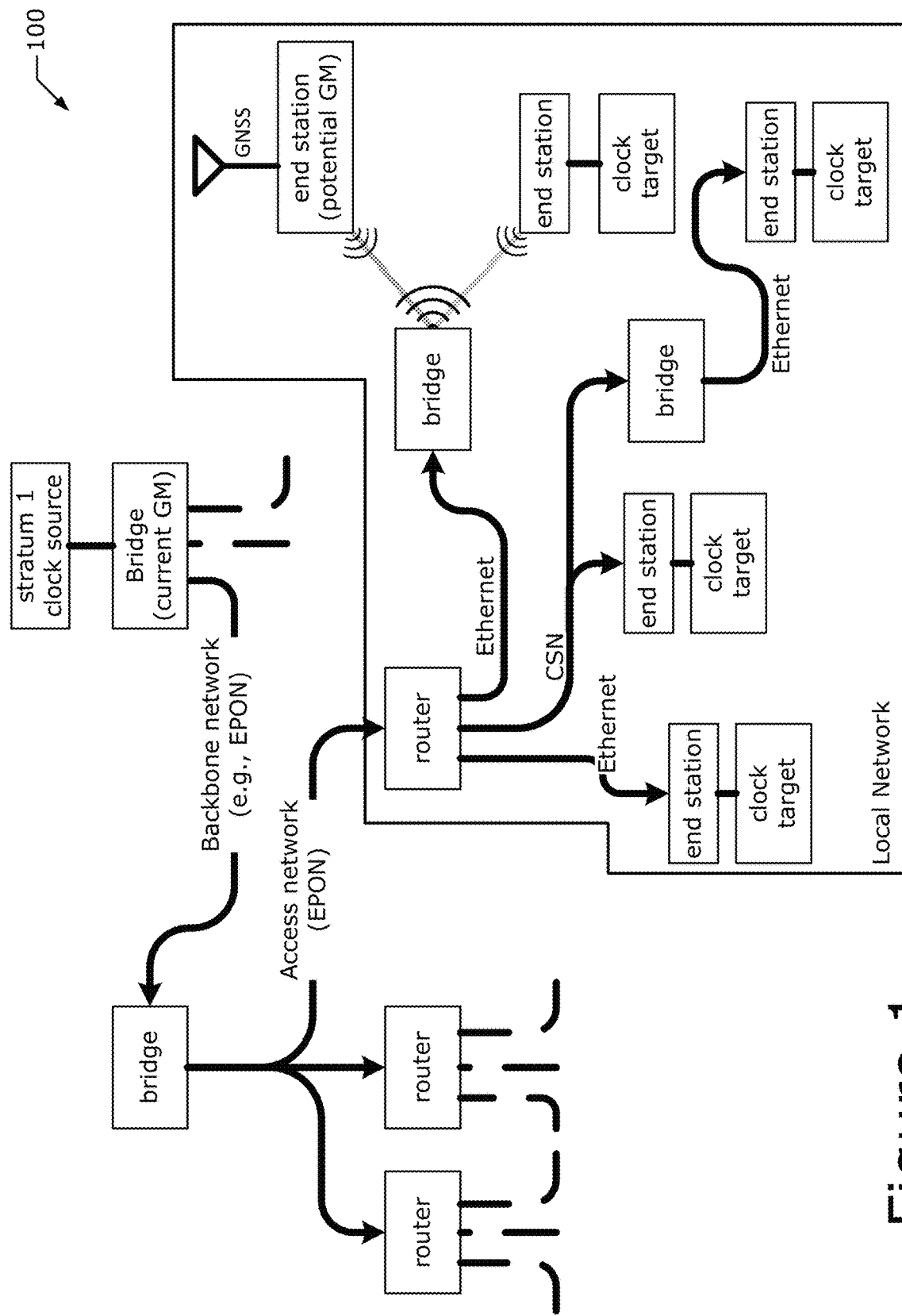
FIG. 1 depicts an example time-aware network.

The following embodiments generally relate to data processing, service management, resource allocation, compute management, network communication, application partitioning, network topologies and engineering, edge computing frameworks, time-aware networks, timing and synchronization for time-sensitive application, and communication system implementations, and in particular, to techniques for measuring and compensating for time-aware networks and time-sensitive applications.

The IEEE standard for Timing and Synchronization for Time-Sensitive Applications, IEEE Std 802.1AS™-2020 (19 Jun. 2020) ("[IEEE802.1AS]"), the contents of which is hereby incorporated by reference in its entirety, specifies protocols, procedures, and managed objects used to ensure that the synchronization requirements are met for time-sensitive applications, such as audio, video, and time-sensitive control, across networks, for example, IEEE 802 and similar media. This includes the maintenance of synchronized time during normal operation and following addition, removal, or failure of network components and network reconfiguration. It specifies the use of [IEEE1588] where applicable in the context of IEEE Std 802.1Q™-2018.1 Synchronization to an externally provided timing signal (e.g., a recognized timing standard such as Coordinated Universal Time (UTC) or International Atomic Time (TAI) timescales).

[IEEE802.1AS] enables systems to meet respective jitter, wander, and time-synchronization requirements for time-sensitive applications, including those that involve multiple streams delivered to multiple end stations. To facilitate the widespread use of packet networks for these applications, synchronization information is one of the components needed at each network element where time-sensitive application data are mapped or de-mapped or a time-sensitive function is performed.

Time synchronization in [IEEE802.1AS] is accomplished by sending a sync message successively from a device with a grandmaster (GM) clock across a network of devices to an end station. The link delay between devices and queuing delay (residence time) within each device (e.g., between a receiver (Rx) from the upstream device and transmitter (Tx) to the downstream device) is measured and communicated so the end station knows, at the point the Sync message arrives: when the GM sent the message, the amount of time that passed since the GM sent the message, and the ratio of its local clock speed to the GM's clock speed.

One source of error is clock drift, which at least in some embodiments refers to phenomena where a clock does not run at exactly the same rate as another clock such as, for example, a reference clock or a clock of a synchronization source. That is, after some time the clock "drifts apart" or gradually desynchronizes from the other clock. Unless resynchronized, clock drift leads to eventual divergence. The drift of crystal-based clocks, which are usually used in computers, requires some synchronization mechanism for any high-speed communication.

In time-aware systems, by the time the Sync message arrives at the end station, the GM's clock may no longer be running at the same speed as when the Sync message was sent. Worse, the ratio between a local clock and its neighbor's clock (referred to as a Neighbor Rate Ratio (NRR)) is part of measuring link delay, and the ratio of the local clock and the GM (referred to as the Rate Ratio (RR)) is part of how residence time is calculated. Similar drift rate errors (sourced errors) are introduced into link delay and residence time measurements, which accumulate down the chain 300. These errors can have an appreciable impact on clock accuracy at the end station 301$_N$, especially over long device chains 300.

Various techniques to correct for the aforementioned errors have been employed. A first technique involves using more accurate clocks (e.g., temperature compensated crystal oscillators (TCXOs) rather than quartz crystal oscillators (XO)). Although TCXOs can be more accurate than regular XOs, the TCXOs tend to me more expensive than regular XOs.

A second technique involves using more frequent sync messages or pDelay messages, which are part of measuring NRR. However, sending sync messages more frequently increases the network resource consumption. For example, increasing the number of such messages increases the amount of management traffic, which "steals" bandwidth from applications and burdens networking equipment. Furthermore, sending PTP messages at relatively high rates when there is otherwise little or no traffic conflicts with the goal of reducing energy consumption (see section 7.3.5 of [IEEE802.1AS]).

A third technique involves using tighter limits on residence time. However, lower residence time can require specific hardware acceleration. Additionally, one-step sync messaging further lowers residence time, but requires additional specific hardware and also makes certain of security techniques impossible.

A fourth technique involves using Synchronous Ethernet (SyncE). However, SyncE requires additional hardware expense and limits dynamics within the network topology.

In the present disclosure, clock drift is measured and compensated for, and predictions of future clock drift values are also determined based on history and other locally-known physical measurements. Existing pDelay messages, used to measure link delay, can be used for frequency measurement and this measured drift can be applied as a correction factor whenever NRR and/or RR is used. Because the drift rate changes slowly over the periods of interest, and is a function of local system temperature, among other things, clock speed can be assumed to change according to a particular function. In some implementations, the function may be a linear function. In other implementations, more advanced prediction models can be used, such as, for example, Kalman filters and/or any suitable probability distribution, such as those discussed herein. Additionally or alternatively, different time approximations or time steps may be used to deal with non-linear error predictions. The predictions are then used to eliminate all or almost all clock drift errors. In these ways, the embodiments herein provide superior time sync performance with current hardware, relatively low levels of network management traffic, and low cost XOs. As such, the error measurement and compensation techniques discussed herein are superior to existing solutions discussed previously.

1. Timing and Synchronization Aspects 1.1. Time-Aware Network Architecture

FIG. 1 illustrates an example time-aware network (TAN) 100, which includes a single gPTP domain. The TAN 100 includes a number of interconnected time-aware systems (TASs) that support one or more timing standards such as generalized PTP (gPTP), International Atomic Time (TAI), coordinated universal time (UTC), and/or the like. These TASs can be any networking device, including, for example, bridges, routers, and end stations. A set of TASs that are interconnected by gPTP capable network elements is referred to as a gPTP network.

Each instance of gPTP that a TAS supports is in at least one gPTP domain, and the instances of gPTP are said to be part of that gPTP domain. A gPTP domain (also referred to as a "TSN domain" or simply "domain") includes one or more PTP instances and links that meet the requirements of this standard and communicate with each other as defined by the [IEEE802.TAS]. A gPTP domain defines the scope of gPTP message communication, state, operations, data sets, and timescale. Other aspects of gPTP domains are discussed in clause 8 of [IEEE802.1AS]. A TAS can support, and be part of, more than one gPTP domain. The entity of a single TAS that executes gPTP in one gPTP domain is referred to as a PTP instance. A TAS can contain multiple PTP instances, which are each associated with a different gPTP domain.

Additionally or alternatively, a TSN domain is defined as a quantity of commonly managed industrial automation devices. Here, a TSN domain comprises a set of devices, their ports, and the attached individual LANs that transmit Time-Sensitive Streams using TSN standards, which include, for example, Transmission Selection Algorithms, Preemption, Time Synchronization and Enhancements for Scheduled Traffic and that share a common management mechanism. The grouping of devices into a TSN domain may be based on administrative decision, implementation, and/or use cases involved.

There are two types of PTP instances including PTP end instances (or simply "end instances" or "end nodes") and PTP relay instances (or simply "relay instances" or "relay nodes"). An end instance, if not a PTP GM instance (or simply "GM instance"), is a recipient of time information. A relay instance, if not a GM instance, receives time information from the GM instance, applies corrections to compensate for delays in the local area network (LAN) and the relay instance itself, and retransmits the corrected information. The relay instances can receive the time information directly from a GM instance, or indirectly through one or more other relay instances. Delay can be measured using standard-based procedures and/or mechanisms such as, for example, IEEE 802.3 Ethernet using full-duplex point-to-point links, IEEE 802.3™ Ethernet Passive Optical Network (EPON) links (see e.g., "IEEE 802.3-2018—IEEE Standard for Ethernet", IEEE 802.3 WG—Ethernet Working Group (32 Aug. 2018) ("[IEEE802.3]")), IEEE 802.11 wireless, generic coordinated shared networks (CSNs), for example, MoCA, G.hn, delay measurement mechanisms discussed in [IEEE1588] and/or [IEEE802.1AS], "IEEE 802.1BA-2011—IEEE Standard for Local and metropolitan area networks—Audio Video Bridging (AVB) Systems", 802.1 WG—Higher Layer LAN Protocols Working Group (30 Sep. 2011), the White Rabbit (WR) link delay model (see e.g., Lipinski et al., "White Rabbit: a PTP Application for Robust Sub-nanosecond Synchronization", IEEE International Symposium on Precision Clock Synchronization for Measurement, Control and Communication (ISPCS), pgs 25-30 (12 Sep. 2011), the contents of which are hereby incorporated by reference in their entirety), and/or using any other suitable mechanism, such as those discussed herein.

In some examples, the TAN 100 may be part of, or used in various use cases such as any of the example use cases discussed herein and/or those discussed in Belliardi et al., "Use Cases IEC/IEEE 60802" version (V) 1.3 (13 Sep. 2018), the contents of which is hereby incorporated by reference in its entirety. The TAN 100 uses some or all of the aforementioned above network technologies, where end stations on several local networks are connected to a GM instance on a backbone network via an EPON access network. In the TAN 100, the bridges and routers are examples of TASs that each contain a relay instance, and the end stations are time-aware systems that contain at least one PTP end instance.

Any PTP instance with clock sourcing capabilities can be a potential GM instance, and a selection method (e.g., the best master clock algorithm (BMCA)) ensures that all of the PTP instances in a gPTP domain use the same GM instance. Additionally or alternatively, a steady state GM selection strategy may be used where GM-capable stations advertise their GM-capabilities via announce messages. When a subject GM-capable station obtains an announce message from another GM-capable station with a "better" clock entity, the subject GM-capable station does not send it's an announce message. There may be a settable priority field in the announce message that can override clock quality, and GM-capable station determine the "better" clock entity using a bitwise compare or some other suitable mechanism. Additionally, a suitable tie breaking method can be used where two GM-capable stations have the same priority (e.g., a MAC address-based tie breaker algorithm and/or the like). Bridges (and/or routers) drop all inferior announce messages, and forward only the best (e.g., highest priority) announce messages to other PTP instances. A remaining GM-capable station (i.e., a GM-capable station whose announce message is not dropped) is considered to be the GM instance for the TAN 100. The GM instance is the root of the [IEEE802.1AS] timing tree, and sends a current time (e.g., in time sync messages) for synchronizing the various nodes/instances in the TAN 100. The GM instance may send the current time on a periodic basis and/or in response to some detected event (or trigger condition). Bridges (and/or routers) in the timing tree propagate timing messages toward the leaves of the timing tree (e.g., other PTP instances/nodes in the TAN 100) taking queuing delay into account (referred to as "residence time"). Additional aspects of GM selection, synchronization, and/or other like timing aspects are discussed in [IEEE802.1AS], [IEEE1588], and Stanton, "Tutorial: The Time-Synchronization Standard from the AVB/ TSN suite IEEE Std 802.11AS™-2011 (and following)", IEEE Plenary San Diego Calif., July 2014 (July 2014), the contents of which is hereby incorporated by reference in its entirety.

In some implementations, there can be short periods during network reconfiguration when more than one GM instance might be active while the BMCA process is taking place. BMCA may be the same or similar to that used in [IEEE1588], but can be somewhat simplified in some implementations. In FIG. 1, the BMCA process has resulted in the GM instance being on the network backbone. If, however, the access network fails, the systems on a local network automatically switch over to one of the potential GM instances on the local network that is as least as "good" as any other. For example, when an access network link fails, and a potential GM instance that has a GNSS reference source has become the active GM instance, then two gPTP domains may exist where there used to be one.

When the TAN 100 includes multiple gPTP domains that could be used, some of the gPTP domains may use the PTP timescale and one or more other domains may use another timescale such as the arbitrary (ARB) timescale. Additionally or alternatively, some or all PTP instances belonging to the same domain may have direct connections among them in their physical topology (e.g., time cannot be transported from one PTP instance in a first domain to another PTP instance that same domain via a TAS that does not have that domain active). As in the single-domain case, any of the network technologies discussed herein can be used. The GM instance of each domain is selected by BMCA where a separate, independent BMCA instance is invoked in each domain.

The timescale for a gPTP domain is established by the GM clock. There are two types of timescales supported by gPTP including a timescale PTP and a timescale arbitrary (ARB). For timescale PTP, the epoch is the PTP epoch (see e.g., 8.2.2 in [IEEE802.1AS]), and the timescale is continuous. The unit of measure of time is the second defined by International Atomic Time (TAI). For timescale ARB, the epoch is the domain startup time and can be set by an administrative procedure. Between invocations of the administrative procedure, the timescale is continuous. Additional invocations of the administrative procedure can introduce discontinuities in the overall timescale. The unit of measure of time is determined by the GM Clock. The second used in the operation of the protocol can differ from the SI second. The "epoch" at least in some embodiments refers to the origin of the timescale of a gPTP domain. The PTP epoch (epoch of the timescale PTP) is 1 Jan. 1970 00:00:00 TAI. See Annex C of [IEEE802.1AS]) for information on converting between common timescales.

The communications in the TAN 100 occur via PTP messages and/or media-specific messages. The PTP messages may be any suitable datagram or protocol data unit (PDU). These messages may have the following attributes: message class and message type. The message type attribute indicates a type or name of a particular message such as "sync", "announce", "time measurement frame", and/or the like (see e.g., section 3.18 of [IEEE802.1AS]). Some messages have additional attributes; these are defined in the subclauses where the respective messages are defined.

There are two message classes, the event message class and the general message class. General messages are not timestamped whereas event messages are timestamped on egress from a PTP instance and ingress to a PTP instance. The timestamp is the time, relative to the LocalClock entity (see e.g., LocalClock entity 215 of FIG. 2 and section 10.1 in [IEEE802.1AS]) at which the message timestamp point passes the reference plane marking the boundary between the PTP instance and the network media. The definition of the timestamp measurement plane (see e.g., section 3.33 of [IEEE802.1AS]), along with the corrections defined as follows, allows transmission delays to be measured in such a way (at such a low layer) that they appear fixed and symmetrical to gPTP even though the MAC client might otherwise observe substantial asymmetry and transmission variation. For example, the timestamp measurement plane is located below any retransmission and queuing performed by the MAC.

Additionally, the PTP instances in a gPTP domain interface with the network media via physical ports. gPTP defines a logical port (e.g., a PTP port) in such a way that communication between PTP instances is point-to-point even over physical ports that are attached to shared media. One logical port, consisting of one PortSync entity and one media-dependent (MD) entity, is instantiated for each PTP instance with which the PTP instance communicates. For shared media, multiple logical ports can be associated with a single physical port. Additional aspects of the PTP ports are discussed in section 8.5 of [IEEE802.1AS].

Although the TAN 100 is described as being implemented according to gPTP, the embodiments discussed herein are also applicable to PTP implementations. In gPTP there are only two types of PTP instances: PTP end instances and relay instances, while [IEEE1588] has Ordinary Clocks, Boundary Clocks, end-to-end Transparent Clocks, and P2P Transparent Clocks. A PTP end instance corresponds to an Ordinary Clock in [IEEE1588], and a relay instance is a type of [IEEE1588] Boundary Clock where its operation is very tightly defined, so much so that a relay instance with Ethernet ports can be shown to be mathematically equivalent to a P2P Transparent Clock in terms of how synchronization is performed, as shown in section 11.1.3 of [IEEE802.1AS]. In addition, a relay instance can operate in a mode (e.g., the mode where the variable syncLocked is TRUE; see e.g., section 10.2.5.15 of [IEEE802.1AS]) where the relay instance is equivalent to a P2P Transparent Clock in terms of when time-synchronization messages are sent. A TAS measures link delay and residence time and communicates these in a correction field. In summary, a relay instance conforms to the specifications for a Boundary Clock in [IEEE1588]-based systems, but a relay instance does not conform to the complete specifications for a P2P Transparent Clock in [IEEE1588] because: 1) when syncLocked is FALSE, the relay instance sends Sync according to the specifications for a Boundary Clock, and 2) the relay instance invokes the BMCA and has PTP port states. Furthermore, gPTP communications between PTP instances is done using IEEE 802 MAC PDUs and addressing, while [IEEE1588] supports various layer 2 and layer 3-4 communication methods.

1.2. PTP Instance Architecture

Figure 2:
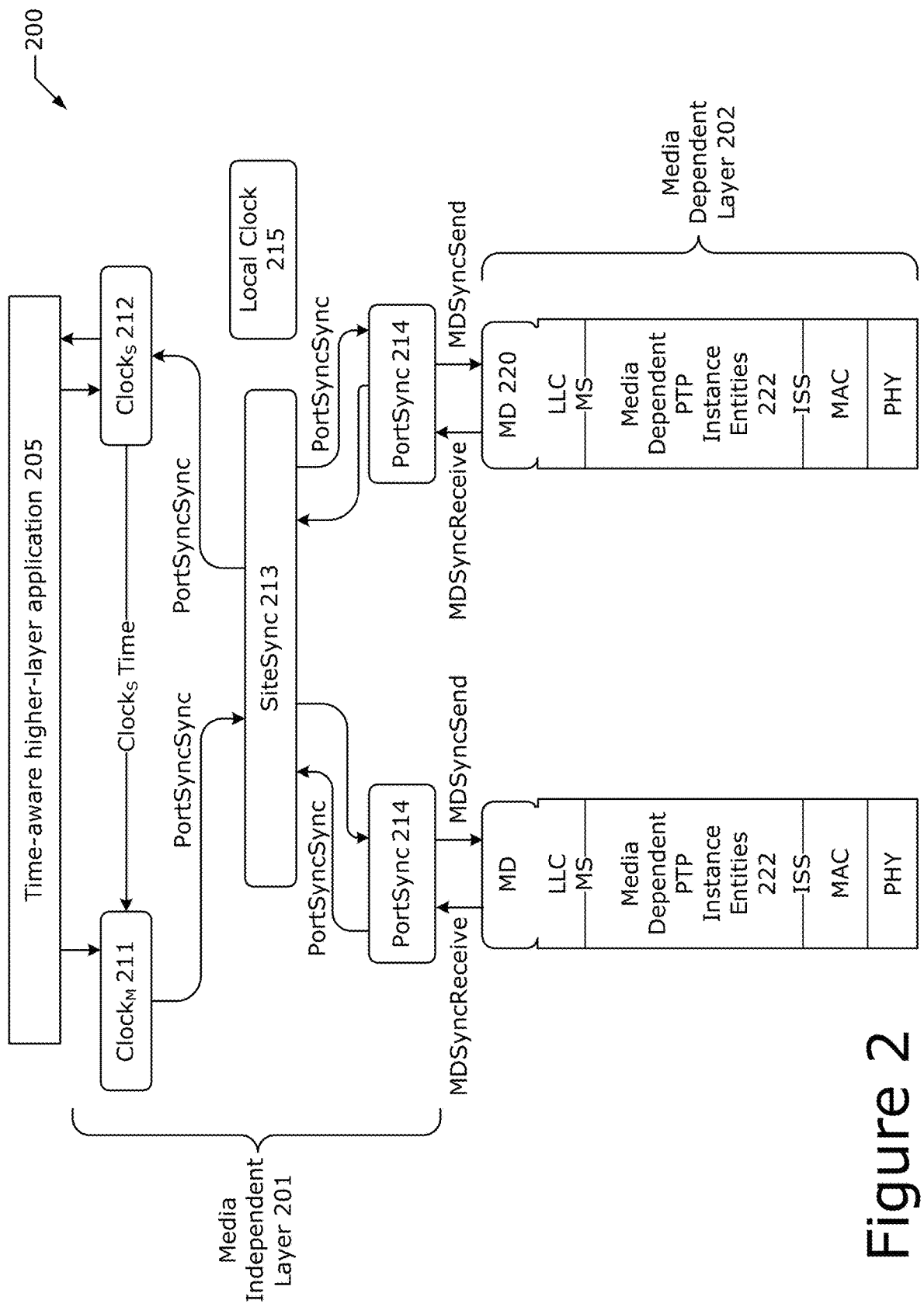
FIG. 2 depicts an example PTP instance model.

FIG. 2 depicts an example PTP instance model 200. The PTP instance model 200 includes a time-aware higher-layer application 205, a media independent layer 201 and one or more media dependent entities 222 within a media dependent layer 202. The time-aware higher-layer application (app) 205 is a time-sensitive application and/or any application that utilizes the time-aware aspects of a time-aware network (e.g., TAN 100) or the like. Examples of such apps 205 include audio, video, time-sensitive control apps, network apps, network functions, and/or other like apps.

If the PTP instance includes app(s) 205 that either use or source time information, then they interface with the gPTP information using the application interfaces specified in clause 9 of [IEEE802.1AS]. These interfaces include a ClockSourceTime interface, which provides external timing to the PTP instance, a ClockTargetEventCapture interface, which returns the synchronized time of an event signaled by a ClockTarget entity, a ClockTargetTriggerGenerate interface, which causes an event to be signaled at a synchronized time specified by a ClockTarget entity, a ClockTargetClockGenerator interface, which causes a periodic sequence of results to be generated, with a phase and rate specified by a ClockTarget entity, and a ClockTargetPhaseDiscontinuity interface, which supplies information that an application can use to determine if a discontinuity in GM Clock phase or frequency has occurred.

The single media-independent part 201 includes a main clock (ClockM) 211 (sometimes referred to as a "ClockMaster"), a secondary clock (Clocks) 211 (sometimes referred to as a "ClockSlave"), and SiteSync logical entities 213, one or more PortSync entities 214, and a LocalClock entity 215. The BMCA and forwarding of time information between logical ports and the and ClockM 211 is done by the SiteSync entity 213, while the computation of PTP port-specific delays needed for time-synchronization correction is done by the PortSync entities 214.

The PTP Instance has a LocalClock entity (e.g., ClockM and/or Clocks), which can be a free-running clock circuitry (e.g., a quartz crystal) that meets the requirements of [IEEE802.3], but could also be better than those requirements. There can be a ClockSource entity (e.g., timing taken from positioning circuitry 1675 of FIG. 16), available in the local system that provides timing to the ClockSource entity. The time provided by the PTP instance, if it is the GM PTP instance, is reflected by the combination of these two entities, and the clockClass reflects this combination as specified in section 7.6.2.5 of [IEEE1588]. The clockClass attribute denotes the traceability of the synchronized time distributed by a ClockMaster when it is the GM PTP instance. For example, when the LocalClock entity uses a quartz oscillator that meets the requirements of IEEE Std 802.3-2018 and B.1 of this standard, clockClass is set to 248. But, if a GNSS receiver is present and synchronizes the PTP Instance, then the clockClass is set to the value 6, indicating traceability to a primary reference time source (see 7.6.2.5 of IEEE Std 1588-2019).

The media dependent layer 202 includes a protocol stack including media-dependent (MD) ports 220 disposed on a logical link control (LLC) layer, which is separated from the one or more media dependent entities 222 by a MAC Service (MS). The media dependent entities 222 is connected to a media access control (MAC) layer by an Internal Sublayer Service (ISS), and the MAC layer is disposed on a physical (PNY) layer. MD ports 220, which translate the abstract "MDSyncSend" and "MDSyncReceive" structures/signals received from or sent to the media-independent layer and corresponding methods used for the particular LAN attached to the port.

For full-duplex Ethernet ports, [IEEE1588] Sync and Follow_Up (or just Sync if the optional one-step processing is enabled) messages are used, with an additional TLV in the Follow_Up (or the Sync if the optional one-step processing is enabled) used for communication of the RR and information on phase and frequency change when there is a change in GM instance. The path delay (pDelay) is measured using the two-step [IEEE1588] P2P delay mechanism. This is defined in Clause 11 of [IEEE802.1AS].

For [IEEE80211] ports, timing information is communicated using the MAC Layer Management Entity to request a "Timing Measurement" or "Fine Timing Measurement" (as defined in [IEEE80211]), which also sends everything that would be included in the Follow_up message for full-duplex Ethernet. The Timing Measurement or Fine Timing Measurement result includes all the information to determine the path delay. This is defined in Clause 12 of [IEEE802.1AS].

For EPON, timing information is communicated using a "slow protocol" as defined in Clause 13 of [IEEE802.1AS]. CSNs use the same communication system used by full-duplex Ethernet, as defined in Clause 16 of [IEEE802.TAS].

1.3. Time Synchronization

Time synchronization in gPTP is done in a same or similar manner as in [IEEE1588]. Here, a GM instance sends information including the current synchronized time to all directly attached PTP instances. Each of these PTP instances correct the received synchronized time by adding the propagation time needed for the information to transit the gPTP communication path from the GM instance. If the PTP instance is a relay instance, then it forwards the corrected time information (including additional corrections for delays in the forwarding process) to all the other attached PTP instances. To make this all work, there are two time intervals that are determined: the forwarding delay (referred to as the "residence time"), and the time taken for the synchronized time information to transit the gPTP communication path between two PTP instances. The residence time measurement is local to a relay instance and easy to compute, while the gPTP communication path delay is dependent on many things including media-dependent properties and the length of the path.

Figure 3:
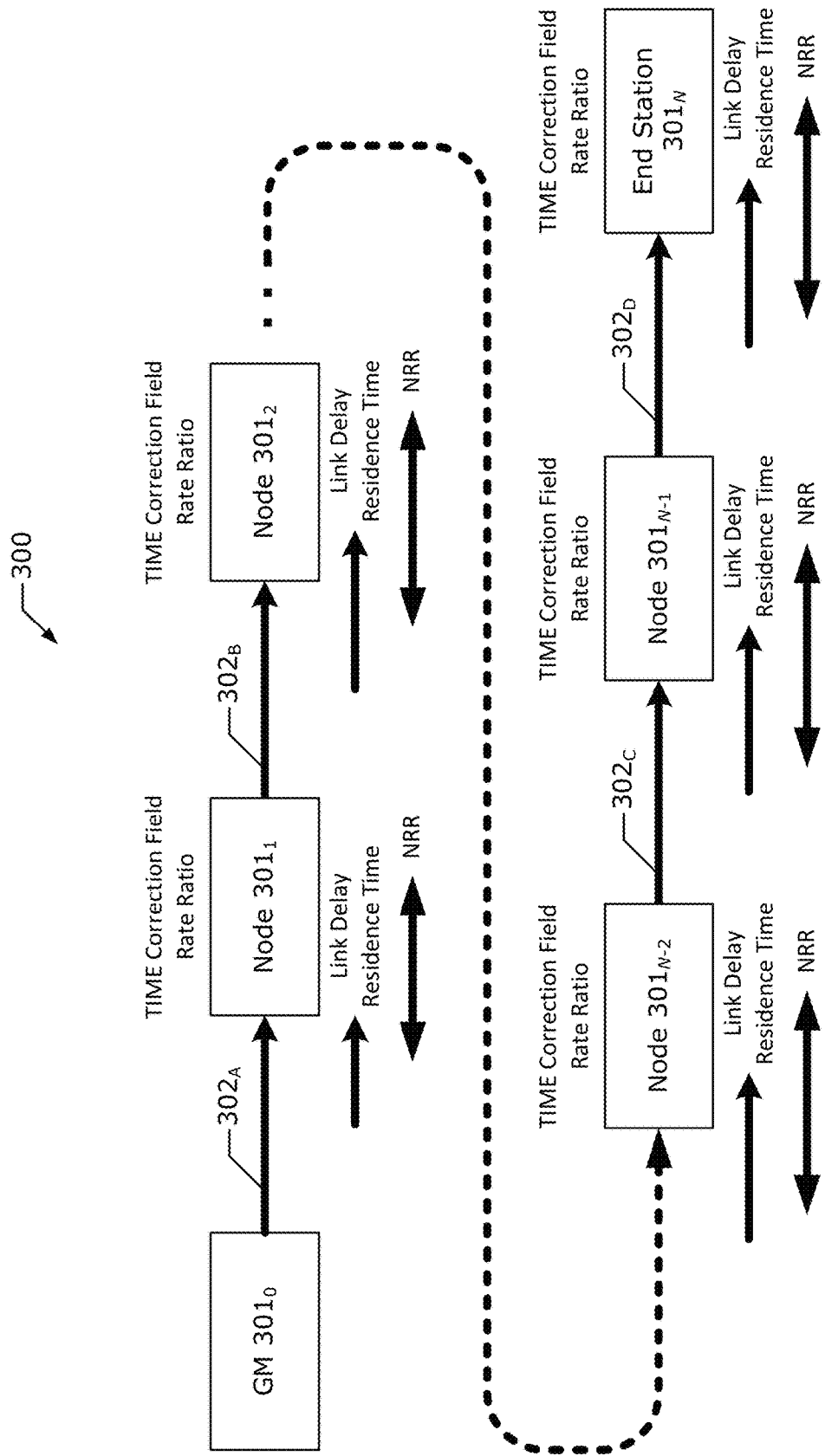
FIG. 3 depicts an example compute node chain according to various embodiments.

FIG. 3 shows an example node chain 300 according to various embodiments. The node chain 300 may be a time-aware network (e.g., the same or similar to TAN 100 of FIG. 1), a time-sensitive network (TSN), and/or the like. The node chain 300 includes a set of nodes $301_{0-N}$ (collectively referred to as "nodes 301", "stations 301", or "TAS 301"), which in this example includes 0 to N nodes 301 where N is a number. In some examples N is a number between 64 and 100 where the chain 300 includes one or two end stations 301 and 63 to 99 intermediary/relay nodes 301. As examples, each node 301 may be one of a control panel, a robot, a drone, a bridge, a programmable logic controller (PLC), a light fence, a router, a motion controller, an autonomous or non-autonomous sensor, an IoT device, a work station, a client device, a base station, an access point, a specific type of manufacturing and/or factory machine, a hardware accelerator, and/or any other type of device such as those discussed herein.

Each node 301 in the set of nodes 301 is communicatively coupled with at least one other node 301 in the set of compute nodes 301 via a connection (link) 302 (labeled $302_A$ to $302_D$ in FIG. 3 for the sake of clarity). The connections 302 between some nodes 301 may be the same or different than the connections 302 between other nodes 301 in the node chain 300. For example, connection $302_A$ may be a connection using a first network access technology (where node (GM) $301_0$ and node $301_1$ have corresponding interfaces for the first network access technology) and connection $302_B$ may be a connection using a second network access technology (where node $301_1$ and node $301_2$ have corresponding interfaces for the second network access technology), where the first network access technology is different than the second network access technology. In some implementations, each node 301 has at least two ports including a first port for ingress traffic (e.g., traffic entering or being received by the node 301) and a second port for egress traffic (e.g., traffic leaving or being sent by the node 301). The ports (or interfaces) may be Ethernet ports and/or any other type of communication interface such as those discussed herein. The examples discussed herein involve the use of Ethernet for the connections 302 where each node 301 includes at least two Ethernet ports, however, it should be understood that one or more other types of communication technologies (and ports/interfaces) may be used in various implementations. In some implementations, the set of nodes 301 can be connected to one another in a daisy chain topology. Other topologies are possible in other implementations.

Figure 16:
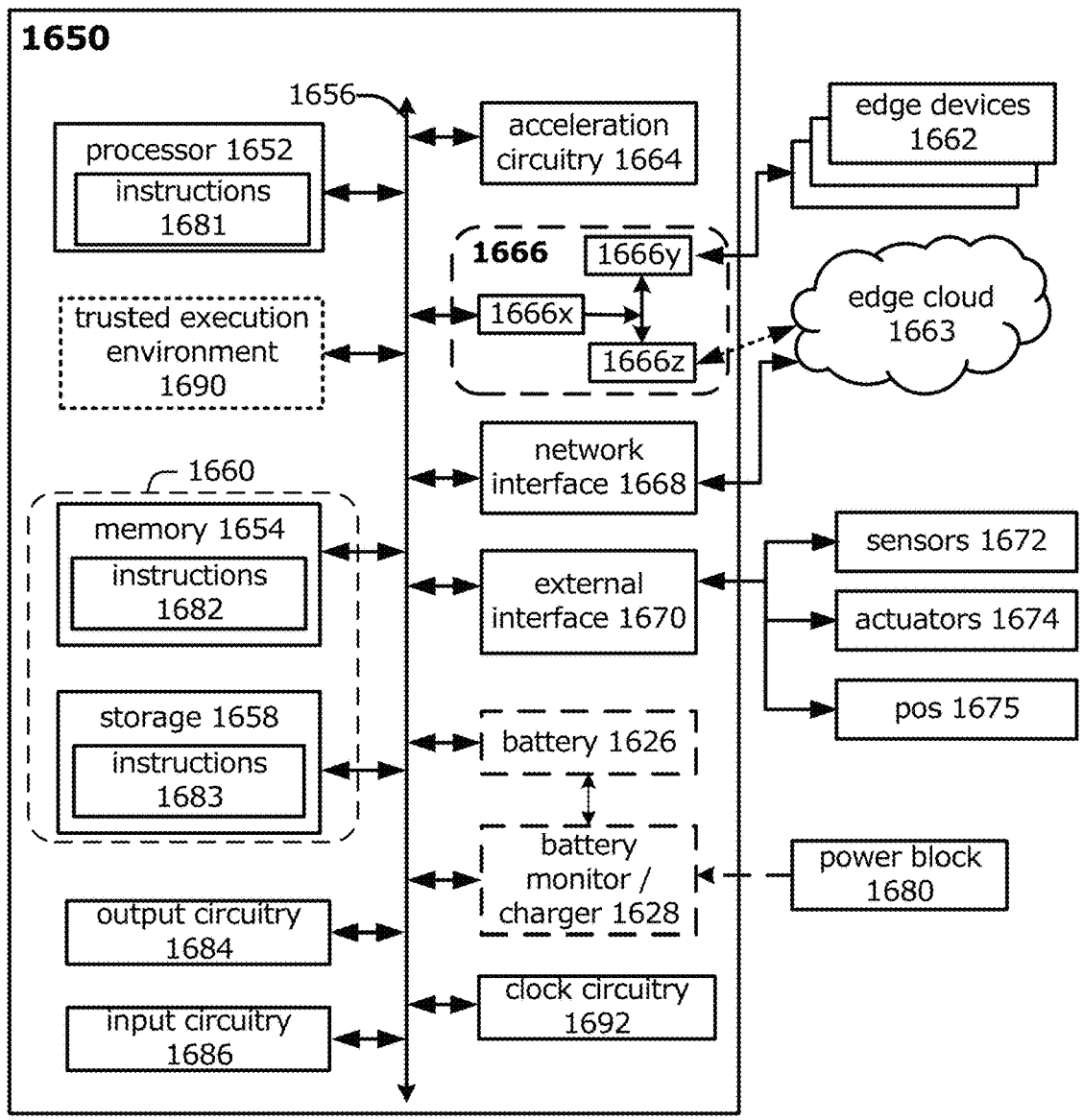
FIG. 16 depicts example components a compute node.

Furthermore, each node 301 may include a local clock entity (e.g., clock circuitry 1692 of FIG. 16 discussed infra). For the present example, each local clock reference frequency each node 301 is assumed to be an XO (e.g., a quartz crystal oscillator or the like), however, other clocks and clock reference frequencies can be used in other implementations.

Timing among the nodes 301 may need to be synchronized (sync'd) to fulfill one or more timeliness requirements and/or for other reasons (e.g., to align plant/factory-wide events and/or actions). For example, in some use cases, the time accuracy needs to be within +/−1 microsecond (μs) with respect to the GM node $301_0$ at any node 301 (e.g., measured at each working clock used by 802.1Qbv (GCL) and the application clock). For time synchronization (sync) across the node chain 300, a GM node $301_0$ will send, to a next node 301 in the node chain 300 (e.g., node $301_1$), a message (e.g., a sync message) including a timestamp or some other indication of a time at the GM node $301_0$. The next node 301 (e.g., node $301_1$) includes a process for measuring the link delay (sometimes referred to as propagation delay) of the sync message, which is the delay incurred due to the traversal of the sync message across (or through) connection $302_A$. For example, the speed of light is approximately 1 nanosecond (ns) per foot, and if the connection $302_A$ comprises a 45 foot link cable (or optical fiber), then the sync message may take about 45 ns to traverse connection $302_A$. The next node 301 (e.g., node $301_1$) also includes a process to measure a residence time, which is the amount of time between receipt of the sync message to when that sync message will be conveyed to another next node 301 in the node chain 300 (e.g., node $301_2$). Before sending the sync message to the next node 301 (e.g., node $301_2$), the subject node 301 (e.g., node $301_1$) inserts the measured residence time and link delay into a correction field in the sync message, which is then passed to the next node 301 (e.g., node $301_2$). After receipt of the sync message, the next node (e.g., node $301_2$) performs similar measurements and inserts its measured delays into the a same or different correction field in the sync message before passing the sync message along the chain 300. This is repeated by each node 301 in the chain 300 until the sync message arrives at its destination (e.g., end station $301_N$). When received by the end station $301_N$, the end station $301_N$ is able to calculate the total delay of conveying the sync message from the GM $301_0$ to the end station $301_N$, and (re)configures its clock accordingly (if necessary). In some implementations, each node 301 in the chain 300 may calibrate its own clock using the correction information in the correction field before sending the sync message to the next node 301 in the chain 300, or after sending the sync message to the next node 301 in the chain 300 (e.g., by storing the relevant correction information and using the stored information for clock reconfiguration).

In some implementations, the sync message contains the time of transmission from the GM $301_0$, a correction field of the delay that has accumulated since it was transmitted, and a measure of the RR. In some implementations, the time of transmission from the GM $301_0$ may be from the perspective/reference of a primary reference time and/or a recognized timing standard time (e.g., UTC or TAI timescales, a time provided by National Institute of Standards and Technology (NIST) timeservers, a time provided by a global navigation satellite system (GNSS), and/or the like). Furthermore, the sync message may have any suitable format, such as any message format discussed in [IEEE802.1AS]. The RR may be a ratio between the current clock speed of the subject node 301 and the GM's $301_0$ clock speed. Additionally or alternatively, the RR is the measured ratio of a frequency of the subject node's 301 local clock entity to the frequency of the GM's $301_0$ clock entity. In some implementations, the RR may be calculated using the following equation: $RR_N = RR_{N-1} + NRR_{NtoN-1}$, where $RR_N$ is the Rate Ratio at $301_N$, $RR_{N-1}$ is the Rate Ratio at $301_{N-1}$, and $NRR_{NtoN-1}$ is the Neighbor Rate Ratio between $301_N$ and $301_{N-1}$ as calculated at $301_N$ and where all RR and NRR values are quantity-per-quantity measures such as parts-permillion (ppm, $10^{-6}$). Additionally or alternatively, the RR may be calculated using the following equation: $RR_N = RR_{N-1} \times NRR_{NtoN-1}$ where the values are actual ratios. As discussed in more detail infra, various embodiments include mechanisms and techniques for determining an estimated NRR (eNNR), which takes into account the clock drift rate of a local clock entity, may be used as the NRR when calculating the RR. In some implementations, the estimated NRR with clock drift compensation (referred to herein as "eNNR") is the mNRR plus a drift correction factor that is equal to a clock drift rate multiplied by the time between an effective measurement point of the mNRR and when the NRR is actually used.

Additionally or alternatively, a cumulative RR (cumulativeRateRatio) is an estimate of the ratio of the frequency of the GM's $301_0$ clock to the frequency of the local clock entity of a subject PTP instance (or node 301). The cumulative RR is expressed as the fractional frequency offset multiplied by $2^{41}$, which is the quantity (rateRatio—1.0) ($2^{41}$), where rateRatio is computed by the PortSyncSyncReceive state machine (see e.g., section 10.2.8.1.4 in [IEEE802.1AS]).

Furthermore, each node 301 may responsible for updating the correction field based on the incoming link delay plus its own residence time. In some implementations, each node 301 measures the NRR between itself and an upstream device (a next node 301 to which a subject node 301 will send the sync message), adds the measured NRR to the incoming RR, and uses the new RR to modify the measured link delay and the residence time prior modifying the correction field, and passing on everything to the next node 301. Here, the NRR is the measured ratio of a frequency of a local clock entity of an upstream node 301 at the other end of a link 302 attached to a subject node's 301 port to the frequency of the subject node's 301 local clock entity. The rate radio may be calculated and used for this step because the correction field is in terms of the GM clock, not the local clock at the subject node 301, which is used to measure link delay and residence time. Here, multiplying by the RR accomplishes that translation.

In some implementations, the GM $301_0$ may or may not have a more better (or more optimal) clock than other nodes 301 in the chain 300. For example, the GM $301_0$ may or may not have better frequency stability (e.g., in terms of parts per million (ppm)) than other nodes in the chain 300.

Additionally or alternatively, in some implementations no averaging of the pDelay measurement is performed. Temperature gradients induce PPM gradients, resulting in time-duration-measurement errors. Various ambient temperature profiles ($T_{Ambient}$) can be used with various transfer functions (e.g., PPM=f($T_{Crystal}$) where $T_{Crystal}$ is a temperature profile of the crystal). The function of PPM vs TAmbient is a property of the electrical, mechanical, and thermal design of the board, chassis, or system. In some implementations, there may be zero thermal resistance between $T_{Ambient}$ and $T_{Crystal}$ (0° K/W).

1.3.1. Delay Measurement

Figure 4:
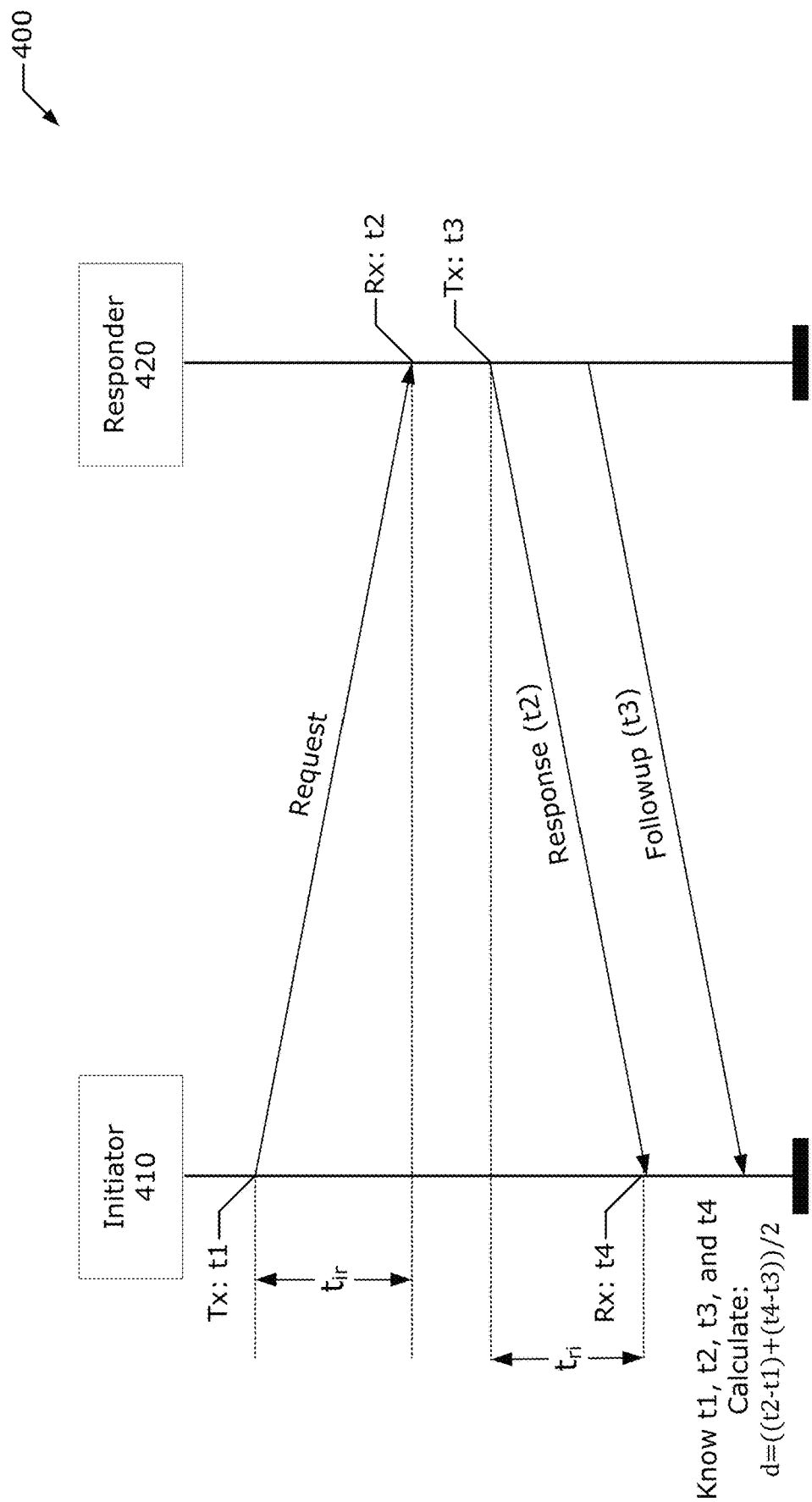
FIG. 4 depicts a medium delay measurement procedure.

Each type of LAN or gPTP communication path has different methods for measuring propagation time, but they are all based on measuring the time that a part of a message is transmitted from one device and the time that the same part of the same message is received by the other device, then sending another message in the opposite direction and doing the same measurement as shown in FIG. 4.

FIG. 4 shows a delay measurement procedure 400, where delay is measured by an initiator node 410 (hereinafter "Init 410") in communication with a responder node 420 (hereinafter "Resp 420"). In some implementations, the Init 410 is an 802.1AS initiator and the Resp 420 is an 802.1AS responder, and/or the Init 410 and the Resp 420 may be (or may include) PTP instances such as relay instances or the like. Additionally or alternatively, the Init 410 and the Resp 420 may correspond to respective nodes 301 in a node chain 300 (see e.g., FIG. 3).

The delay measurement procedure 400 of FIG. 4 may operate as follows: at time t1, the Init 410 transmits (Tx) a request message to the Resp 420, which is received (Rx) by the Resp 420 at a time t2. At time t3, the Resp 420 Tx a response message based on the request message. The response message includes an indication of the receipt time of the request message, which in this case is time t2. At time t4, the Init 410 Rx the response message. At some point later, the Resp 420 Tx a follow-up message indicating the Tx time of the response message, which in this case is time t3. The Init 410 calculates the delay d according to equation (1).

$$d = \frac{((t2-t1)+(t4-t3))}{2} \quad (1)$$

The delay measurement procedure 400 can be used in various LANs in at least the following ways: a) Full-duplex Ethernet LANs use the two-step peer-to-peer (P2P) path delay algorithm as defined in [IEEE1588], where the messages In FIG. 4 are called Pdelay_Req, Pdelay_Resp, and Pdelay_Resp_Follow_Up (see e.g., FIG. 11-1 in [IEEE802.1AS]); b) IEEE 802.11 wireless LANs use the Timing Measurement (TM) procedure or the Fine Timing-Measurement (FTM) procedure defined in [IEEE80211]. The Timing measurement messages are the "Timing Measurement frame" and its corresponding "Ack" (see e.g., FIG. 12-1 in [IEEE802.1AS]). The Fine Timing Measurement messages are the "initial FTM request frame" and the "Fine Timing Measurement frame" and its "Ack" (see e.g., FIG. 12-2 in [IEEE802.1AS]); c) EPON LANs use the discovery process, where the messages are "GATE" and "REGISTER REQ" (see e.g., Clause 64 and Clause 77 of [IEEE802.3]); and/or d) CSNs either use the same mechanism as full-duplex Ethernet or use a method native to the particular CSN (similar to the way native methods are used by IEEE 802.11 networks and EPON) (see e.g., FIG. 16-5 in [IEEE802.1AS]). Additional or alternative mechanisms for measuring delay can be used, including those discussed in [IEEE802.1AS].

In one example implementation, procedure 400 is used to measure propagation delay on a full-duplex point-to-point PTP Link using a peer-to-peer delay mechanism. Here, the propagation delay measurement is initiated by a TAS 301 at one end of a PTP link, which is referred to as the peer delay Init 410. For purposes of the measurement, the other TAS 301 is the peer delay Resp 420. A similar measurement occurs in the opposite direction, with the Init 410 and Resp 420 interchanged and the directions of the messages in FIG. 4 reversed.

In this example implementation, the propagation delay measurement starts with the Init 410 issuing a Pdelay_Req message and generating a timestamp t1. The Resp 420 receives this message and timestamps it with time t2. The Resp 420 returns a Pdelay_Resp message and timestamps it with time t3. The Resp 420 returns the time t2 in the Pdelay_Resp message and the time t3 in a Pdelay_Resp_Follow_Up message. The Init 410 generates a timestamp t4 upon receiving the Pdelay_Resp message. The Init 410 then uses these four timestamps to compute the mean propagation delay (e.g., meanLinkDelay discussed in section 8.3 in [IEEE802.1AS]) as shown in equation (2), where D is the measured mean propagation delay and the other quantities are defined as shown by FIG. 4.

$$t_{ir} = t2 - t2 \quad (2)$$
$$t_{ri} = t4 - t3$$
$$D = \frac{t_{ir} + t_{ri}}{2} = \frac{(t4 - t1) + (t3 - t2)}{2}$$

This example implementation is used to measure the mean propagation delay, and any PTP link asymmetry is modeled as described in section 8.3 in [IEEE802.1AS]. Any asymmetry that is not corrected for introduces an error in the transported synchronized time value. The accuracy of the mean propagation delay measurement depends on how accurately the times t1, t2, t3, and t4 are measured. In addition, equation (2) assumes that the Init 410 and Resp 420 timestamps are taken relative to clocks that have the same frequency. In practice, t1 and t4 are measured relative to the LocalClock entity of the TAS Init 410, and times t2 and t3 are measured relative to the LocalClock entity of the TAS Resp 420. If the propagation delay measurement is desired relative to the Resp 420 time base, the term (t4−t1) in equation (2) is multiplied by the RR of the Resp 420 relative to the Init 410, otherwise there will be an error equal to 0.5y(t4−t1), where y is the frequency offset of the Resp 420 relative to the Init 410. Likewise, if the propagation delay measurement is desired relative to the Init 410 time base, the term (t3−t2) in equation (2) is multiplied by the RR of the Init 410 relative to the Resp 420, otherwise there will be an error equal to 0.5y(t3−t2), where y is the frequency offset of the Init 410 relative to the Resp 420. Finally, if the propagation delay measurement is desired relative to the GM clock time base, each term is multiplied by the RR of the GM clock relative to the time base in which the term is expressed.

The RR of the Resp 420 relative to the Init 410 is the quantity NRR (neighborRateRatio) (see e.g., section 10.2.5.7 in [IEEE802.1AS]). The RR is computed by the function computePdelayRateRatio( ) (see e.g., section 11.2.19.3.3 in [IEEE802.1AS]) of the MDPdelayReq state machine (see e.g., section 11.2.19 in [IEEE802.1AS]) using successive values of t3 and t4. As indicated in the description of computePdelayRateRatio( ), any scheme that uses this information is acceptable as long as the performance requirements discussed in section B.2.4 in [IEEE802.1AS] are met. These performance requirements may include: the error inherent in any scheme used to measure rate ratio (or frequency offset) shall not exceed 0.1 ppm; this requirement is consistent with a rate ratio measurement made by measuring the default Pdelay_Req message transmission interval (the nominal interval duration is 1 s; see e.g., section 11.5.2.2 in [IEEE802.1AS]) relative to the clocks whose rate ratio is desired, assuming the clocks meet a time measurement granularity requirement that is no worse than 40 ns)

The computePdelayRateRatio( ) function computes neighborRateRatio (see e.g., section 10.2.5.7 in [IEEE802.1AS]) using the following information conveyed by successive Pdelay_Resp and Pdelay_Resp_Follow_Up messages: a) The pdelayRespEventIngressTimestamp (see e.g., section 11.3.2.1 in [IEEE802.1AS]) values for the respective Pdelay_Resp messages; and b) The correctedResponderEventTimestamp values, whose data type is UScaledNs, obtained by adding the following fields of the received Pdelay_Resp Follow_Up message: (1) The seconds field of the responseOriginTimestamp field, multiplied by 109; (2) The nanoseconds field of the responseOriginTimestamp parameter; (3) The correctionField, divided by $2^{16}$; and (4) delayAsymmetry, if this state machine is invoked by common mean link delay service (CMLDS). If delayAsymmetry does not change during the time interval over which neighborRateRatio is computed, it is not necessary to subtract it if this state machine is invoked by CMLDS because in that case it will be canceled when computing the difference between earlier and later correctedResponderEventTimestamps.

Any scheme that uses the preceding information, along with any other information conveyed by the successive Pdelay_Resp and Pdelay_Resp_Follow_Up messages, to compute neighborRateRatio is acceptable as long as the performance requirements specified in section B.2.4 in [IEEE802.1AS] are met. If neighborRateRatio is successfully computed, the Boolean neighborRateRatioValid (see e.g., section 11.2.19.2.10 in [IEEE802.1AS]) is set to TRUE. If neighborRateRatio is not successfully computed (e.g., if the MD entity has not yet exchanged a sufficient number of peer delay messages with its peer), the Boolean neighborRateRatioValid is set to FALSE.

As one example, neighborRateRatio can be estimated as the ratio of the elapsed time of the LocalClock entity of the time-aware system at the other end of the PTP Link attached to this port, to the elapsed time of the LocalClock entity of this time-aware system. This ratio can be computed for the time interval between a set of received Pdelay_Resp and Pdelay_Resp_Follow_Up messages and a second set of received Pdelay_Resp and Pdelay_Resp_Follow_Up messages some number of Pdelay_Req message transmission intervals later, such as shown by equation (3)

$$\frac{correctedRespEventTS_N - correctedRespEventTS_0}{pDelayRespEventIngreeTS_N - pDelayRespEventIngressTS_0} \quad (3)$$

Figure 5:
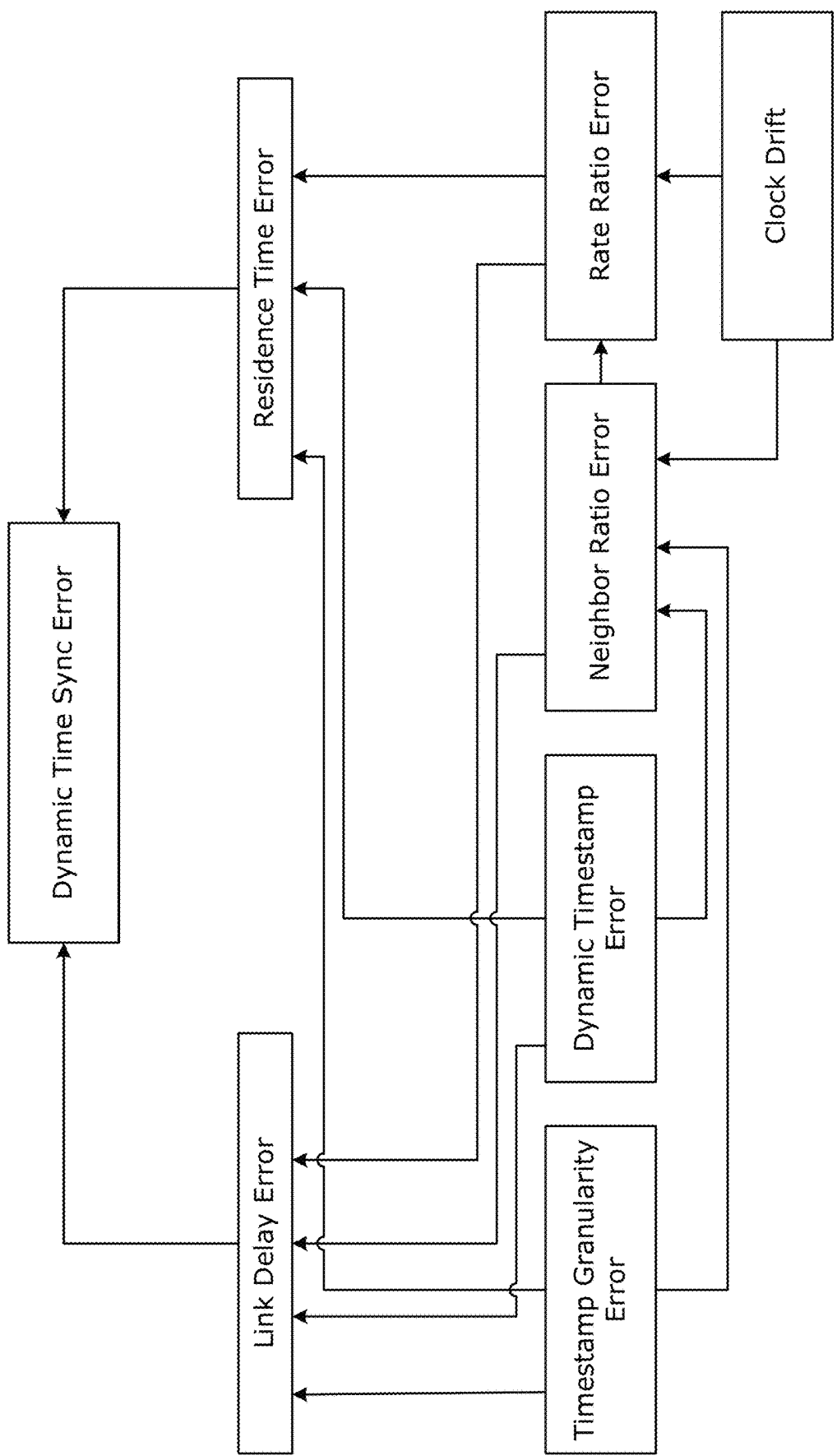
FIG. 5 depicts various time synchronization elements and relationships.

In equation (3), N is the number of Pdelay_Req message transmission intervals separating the first set of received Pdelay_Resp and Pdelay_Resp_Follow_Up messages and the second set, and the successive sets of received Pdelay_Resp and Pdelay_Resp_Follow_Up messages are indexed from 0 to N with the first set indexed 0. Furthermore, this function must account for non-receipt of Pdelay_Resp and/or Pdelay_Resp_Follow_Up for a Pdelay_Req message and also for receipt of multiple Pdelay_Resp messages within one Pdelay_Req message transmission interval FIG. 5 depicts various time synchronization elements and relationships according to various embodiments. In particular, FIG. 5 shows the various types of error that contribute to dynamic time sync errors based on various simulations and measurements. As shown by FIG. 5, both link delay errors and residence time errors contribute to the dynamic time sync error. Time measurement granularity error (see e.g., sections 11.1.2 and B.1.2 in [IEEE802.1AS]), dynamic timestamp error, NRR error, and RR error each contribute to the link delay error. Further, time granularity error, dynamic timestamp error, and NRR error each contribute to the residence time error. The time granularity error is related to the maximum resolution of timestamps, and the dynamic timestamp error is in addition to granularity and can be implementation dependent. All errors in FIG. 5 are caused by either clock drift or timestamp errors (see e.g., McCall et al., "The 60802 challenge of meeting time accuracy goals across long daisy-chains using 802.1AS™-2020", Interim of 802.1 TSN/60802 (September 2021) ("[McCall1]"), the contents of which is hereby incorporated by reference in its entirety). The RR error accumulates through the node chain 300 and the NRR error feeds into the RR error. Moreover, clock drift contributes to both RR error and the NRR error. Therefore, accounting for, or compensating for, clock drift can significantly improve the accuracy of the time sync among various nodes 301.

1.3.2. Logical Syntonization

The time-synchronization correction previously described is dependent on the accuracy of the delay and residence time measurements. If the clock used for this purpose is frequency locked (syntonized) to the GM clock, then all the time interval measurements use the same time base. Since actually adjusting the frequency of an oscillator (e.g., using a phase-lock loop) is slow and prone to gain peaking effects, relay instances can correct time interval measurements using the GM Clock frequency ratio.

Each PTP instance measures, at each PTP port, the ratio of the frequency of the PTP instance at the other end of the link attached to that PTP port to the frequency of its own clock. The cumulative ratio of the GM Clock frequency to the local clock frequency is accumulated in a standard organizational type, length, value (TLV) attached to the Follow_Up message (or the sync message if the optional one-step processing is enabled). The frequency ratio of the GM Clock relative to the local clock is used in computing synchronized time, and the frequency ratio of the neighbor relative to the local clock is used in correcting the propagation time measurement.

The GM clock frequency ratio is measured by accumulating neighbor frequency ratios for two main reasons. First, if there is a network reconfiguration and a new GM instance is elected, the nearest neighbor frequency ratios do not have to be newly measured as they are constantly measured using the Pdelay messages. This results in the frequency offset relative to the new GM Clock being known when the first Follow_Up message (or first sync message if the optional one-step processing is enabled) is received, which reduces the duration of any transient error in synchronized time during the reconfiguration. This is beneficial to many high-end audio applications. Second, there are no gain peaking effects because an error in frequency offset at one relay instance, and resulting residence time error, does not directly affect the frequency offset at a downstream relay instance.

All PTP instances in a gPTP domain are logically syntonized; in other words, they all measure time intervals using the same frequency, which is done by the process described in section 7.3.3 of [IEEE802.1AS]. Syntonization in [IEEE1588] systems uses the gPTP syntonization method as an option, but uses a TLV standardized as part of [IEEE1588] while gPTP uses the ORGANIZATION_EXTENSION TLV specified in section 11.4.4.3 of [IEEE802.TAS].

1.3.3. GM PTP Instance (Best Master) Selection and Network Establishment

All PTP instances participate in best master selection so that the IEEE 802.1AS protocol can determine the synchronization spanning tree. This synchronization spanning tree can be different from the forwarding spanning tree determined by Rapid Spanning Tree Protocol (RSTP) (see e.g., "IEEE 802.1Qcx-2020—IEEE Standard for Local and Metropolitan Area Networks—Bridges and Bridged Networks Amendment 33: YANG Data Model for Connectivity Fault Management", IEEE 802.1 WG—Higher Layer LAN Protocols Working Group (5 Oct. 2020) ("[IEEE802.1Q]")) since the spanning tree determined by RSTP can be suboptimal or even inadequate for synchronization or can be for a different topology of nodes from the synchronization spanning tree. For gPTP, all systems in a gPTP domain are TASs, where the protocol does not transfer timing over systems that are not time-aware (e.g., those that meet the requirements of [IEEE802.1Q], but do not meet the requirements of [IEEE802.1AS]). A TAS uses the P2P delay mechanism on each PTP port to determine if a non-TAS is at the other end of the link or between itself and the Pdelay Resp 420.

If, on sending Pdelay_Req, (a) No response is received, (b) Multiple responses are received, and/or (c) the measured propagation delay exceeds a specified threshold, then the protocol concludes that a non-TAS or end-to-end (e2e) Transparent Clock (TC) (see e.g., [IEEE1588]) is present. In this case, the link attached to the PTP port is deemed not capable of running gPTP, and the BMCA ignores it. However, the PTP port continues to attempt the measurement of propagation delay using the P2P delay mechanism (e.g., for full-duplex [IEEE802.3] links), multipoint control protocol (MPCP) messages (e.g., for EPON), or [IEEE80211] messages (e.g., for [IEEE80211] links), and periodically checks whether the link is or is not capable of running the [IEEE802.1AS] protocol.

1.4. Clock Drift Error Compensation Techniques

In various embodiments, a node's clock drift rate or frequency is measured and compensated for, and predictions of its future values are determined based on history and other locally-known physical measurements. Existing pDelay messages, used to measure link delay can be used for frequency measurement and this measured drift can be applied as a correction factor whenever NRR or RR is used. Because the drift rate changes slowly over the periods of interest (and is a function of local system temperature, among other things), in some cases the clock speed can be assumed to change linearly, so a simple algorithm can eliminate almost all error. Additional or alternative prediction models are also possible, such as, for example, non-linear models, a Kalman filter, and/or any suitable probability distribution, such as those discussed herein. Additionally or alternatively, different time steps and/or approximations may be used for different (e.g., non-linear) error predictions.

The embodiments herein can be implemented using suitable program code that implements a time sync algorithm, which may configure a device's ability to accurately measure a "correction factor" added to a sync message when subjected to an external frequency variation of a first or higher polynomial order. The "correction factor" is the implementation of how much time has passed since the GM sent a message for each device. In some implementations, the correction factor is the addition of link delay and residence time multiplied by the RR. In some examples, the program code may be implemented in firmware, driver, and/or network stacks. Furthermore, the embodiments herein could be specified by suitable standards such as the [IEEE802.1AS], [IEEE1588], and/or the like.

The embodiments herein may be implemented in various deployment scenarios such as those that include long chains (see e.g., discussion of FIG. 3) and/or other interconnections/topologies of devices, and/or deployment scenarios that involve changes in (internal and/or external) device temperatures. Additionally or alternatively, the embodiments herein may be implemented in deployment scenarios such as those that require time accuracy with respect to the length of the device chain (while subject to environmental factors) is not otherwise achievable. Example use cases/deployment scenarios may include Internet of Things (IoT) (e.g., where individual nodes 301 are different IoT devices and/or network elements/appliances such as IoT gateways, aggregators, etc.), wireless sensor networks (WSNs) (e.g., where individual nodes 301 are different sensors and/or network elements/appliances such as WSN gateways, aggregators, etc.), closed loop control and/or industrial automation (e.g., where individual nodes 301 are manufacturing equipment, robots, drones, sensors, sensors, Programmable Logic Controllers (PLCs), actuators, network elements/appliances, etc.), telecommunications networks (e.g., where individual nodes 301 are different network access nodes/base stations, user equipment, network functions, edge compute nodes, etc.), data centers (e.g., where individual nodes 301 are different servers and/or switch fabric including interconnections between difference servers and between servers and hardware accelerators), instrumentation (e.g., where individual nodes 301 are individual instruments and/or measuring devices), components in autonomous or semi-autonomous vehicles, interconnect (IX) technologies (such as the IX technologies discussed herein) including multi-socket processors, audio video (AV) including professional AV (pro AV) (e.g., synchronizing multiple AV devices such as WiFi speakers, Bluetooth earbuds, webcams, etc. in conference rooms, live performances (medium and large venues), etc.), media clock porting (e.g., satellite Rx streaming content over LAN), power grid (e.g., communication links used to selectively isolate faults on high voltage lines, transformers, reactors and other important electrical equipment where individual nodes 301 are individual electrical equipment), and/or the like.

Figure 6:
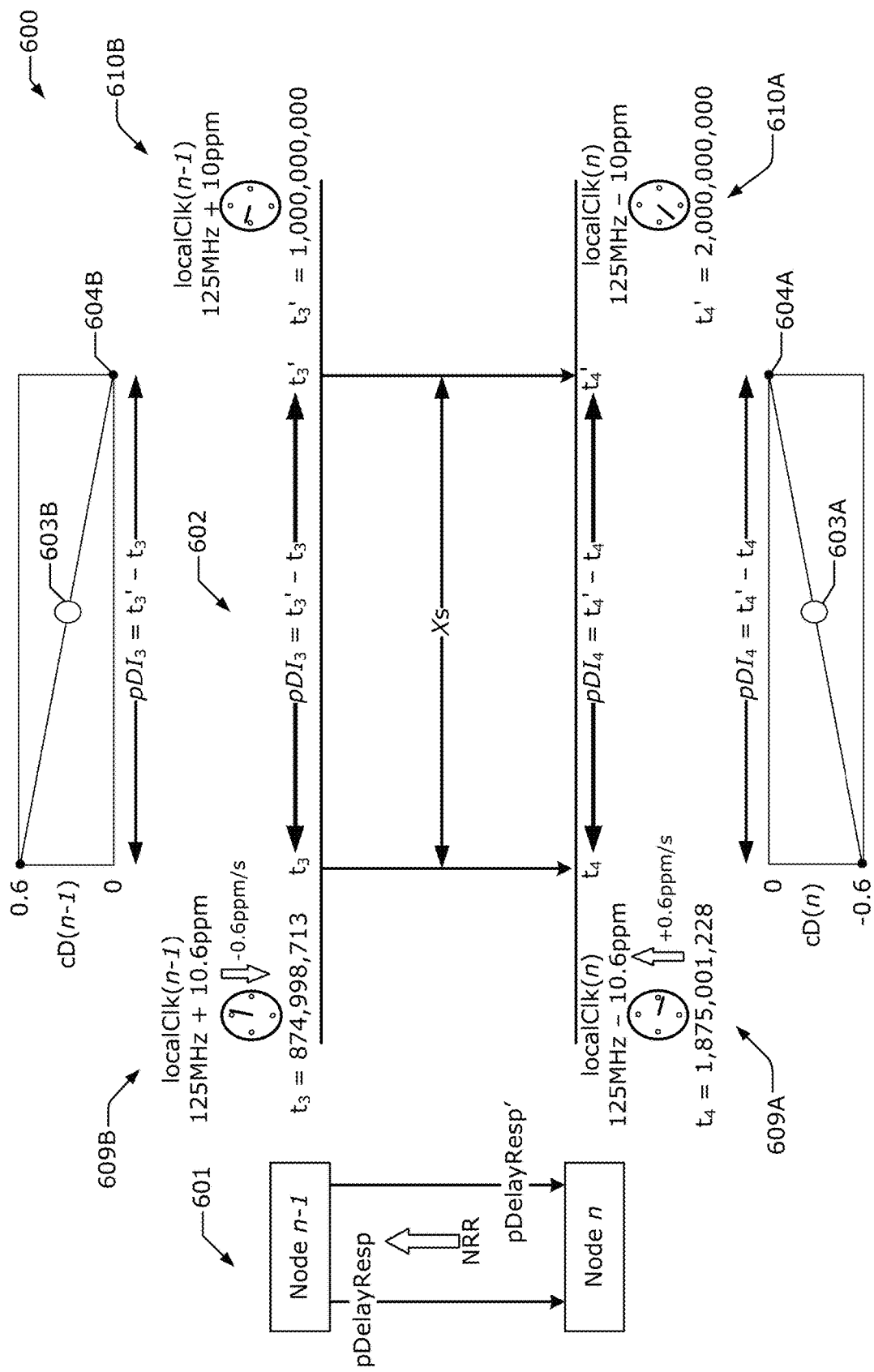
FIG. 6 depicts an example neighbor rate ratio (NRR) measurement according to various embodiments.

FIG. 6 shows an NRR measurement example 600 according to various embodiments. Example 600 illustrates how NRR is measured from node n to node n−1 (where nodes n−1 and n may be any of the nodes 301 in FIG. 3 such as a GM instance/node, relay instance/node, and/or end station instance/node) using path delay response messages. Referring to inset 601, a first path delay response message (pDelayResp) is sent from node n−1 to node n, a second path delay response message (pDelayResp') is sent from node n−1 to node n sometime after the pDelayResp is sent, and node n is attempting to measure or otherwise determine the NRR between the node n and node n−1.

The timing diagram 602 shows the pDelayResp being sent from node n−1 to node n at time $t_3$ (which may correspond to a time $t_3$ in FIG. 4), and the pDelayResp is received by node n at time $t_4$ (note that time $t_4$ takes place after time $t_3$, and may correspond to a time t4 in FIG. 4). At some point later, the pDelayResp' is sent from node n−1 to node n at time $t_3'$ (which may correspond to another time $t_3$ in FIG. 4), which is then received by node n at time $t_4'$ (note that time $t_4'$ takes place after time $t_3'$, and may correspond to another time $t_4$ in FIG. 4). Although pDelayResp and pDelayResp' are separate messages, they may have the same or similar content and/or arrangement of data elements/data fields. A time interval between transmission times $t_3$ and $t_3'$, and between receipt times $t_4$ and $t_4'$ is X seconds (s) (where X is a number), which is 1 s in this example.

Additionally, a pDelayInterval (or "pDI") is a time interval between transmission or receipt of the pDelayResp and the pDelayResp'. In this example, the $pDI_3$ is a difference between Tx times $t_3'$ and $t_3$ (e.g., a difference between the value of the localClk(n−1) at time $t_3'$ and the value of the localClk(n−1) at time $t_3$), and the $pDI_4$ is a difference between Rx times $t_4'$ and $t_4$ (e.g., a difference between the value of the localClk(n) at time $t_4'$ and the value of the localClk(n) at time $t_4$). Node n uses the pDelayResp messages to measure the NRR between node n and node n−1 (NRR). These are the same pDelayResp messages that are used to measure link delay between node n and node n−1. The measurement point 604A is a point at which NRR is attempted to be measured (corresponding to time $t_4'$), and measurement point 603A is the effective measurement point corresponding to the measurement point 604A (referred to as the "effective measurement point 603A"). The measurement point 604B is a point at which NRR is attempted to be measured (corresponding to time $t_3'$), and measurement point 603B is the effective measurement point corresponding to the measurement point 604B (referred to as the "effective measurement point 603B"). In some implementations, node n determines (measures) NRR using the timestamp(s) contained in the most recently received pDelayResp message and the pDelayResp message immediately prior. In some implementations, to reduce the effect of timestamp errors, the NRR is determined using the most recently received pDelayResp message and a pDelayResp message further back in time, for example, the $7^{th}$ or $11^{th}$ prior pDelayResp message, or the median of several prior NRR calculations, or a combination of the two techniques. In all cases, the effective measurement point 603B will be between $t_3$ and $t_3'$, and effective measurement point 603A will be between $t_4$ and $t_4'$, and if clock drift is linear, the effective measurement points 603A, 603B will be halfway between $t_4$ and $t_4'$ and $t_3$ and $t_3'$, respectively.

In example 600, the speed of the local clock at node n (localClk(n)) is increasing (see 610A in FIG. 6) and the speed of the local clock at node n−1 (localClk(n−1)) is decreasing (see 610B in FIG. 6). Specifically, at time $t_3'$ the localClk(n−1) is running 10 ppm over its nominal frequency (e.g., 125 MHz), and at time $t_4'$ the localClk(n) is running 10 ppm under its nominal frequency (e.g., 125 MHz). Therefore, the NRR between node n−1 and node n is −20 ppm without taking into account clock drift. Here, NRR is measured at time $t_4'$ where the actual NRR should be −20 ppm.

However, when the NRR is measured by referring back to when the pDelayResp is sent, at time $t_3$ the localClk(n−1) is running+10.6 ppm and is decreasing (see 609B in FIG. 6). In other words, localClk(n−1) was running faster at time $t_3$ than at time $t_3'$, namely, 0.6 ppm faster at time $t_3$ than at time $t_3'$. This means that there were more than 125,001,250 clock ticks between time $t_3$ and time $t_3'$. Additionally, at time $t_4$ the localClk(n) is running −10.6 ppm and is increasing (see 609A in FIG. 6). In other words, localClk(n) was running slower at time $t_4$ than at time $t_4'$, namely, 0.6 ppm slower at time $t_4$ than at time $t_4'$.

Since the localClk(n) has a clock drift of +0.6 ppm per second (ppm/s) and localClk(n−1) has a clock drift of −0.6 ppm/s. This means that there is a combined clock drift of +1.2 ppm/s. The effective measurement point 603 is assumed to be half way between the most recent pDelayResp message (i.e., pDelayResp') and the previous pDelayResp message (i.e., pDelayResp), which in this example is 0.5 s in the past. Accordingly, the NRR between nodes n and n−1 is −20.6 ppm, which can be calculated according to equation (4).

$$mNRR = \frac{pDI_4}{pDI_3} = \frac{(t_4' - t_4)}{(t_3' - t_3)} = \frac{(2 \times 10^9 - 1,875,001,228)}{(1 \times 10^9 - 874,998,713)} = \quad (4)$$

-continued $$\frac{124{,}998{,}772}{125{,}001{,}227} = 0.9999798802 \rightarrow (1 - 0.9999798802) =$$

$$0.00002060778 \rightarrow -0.00206\% = -20.6\text{ppm}$$

In equation (4), mNRR is the measured NRR at time $t_4'$. Since the mNRR is −20.6 ppm in this example, this means that there is a clock drift error of −0.6 ppm. Referring back to FIG. 5, the clock drift error (e.g., −0.6 ppm in example 600) that feeds into the NRR error and the RR error, and each of these errors both feed into the residences time error and the link delay error, thereby significantly contributing to the dynamic time sync error.

There is a difference between actual NRR and measured NRR (mNRR). When clock rates are relatively stable, the mNRR can be considered to be accurate (e.g., the same or similar to the actual NRR), and there is little impact from timestamp granularity or other errors. However, when clock rates are drifting, the mNRR may have significant errors, such that there is a significant difference between the actual NRR and the mNRR. The error(s) in the mNRR ($mNRR_e$) is the difference between the mNRR and the actual NRR. These differences are minimized when the clock rates of neighboring nodes drift in the same direction and are maximized when clock rates of neighboring nodes drift in different directions. The PPM versus the temperature curve for a clock device (e.g., a quartz crystal oscillator (XO)) means the latter could be more common than expected. The $mNRR_e$ is based on the clock drift error of the mNRR ($mNRR_{eCD}$) and the timestamp error of the mNRR ($mNRR_{eTS}$), and can be calculated as shown by equation (5).

$$mNRR_e = mNRR_{eTS} + mNRR_{eCD} \quad (5)$$

The $mNRR_{eTS}$ in ppm can be calculated as shown by equation (6).

$$mNRR_{eTS} = \frac{(t_{4PDce} - t_{4PDpe}) - (t_{3PDce} - t_{3PDpe})}{pDI} \quad (6)$$

where: $t_{3PDpe} = TSGE_{Tx} + DTSE_{Tx}$, $t_{4PDpe} = TSGE_{Rx} + DTSE_{Rx}$

In equation (6), pDI is the pDelayInterval, $t_{4PDce}$ is the current pDelay error at node n (e.g., pDelay error at time $t_4'$) in ns, $t_{4PDpe}$ is the previous pDelay error at node n (e.g., pDelay error at time $t_4$) in ns, $t_{3PDce}$ is the current pDelay error at node n−1 (e.g., pDelay error at time $t_3'$) in ns, $t_{3PDpe}$ is the previous pDelay error at node n−1 (e.g., pDelay error at time $t_3$), $TSGE_{Tx}$ is the timestamp granularity error at the Tx (e.g., node n−1), $DTSE_{Tx}$ is the dynamic timestamp error at the Tx (e.g., node n−1), $TSGE_{Rx}$ is the timestamp granularity error at the Rx (e.g., node n), $DTSE_{Rx}$ is the dynamic timestamp error at the Rx (e.g., node n), and pDI is the pDelayInterval, which is an interval between receipt of the pDelayResp messages (e.g., $t_4'-t_4$) and/or an interval between transmission of the pDelayResp messages (e.g., $t_3'-t_3$). An example of input error values is shown by Table 1.

TABLE 1

| Error | Distribution | Default Min Value | Default Max Value | Unit |
|---|---|---|---|---|
| $cD_{GM}$ | Uniform | −0.6 | +0.6 | ppm/s |
| cD | Uniform | −0.6 | +0.6 | ppm/s |

TABLE 1-continued

| Error | Distribution | Default Min Value | Default Max Value | Unit |
|---|---|---|---|---|
| $TSGE_{Tx}$ | Uniform | −4 | +4 | ns |
| $TSGE_{Rx}$ | Uniform | −4 | +4 | ns |
| $DTSE_{Tx}$ | Uniform | −2 | +2 | ns |
| $DTSE_{Rx}$ | Uniform | −1 | +1 | ns |

In Table 1, cD is a clock drift error, $cD_{GM}$ is a clock drift error at the GM node. The $mNRR_{eCD}$ in ppm can be calculated as shown by equation (7).

$$mNRR_{eCD} = \left(\frac{pDI}{2 \times 10^3}\right)(cD(n-1) - cD(n)) \quad (7)$$

Note that the clock drift error at one node will tend to be reversed at the next node. For example, the terms cD (n−1) and cD (n) in equation (7) would be reversed if the $mNRR_{eCD}$ were measured at node n−1. However, this does not apply for $mNRR_{eCD}$ measured at the GM node.

Figure 7:
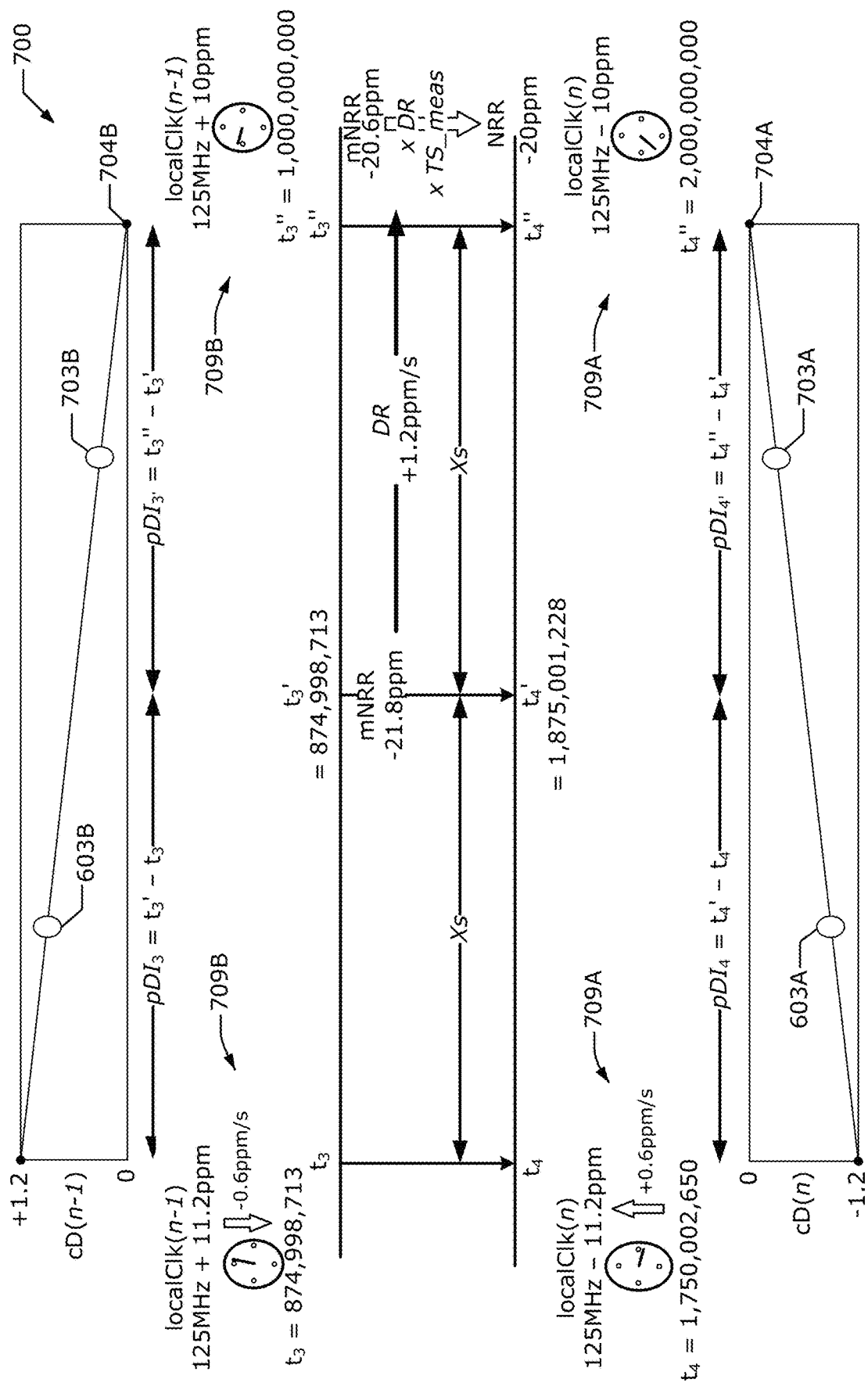
FIG. 7 depicts an example NRR measurement with clock drift compensation according to various embodiments.

FIG. 7 illustrates the correction mechanism 700 to compensate for the clock drift of example 600. Starting from example 600 and assuming a linear clock drift, the clock drift for localClk(n) and localClk(n−1) can be extrapolated out to time $t_3''$ and time $t_4''$, respectively. Since the clock drift is assumed to be linear in the example of FIG. 7, the effective measurement points 703A, 703B can be determined to be halfway between time $t_3''$ time $t_3'$ for localClk(n−1), and halfway between time $t_4''$ and time $t_4'$ for localClk(n).

In FIG. 7, two NRR measurements are shown, including an mNRR of interest (e.g., mNRR at $t_4''$, which is −20.6 ppm) and a previous NRR measurement (e.g., mNRR at $t_4'$, which is −21.8 ppm). Both are in error by −0.6 ppm, and an accurate drift rate (DR), which is +1.2 ppm/s in this example, can be calculated according to equation (9), and then the estimated NRR (eNNR) can be calculated according to equation (10).

$$DR = \frac{mNRR(n) - mNRR(n-1)}{TS\_mNRR(n-1)} \quad (9)$$

$$eNRR(n) = mNRR(n) + (DR \times TS\_mNRR) \quad (10)$$

In equations (9) and (10), DR is the clock drift rate (sometimes referred to simply as "drift rate"), mNRR (n) is the measured NRR at node n (mNRR at $t_4''$) or the pDelayInterval for a most recently received pDelayResp (e.g., the pDelayResp at $t_4''$), mNRR(n−1) is the previously measured NRR at node n (mNRR at $t_4'$) or the pDelayInterval for a previously received pDelayResp (e.g., the pDelayResp at $t_4'$), and TS_mNRR(n−1) is the amount of time since the mNRR measurement (or a time since the previously mNRR at node n). The eNNR is a predicted NRR at a future time, which in the example of FIG. 7 is time $t_4''$. Applying the values from the example of FIG. 7 (where X=1 s, and the effective measurement points 603A-B and/or 703A-B is 0.5 s) to equations (9) and (10), $$DR = \frac{(-20.6\text{ppm}) - (-21.8\text{ppm})}{1s} = +1.2\,\text{ppm/s},$$

and thus, eNRR(n)=−20.6+(+1.2×0.5)=−20 ppm. At $t_4'$ for linear clock drift and where $t_3/t_4$ and $t_3'/t_4'$ are from subsequent pDelayResp messages, $$TS\_mNRR = \frac{pDelayInverval}{2}.$$

Additionally or alternatively, the eNNR can be determined by measuring the DR, and determining a difference between the time at which mNRR is used and a time at whichmNRR was effectively measured. In these implementations, the factors to be considered when determining the eNNR include identifying which previously received pDelayResp was used for the eNNR calculation (or how many pDelayResp messages prior to the current pDelayResp is used for the eNNR calculation), identifying whether the most recent mNNR is used or if an earlier mNNR is used (for example, due to the use of the median value from a number of previous NRR calculations), the delay between when the mNNR was effectively measured and when it was attempted to be measured (0086), and the delay between when the mNNR was attempted to be measured and when it is actually being used. This entire time period is then multiplied by the measured drift rate to obtain the correction factor (e.g., the eNNR).

Once node n calculates the eNNR, node n may use the eNNR to calculate the RR, which will then be used for synchronization purposes. For example, node n may use the eNNR for calculating the RR rather than using the mNRR, and then node n may insert RR plus the clock drift compensated residence time and propagation time into a suitable message (e.g., sync message) for transmission to another node 301 in a node chain 300.

As shown by equations (9) and (10) and FIG. 7, the amount of clock drift error can be determined by multiplying the drift rate DR by the time since the previous NRR was effectively measured TS_mNRR. As such, reducing the pDelayInterval may reduce the amount of clock drift error. However, reducing the pDelayInterval may not reduce the overall time sync error (see e.g., FIG. 5) because a shorter pDelayInterval may increase the relative effect of the timestamp granularity error and/or the dynamic timestamp error on the overall time sync error, in effect resulting in the same or similar amount of time sync error.

Furthermore, in the examples of FIGS. 6 and 7, 0.5 s used as the effective measurement points 603A-B, 703A-B is based on an assumed linear slope of the clock drift in these examples. This assumption is based on the fact that clock drift tends to be relatively stable over time, however, other models may be used such as a slope-based clock drift function or the like. In some implementations, a Kalman filter can be used, where a model of the clock drift is generated/created based on the known statistics of the system or TSN/TAN 100. Additionally or alternatively, any suitable probability distribution, such as those discussed herein, can be used to model the clock drift. Similar principles can be applied to the error introduced by the delay between an NRR measurement and a sync message. RR is used during sync message processing, but is effectively measured at the same time as NRR (e.g., at arrival of the pDelayResp).

Figure 8:
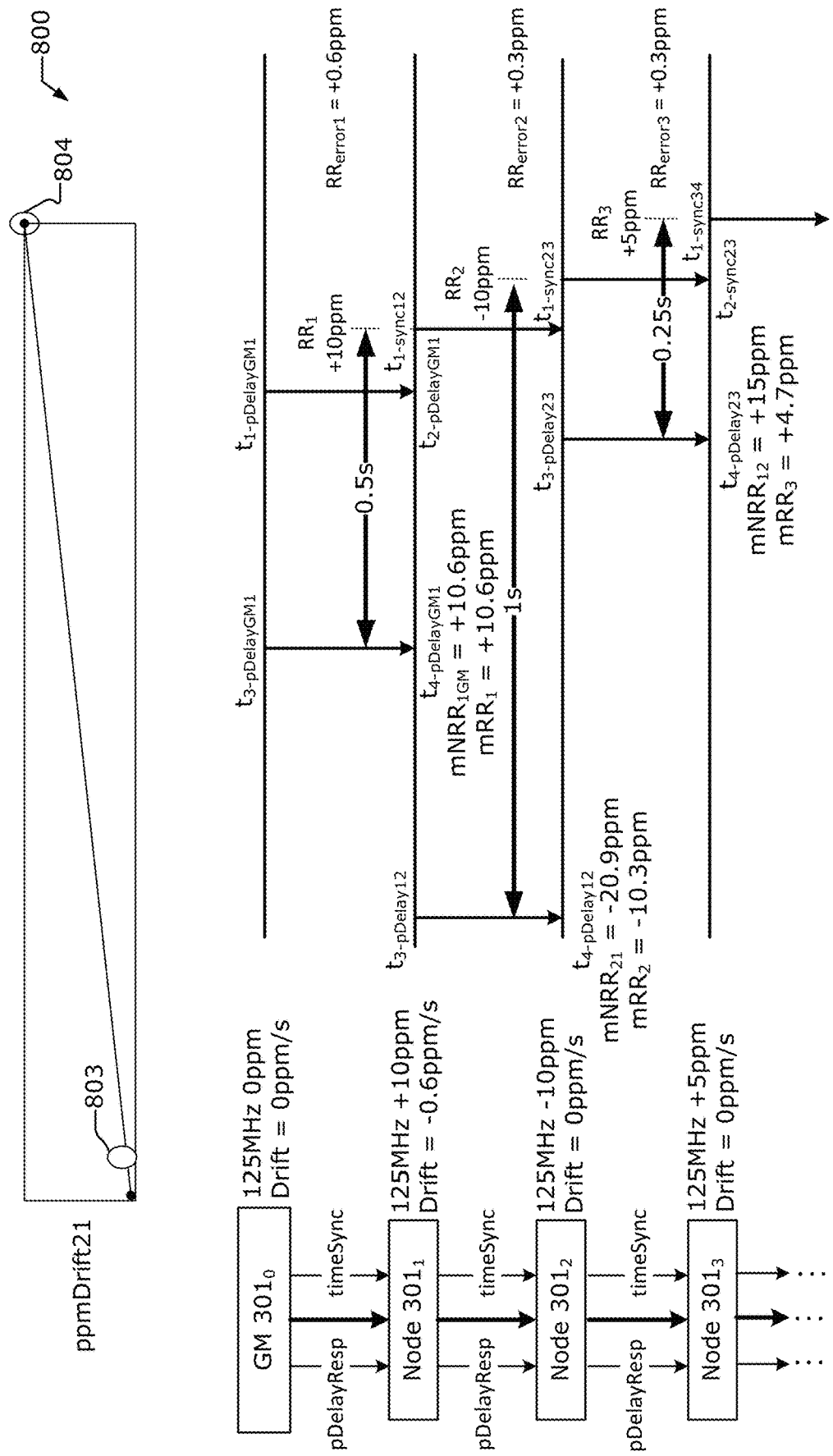
FIGS. 8 and 9 depicts an example RR measurement with clock drift compensation according to various embodiments.

FIG. 8 illustrates a timing 800 for determining the clock drift for RR measurements according to various embodiments. If mNRR is corrected as described previously (e.g., the eNRR is used), the additional error due to the time between mNRR and individual sync messages can be compensated for in the same or similar way, and can be calculated according to equation (11).

$$RR(n) = \qquad (11)$$
$$RR(n-1) \times mNRR(n) \times DR\left(\frac{pDelayInterval}{2} + PD\_TS\_Delay\right)$$

In equation (11), PD_TS_Delay is the delay between the pDelayResp message used for $t_3'$ and $t_4'$ timestamps when calculating mNRR, and the use of eNRR in the sync message. In FIG. 8, the mNRR between node $301_2$ and node $301_1$ may be measured at the mNRR effective measurement point 803 and the eNRR between node $301_2$ and node $301_1$ may be measured at the eNRR effective measurement point 804.

Figure 9:
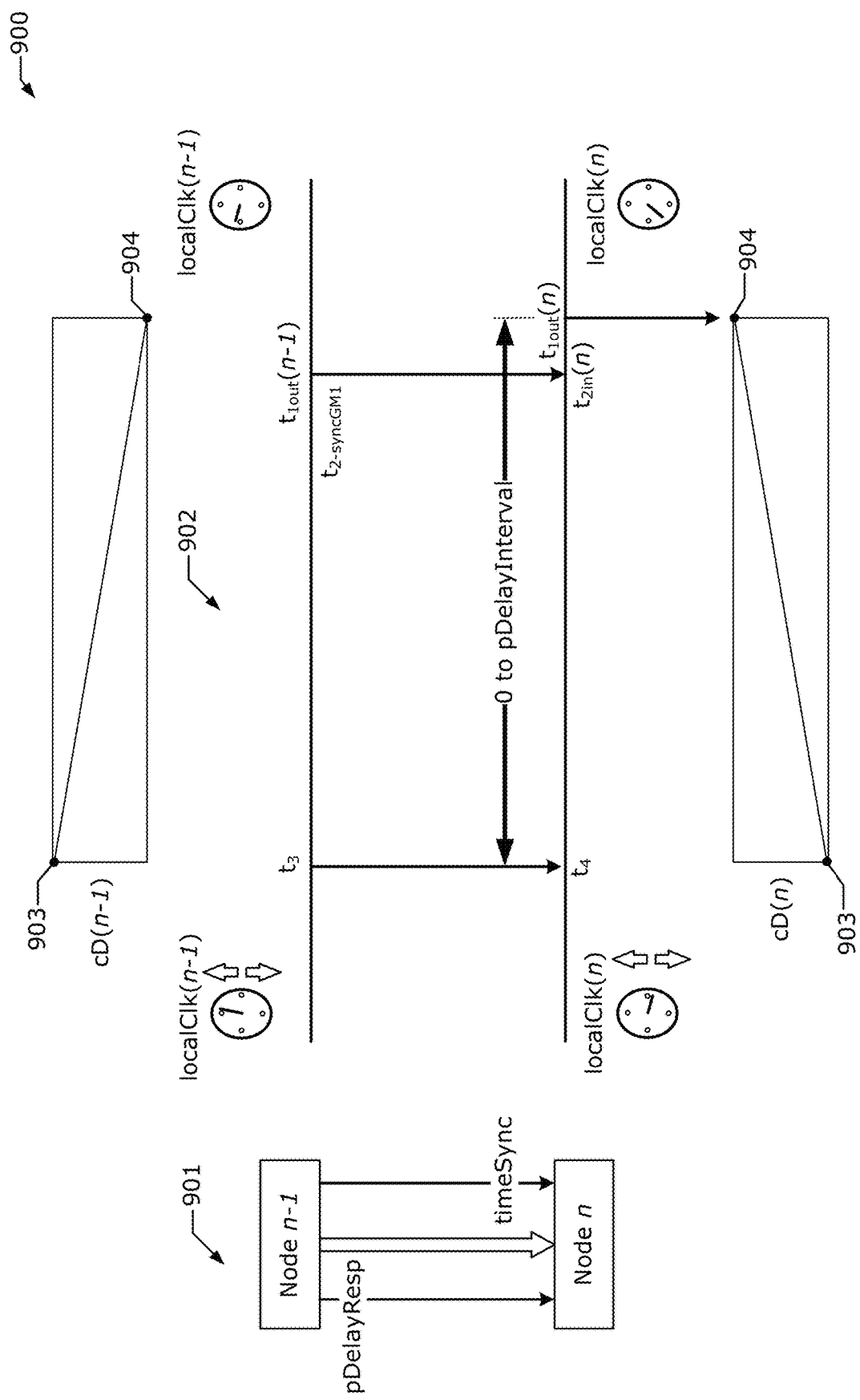

FIG. 9 shows an RR measurement example 900 according to various embodiments. Referring to inset 901, the node n−1 sends a pDelayResp message to the node n, which is received by node n at time $t_4$. Node n−1 also sends a time synchronization message (timeSync) to the node n, which is received by node n.

In timing diagram 902, the node n−1 sends the pDelayResp to the node n at time $t_3$, which is received by node n at time $t_4$. Node n−1 also sends the timeSync to the node n at time $t_{1out}(n-1)$, which is received by node n at time $t_{2in}(n)$. Measurement point 903 is a point where the mNRR is measured. Measurement point 904 is a point where the eNRR is applied to the RR, which in this example is time $t_{1out}(n)$, which is measured at node n as taking place after time $t_{2in}(n)$.

1.5. PTP Message Formats

Figure 10:
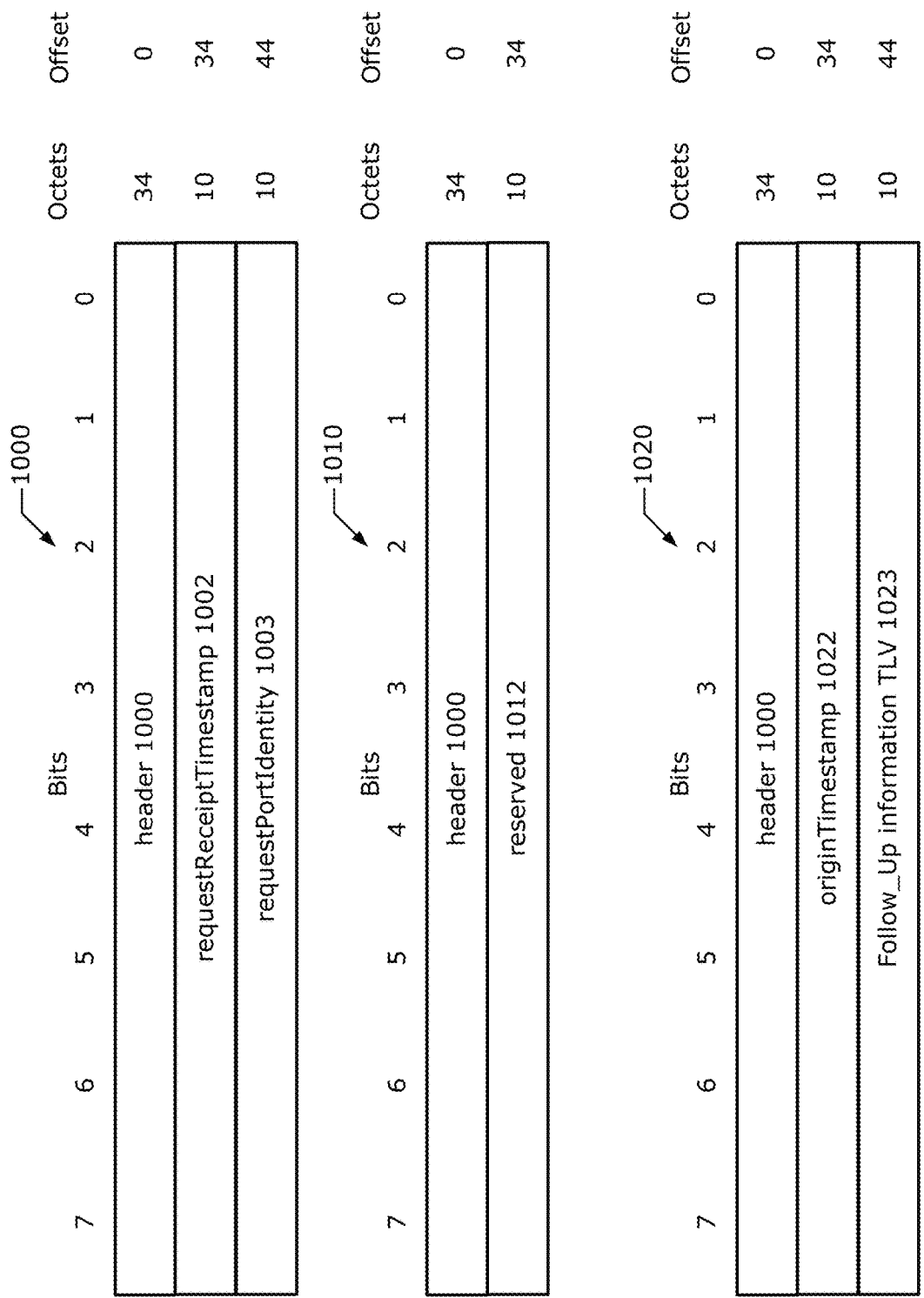
FIG. 10 depicts an example PTP messages.

FIG. 10 shows various PTP messages including a path delay response message (pDelayResp or Pdelay_Resp) 1000, a first sync message (Sync) 1010, and a second sync message (Sync) 1020. Each message includes a header field 1100, which is discussed infra with respect to FIG. 11.

The pDelayResp 1000 includes a request receipt timestamp field (requestReceiptTimestamp) 1002 and a requesting port identity field (requestingPortIdentity) 1003. A value included in the requestReceiptTimestamp 1002 is the seconds and nanoseconds portion of the pdelayReqEventIngressTimestamp of the associated Pdelay_Req message (see e.g., section 11.2.19 of [IEEE802.1AS]). A value included in the requestingPortIdentity 1003 is the value of the sourcePortIdentity field of the associated Pdelay_Req message (see e.g., sections 8.5.2, 10.2.2.1.4, 10.2.2.2.4, 10.2.2.3.6, and 11.4.5 of [IEEE802.1AS]), and/or the portIdentity of the egress port on which the associated Pdelay_Req message is sent.

The Sync 1010 is used when a twoStep flag in the header 1100 is set to TRUE and Sync 1020 is used when the twoStep flag in the header 1100 is set to FALSE. In Sync 1010, the reserved fields are transmitted with all bits of the field set to "0" and ignored by the receiver, unless otherwise specified. The Sync 1020 includes an origin timestamp field (originTimestamp) 1022 and a follow-up information TLV field 1023 (defined in section 11.4.4.3 of [IEEE802.1AS]). A value of the originTimestamp field 1022 is the sourceTime of the ClockMaster entity of the GM instance, when the Sync message was sent by that Grandmaster PTP instance, with any fractional nanoseconds truncated (see e.g., section 10.2.9 of [IEEE802.1AS]). The sum of the correctionField 1109 (see e.g., FIG. 11) and the originTimestamp field 1022 of the Sync message 1020 is the value of the synchronized time corresponding to the syncEventEgressTimestamp at the PTP instance that sent the Sync message 1020, including any fractional nanoseconds.

The follow-up information TLV field 1023 includes, inter alia, a cumulativeScaledRateOffset (Integer32) field. The value of cumulativeScaledRateOffset field is equal to (rateRatio−1.0) ($2^{41}$), truncated to the next smaller signed integer, where rateRatio is the ratio of the frequency of the GM clock to the frequency of the LocalClock entity in the PTP instance that sends the message. The follow-up information TLV field 1023 also includes a gmTimeBaseIndicator (UInteger16) field, whose value is the timeBaseIndicator of the ClockSource entity for the current GM PTP instance (see e.g., section 9.2.2.3 of [IEEE802.1AS]). The timeBaseIndicator is supplied by the ClockSource entity to the ClockMaster entity via the ClockSourceTime.invoke function (see e.g., 9.2.2.3 of [IEEE802.1AS]). The follow-up information TLV field 1023 also includes a lastGmPhaseChange (ScaledNs) field, whose value is the time of the current GM clock minus the time of the previous GM clock at the time that the current Grandmaster PTP Instance became the GM PTP instance. The value is copied from the lastGmPhaseChange member of the MDSyncSend structure whose receipt causes the MD entity to send the Follow_Up message (see e.g., 11.2.11 of [IEEE802.1AS]). The follow-up information TLV field 1023 also includes a scaledLastGmFreqChange (Integer32) field whose value is the fractional frequency offset of the current GM clock relative to the previous GM clock, at the time that the current GM PTP Instance became the GM PTP Instance, or relative to itself prior to the last change in gmTimeBaseIndicator, multiplied by $2^{41}$ and truncated to the next smaller signed integer. The value is obtained by multiplying the lastGmFreqChange member of MDSyncSend whose receipt causes the MD entity to send the Follow Up message (see e.g., 11.2.11 of [IEEE802.1AS]) by $2^{41}$, and truncating to the next smaller signed integer.

FIG. 11 shows an example PTP message header field (header) 1100. Header 1100 is a common header for each of the PTP messages including Sync 1010 and 1020, Pdelay_Resp 1000, as well as Follow Up, Pdelay_Req, and Pdelay_Resp_Follow_Up messages.

The majorSdoId 1101 has a value is specified in section 8.1 of [IEEE802.1AS] for all transmitted (g)PTP messages of a gPTP domain. The value is specified in section 11.2.17 of [IEEE802.1AS] for all transmitted PTP messages of the Common Mean Link Delay Service. Any PTP message received for which the value is not one of the values specified in those subclauses is ignored. The message type field (messageType) 1102 includes a value indicating the type of the message as defined in Table 10-8 and/or Table 11-5 in [IEEE802.1AS] (e.g., a value of "0x0" for Sync 1010 and/or 1020, and a value of "0x3" for Pdelay_Resp 1000).

The minorVersionPTP field 1103 has a value of 1 (or some other suitable value) for transmitted messages and is ignored for received messaged. The versionPTP field 1104 has a value of 2 (or some other suitable value) for transmitted and received messages, and the message is ignored if it contains a different value. The message length field (messageLength) 1105 whose value is the total number of octets that form the PTP message. The counted octets start with and include the first octet of the header and terminate with and include the last octet of the last TLV or, if there are no TLVs, with the last octet of the message as defined in [IEEE802.1AS]. The domain number field (domainNumber) 1106 has a value indicating the gPTP domain number specified in section 8.1 in [IEEE802.1AS]. Additionally or alternatively, the value is 0 for Pdelay_Req, Pdelay_Resp, and Pdelay_Resp_Follow_Up messages and/or as discussed by clause 10.6.2.2.6 in [IEEE802.1AS]. The minorSdoId field 1107 has a value as specified in section 8.1 in [IEEE802.1AS] for all transmitted PTP messages of a gPTP domain. The value is specified in section 11.2.17 in [IEEE802.1AS] for all transmitted PTP messages of the Common Mean Link Delay Service. Any PTP message received for which the value is not one of the values specified in those subclauses is ignored.

The flags field 1108 has value(s) of individual bits of a flags array defined by Table 10-9 in [IEEE802.1AS]. For message types where the bit is not defined in Table 10-9 in [IEEE802.1AS], the value of the bit is set to FALSE (e.g., "0"). The two step flag (twoStepFlag) field may be located at octet 0, bit 1 in the flags array. For Sync messages 1010, 1020, the value of twoStepFlag is FALSE (e.g., "0") for a one-step transmitting PTP port (see e.g., sections 11.1.3 and 11.2.13.9 in [IEEE802.1AS]), and the value of twoStepFlag is TRUE (e.g., "1") for a two-step transmitting PTP port. For Pdelay_Resp messages 1000, the value is transmitted as TRUE (e.g., "1") and ignored on reception. The flags array may also include a ptpTimescale flag at octet 1, bit 3 in the flags array that whose value is TRUE (e.g., "1") if the timescale of the current GM Clock is PTP (see e.g., sections 8.2.1 and 10.3.9.7 and in [IEEE802.1AS]) and FALSE (e.g., "0") if the timescale is ARB. This variable is used by both the BMCA and the explicit port state configuration option. The flags array may also include a timeTraceable flag at octet 1, bit 4 in the flags array that whose value is TRUE (e.g., "1") if both clockSlaveTime (i.e., the synchronized time maintained at the slave (see e.g., section10.2.4.3 in [IEEE802.1AS])) and currentUtcOffset (see e.g., section 10.3.9.10 in [IEEE802.1AS]), relative to the current GM clock, are traceable to a primary reference and FALSE (e.g., "0") if one or both are not traceable to a primary reference. This variable is used by both the BMCA and the explicit port state configuration option. The correctionField 1109 whose value may be set to 0.

The messageTypeSpecific field 1110 includes a value based on the value of the messageType field as described in Table 10-10 in [IEEE802.1AS]. For event messages only, the four octets of the messageTypeSpecific field 1110 may be used for internal implementation of a PTP instance and its ports. For example, if the clock consists of multiple hardware components that are not synchronized, messageTypeSpecific 1110 can be used to transfer an internal timestamp between components (e.g., a physical layer chip and the clock's processor). The messageTypeSpecific field 1110 is not used for features of this standard, and it has no meaning from one clock to another. In the on-the-wire format at each PTP port, for all messageType values, the messageTypeSpecific field 1110 is transmitted with all bits of the field 0 and ignored on receive. The sourcePortIdentity field 1111 includes a value of the PTP port identity attribute (see e.g., sections 8.5.2, 10.2.2.1.4, 10.2.2.2.4, 10.2.2.3.6, and 11.4.5 in [IEEE802.1AS]) of the PTP port that transmits the PTP message. The sequenceId field 1112 is assigned as specified in section 10.5.7 in [IEEE802.1AS]. The controlField field 1113 may have a value of "0". The logMessageInterval field 1114 may be used for announce messages. For an announce message, the value is the value of currentLogAnnounceInterval (see e.g., section 10.3.10.6 in [IEEE802.1AS]) for the PTP port that transmits the announce message. For a signaling message, the value is transmitted as 0x7F and ignored on reception.

FIG. 12 shows an example TIMESYNC message format 1200, which includes the various fields as shown. The destination address field 1201 (octet6) is equal to 01-80-C2-00-00-02 (see e.g. section 57A.3 of [IEEE802.3]). The source address field 1202 (octet6) is the individual MAC address associated with the port through which the TIMESYNC message 1200 is transmitted (see e.g. section 57B.1.1 of [IEEE802.3]). Length/Type (Octet2) field 1203 has a value equal to 0x8809 (see e.g. section 57A.4 of [IEEE802.3]). The Subtype (Octet) field 1204 has a value equal to 0x0A (see e.g. section 57A.4 of [IEEE802.3]). The OUI or CID (Octet3) field 1205 contains the Organizationally Unique Identifier (OUI) or Company identification (CID) that identifies the Organization-Specific Data. The value in this field 120x is the OUI assigned to IEEE 802.1 or the CID allocated by IEEE. The message identifier (Octet2) field 1206 is the TIMESYNC message identifier, and includes a value of 1.

The X (UInteger32) field 1207 is the selected timestamp that will be used as the timing reference as specified in section 13.1.4 in [IEEE802.1AS]. The $ToDo_{X,i}$ (Timestamp) field 1208 includes the synchronized time when the MPCP counter at the clock slave i reaches a value equal to X minus the onuLatencyFactor (see e.g., section 13.1.4 in [IEEE802.TAS]). X is carried in the respective TIMESYNC message 1200. Synchronization of the MPCP clock is described in detail in sections 64.2.1.1 and 77.2.1.1 in [IEEE802.3], for 1G-EPON and 10G-EPON, respectively. Any subnanosecond portion of synchronized time (in this case, time of day), normally transported in a correction field (see e.g., sections 10.2.2.1.2, 10.2.2.2.2, and 10.2.2.3.5 in [IEEE802.1AS]), is not transported over EPON. The sourcePortIdentity (PortIdentity) field 1209 is specified as the sourcePortIdentity member of the MDSyncSend structure most recently received from the PortSync entity of the OLT (see e.g., section 10.2.2.1.4 in [IEEE802.1AS]). The logMessageInterval (Integer8) field 1210 is specified as the logMessageInterval member of the MDSyncSend structure most recently received from the PortSync entity of the OLT (see e.g., section 10.2.2.1.5 in [IEEE802.1AS]). It is the value of the currentLogSyncInterval for this PTP port (see e.g., section 10.7.2.3 in [IEEE802.1AS]). The logMessageInterval field 1210 may be the same or similar to the logMessageInterval field 1114 discussed previously.

The rateRatio (Float64) field 1211 is specified as the rateRatio member of the MDSyncSend structure most recently received from the PortSync entity of the OLT (see e.g., section 10.2.2.1.8 in [IEEE802.1AS]). The gmTimeBaseIndicator (UInteger16) field 1212 is specified as the gmTimeBaseIndicator member of the MDSyncSend structure most recently received from the PortSync entity of the OLT (see e.g., section 10.2.2.1.9 in [IEEE802.1AS]). The lastGmPhaseChange (ScaledNs) field 1213 is specified as the lastGmPhaseChange member of the MDSyncSend structure most recently received from the PortSync entity of the OLT (see e.g., section 10.2.2.1.10 in [IEEE802.1AS]). The scaledLastGmFreqChange (Integer32) field 1214 includes a value that is the fractional frequency offset of the current GM clock relative to the previous Grandmaster Clock, at the time that the current Grandmaster PTP instance became the Grandmaster PTP instance, or relative to itself prior to the last change in gmTimeBaseIndicator, multiplied by $2^{41}$ and truncated to the next smaller signed integer. The value is obtained by multiplying the lastGmFreqChange member of MDSyncSend (see e.g., section 10.2.2.1 in [IEEE802.1AS]) whose receipt causes the MD entity to send the TIMESYNC message by $2^{41}$, and truncating to the next smaller signed integer. This scaling allows the representation of fractional frequency offsets in the range $[1(2^{10}-2^{-41}), 2^{-10}-2^{-41}]$, with agranularity of $2^{-41}$. This range is approximately $[-9.766 \times 10^{-4}, 9.766 \times 10^{-4}]$.

The domainNumber (UInteger8) field 1215 is specified as the gPTP domain number (see e.g., section 8.1 in [IEEE802.1AS]). The majorSdoId (Nibble) field 1216 includes a value that is the same as the value specified in section 8.1 for all transmitted PTP messages of a gPTP domain. Any TIMESYNC message received for which the value is not one of the values specified in section 8.1 in [IEEE802.1AS] is/are ignored. The nibble that immediately follows majorSdoId field 1216 is reserved (e.g., reserved field 1217-1) (see e.g., section 10.6.1 in [IEEE802.1AS]). The minorSdoId (UInteger8) field 1218 includes a value is the same as the value specified in section 8.1 in [IEEE802.1AS] for all transmitted PTP messages of a gPTP domain. Any TIMESYNC message received for which the value is not one of the values specified in section 8.1 in [IEEE802.1AS] is/are ignored. The majorSdoId field 1216 may be the same or similar to the majorSdoId field 1101 discussed previously, and the minorSdoId field 1218 may be the same or similar to the minorSdoId field 1107 discussed previously. The reserved field 1217-2 that follows minorSdoId field 1218 has a variable length. The reserved field 1217-2 has zero length on transmission, and any bytes between the minorSdoId field 1218 and the FCS field 1219 are ignored on reception. The FCS (Octet4) field 1219 includes the frame check sequence (FCS) (see e.g., section 57B.1.1 of [IEEE802.3]).

2. Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include Multi-access Edge Computing (MEC); Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

Figure 14:
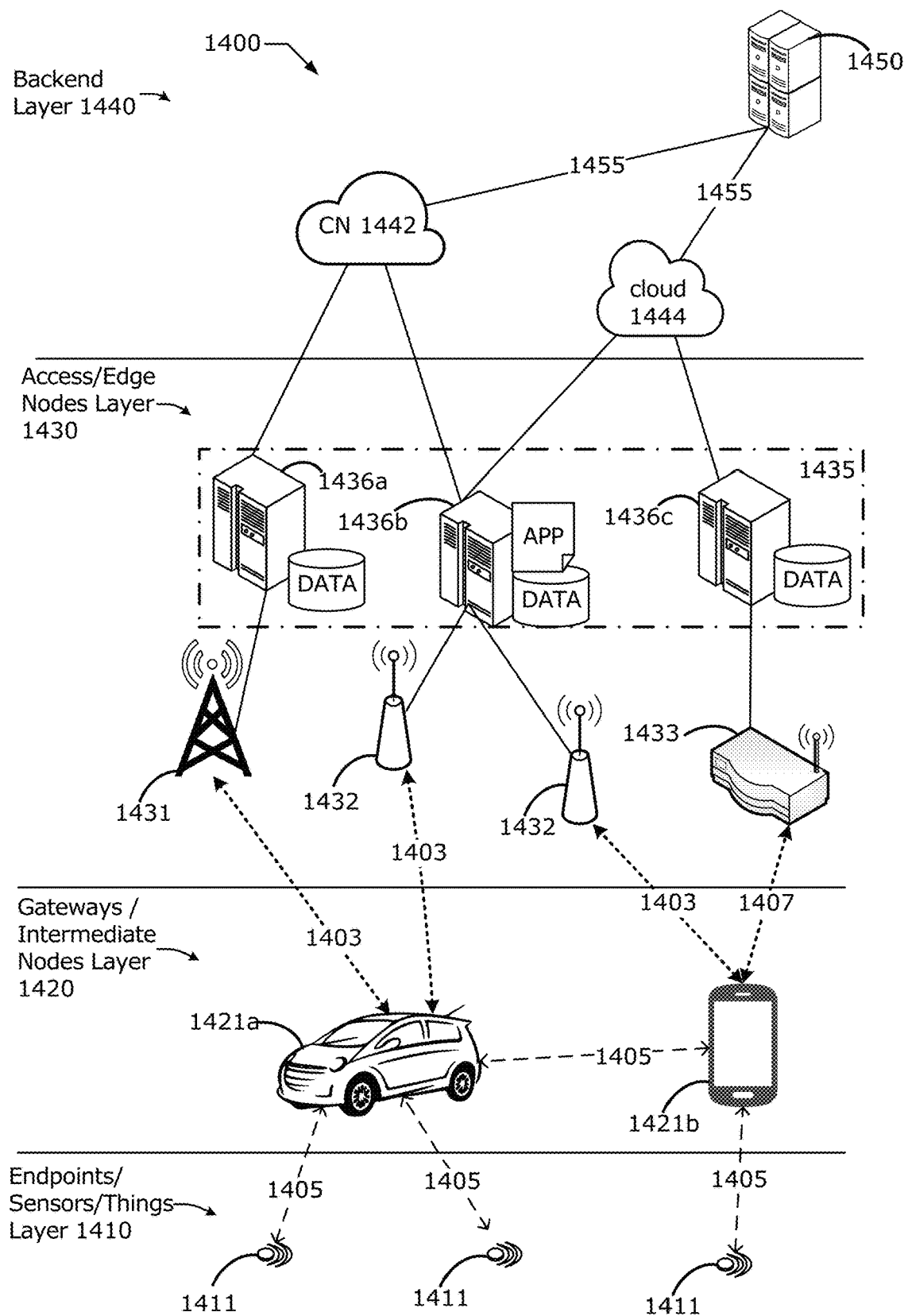
FIG. 14 illustrates an example edge computing environment.

FIG. 14 illustrates an example edge computing environment 1400. FIG. 14 specifically illustrates the different layers of communication occurring within the environment 1400, starting from endpoint sensors or things layer 1410 (e.g., operating in an Internet of Things (IoT) network topology) comprising one or more IoT devices 1411 (also referred to as edge endpoints 1410 or the like); increasing in sophistication to gateways or intermediate node layer 1420 comprising one or more user equipment (UEs) 1421a and 1421b (also referred to as nodes 1420 or the like), which facilitate the collection and processing of data from endpoints 1410; increasing in processing and connectivity sophistication to access node layer 1430 (or "edge node layer 1430") comprising a plurality of network access nodes (NANs) 1431, 1432, and 1433 (collectively referred to as "NANs 1431-1433" or the like) and a plurality of edge compute nodes 1436a-c (collectively referred to as "edge compute nodes 1436" or the like) within an edge computing system 1435; and increasing in connectivity and processing sophistication to a backend layer 1410 comprising core network (CN) 1442 and cloud 1444. The processing at the backend layer 1410 may be enhanced by network services as performed by one or more remote application (app) servers 1450 and/or other cloud services. Some or all of these elements may be equipped with or otherwise implement some or all features and/or functionality discussed herein. In some embodiments, any of the endpoints 1410, intermediate nodes 1420, access/edge nodes 1430, and/or backend nodes 1440 may be individual nodes 301 in a node chain 300 and/or be part of a TSN/TAN 100.

The environment 1400 is shown to include end-user devices, such as intermediate nodes 1420 and endpoints 1410, which are configured to connect to (or communicatively couple with) one or more multiple communication networks (also referred to as "access networks," "radio access networks," or the like) based on different access technologies (or "radio access technologies") for accessing application services. These access networks may include one or more of NANs 1431, 1432, and/or 1433. The NANs 1431-1433 are arranged to provide network connectivity to the end-user devices via respective links 1403, 1407 between the individual NANs and the one or more nodes 1421, 1411.

As examples, the communication networks and/or access technologies may include cellular technology such as LTE, MuLTEfire, and/or NR/5G (e.g., as provided by Radio Access Network (RAN) node 1431 and/or RAN nodes 1432), WiFi or wireless local area network (WLAN) technologies (e.g., as provided by access point (AP) 1433 and/or RAN nodes 1432), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 1420 include UE 1421a and UE 1421b (collectively referred to as "UE 1421" or "UEs 1421"). In this example, the UE 1421a is illustrated as a vehicle UE, and UE 1421b is illustrated as a smartphone (e.g., handheld touchscreen mobile computing device connectable to one or more cellular networks). However, these UEs 1421 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1410 include various nodes 1411, and consistent with the examples provided herein, a nodes 1411 may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud.

In some implementations, the nodes 1411 may be IoT devices (also referred to as "IoT devices 1411"), which are uniquely identifiable embedded computing devices (e.g., within the Internet infrastructure) that comprise a network access layer designed for low-power IoT applications utilizing short-lived UE connections. The IoT devices 1411 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1411 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1411 can utilize technologies such as M2M or MTC for exchanging data with an MTC server (e.g., a server 1450), an edge server 1436 and/or edge computing system 1435, or device via a PLMN, ProSe or D2D communication, sensor networks, or IoT networks. The M2M or MTC exchange of data may be a machine-initiated exchange of data.

The IoT devices 1411 may execute background applications (e.g., keep-alive messages, status updates, etc.) to facilitate the connections of the IoT network. Where the IoT devices 1411 are, or are embedded in, sensor devices, the IoT network may be a WSN. An IoT network describes an interconnection of IoT devices 1411, such as the IoT devices 1411 being connected to one another over respective direct links 1405. The IoT devices may include any number of different types of devices, grouped in various combinations (referred to as an "IoT group") that may include IoT devices that provide one or more services for a particular user, customer, organizations, etc. A service provider (e.g., an owner/operator of server 1450, CN 1442, and/or cloud 1444) may deploy the IoT devices in the IoT group to a particular area (e.g., a geolocation, building, etc.) in order to provide the one or more services. In some implementations, the IoT network may be a mesh network of IoT devices 1411, which may be termed a fog device, fog system, or fog, operating at the edge of the cloud 1444. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1444 to Things (e.g., IoT devices 1411). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 1430) and/or a central cloud computing service (e.g., cloud 1444) for performing heavy computations or computationally burdensome tasks. On the other hand, edge cloud computing consolidates human-operated, voluntary resources, as a cloud. These voluntary resource may include, inter-alia, intermediate nodes 1420 and/or endpoints 1410, desktop PCs, tablets, smartphones, nano data centers, and the like. In various implementations, resources in the edge cloud may be in one to two-hop proximity to the IoT devices 1411, which may result in reducing overhead related to processing data and may reduce network delay.

Additionally or alternatively, the fog may be a consolidation of IoT devices 1411 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 1444. The fog operating at the edge of the cloud 1444 may overlap or be subsumed into an edge network 1430 of the cloud 1444. The edge network of the cloud 1444 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1436 or edge devices). The Fog layer resides on top of the edge layer and is a consolidation of networking devices such as the intermediate nodes 1420 and/or endpoints 1410 of FIG. 14.

Data may be captured, stored/recorded, and communicated among the IoT devices 1411 or, for example, among the intermediate nodes 1420 and/or endpoints 1410 that have direct links 1405 with one another as shown by FIG. 14. Analysis of the traffic flow and control schemes may be implemented by aggregators that are in communication with the IoT devices 1411 and each other through a mesh network. The aggregators may be a type of IoT device 1411 and/or network appliance. In the example of FIG. 14, the aggregators may be edge nodes 1430, or one or more designated intermediate nodes 1420 and/or endpoints 1410. Data may be uploaded to the cloud 1444 via the aggregator, and commands can be received from the cloud 1444 through gateway devices that are in communication with the IoT devices 1411 and the aggregators through the mesh network. Unlike the traditional cloud computing model, in some implementations, the cloud 1444 may have little or no computational capabilities and only serves as a repository for archiving data recorded and processed by the fog. In these implementations, the cloud 1444 centralized data storage system and provides reliability and access to data by the computing resources in the fog and/or edge devices. Being at the core of the architecture, the Data Store of the cloud 1444 is accessible by both Edge and Fog layers of the aforementioned edge-fog network.

As mentioned previously, the access networks provide network connectivity to the end-user devices 1420, 1410 via respective NANs 1431-1433. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 1431, 1432. This virtualized framework allows the freed-up processor cores of the NANs 1431, 1432 to perform other virtualized applications, such as virtualized applications for various elements discussed herein.

The nodes 1421, 1411 may utilize respective connections (or channels) 1403, each of which comprises a physical communications interface or layer. The connections 1403 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the nodes 1421, 1411 and the NANs 1431-1433 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the nodes 1421, 1411 and NANs 1431-1433 may operate using LAA, enhanced LAA (eLAA), and/or further eLAA (feLAA) mechanisms. The nodes 1421, 1411 may further directly exchange communication data via respective direct links 1405, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual nodes 1410, 1420 provide radio information to one or more NANs 1431-1433 and/or one or more edge compute nodes 1436 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the nodes 1410, 1420 current location). As examples, the measurements collected by the nodes 1410, 1420 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio ($E_b/N_0$), energy per bit to interference power density ratio ($E_c/I_0$), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., The GNSS code phase (integer and fractional parts) of the spreading code of the $i^{th}$ GNSS satellite signal), GNSS carrier phase measurements (e.g., the number of carrier-phase cycles (integer and fractional parts) of the $i^{th}$ GNSS satellite signal, measured since locking onto the signal; also called Accumulated Delta Range (ADR)), channel interference measurement, thermal noise power measurement, received interference power measurement, clock/timing values of a local or reference clock, timing errors (e.g., such as those discussed herein), and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v16.2.0 (2021-03-31) ("[TS36214]"), 3GPP TS 38.215 v16.4.0 (2020-12) ("[TS38215]"), IEEE 802.11-2020, "IEEE Standard for Information Technology—Telecommunications and Information Exchange between Systems—Local and Metropolitan AreaNetworks—Specific Requirements—Part 11: Wireless LAN Medium Access Control (MAC) and Physical Layer (PHY) Specifications" (2021-02-26) ("[IEEE80211]"), [IEEE1588], [IEEE802.1AS], and/or the like. Additionally or alternatively, any of the aforementioned measurements (or combination of measurements) may be collected by one or more NANs 1431-1433 and provided to the edge compute node(s) 1436.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of PDU sessions requested to setup; number of PDU sessions successfully setup; number of PDU sessions failed to setup, etc.); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, etc.); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a node 1410, 1420, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (LIM); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements.

The radio information may be reported in response to a trigger event and/or on a periodic basis. Additionally or alternatively, individual nodes 1410, 1420 report radio information either at a low periodicity or a high periodicity depending on a data transfer that is to take place, and/or other information about the data transfer. Additionally or alternatively, the edge compute node(s) 1436 may request the measurements from the NANs 1431-1433 at low or high periodicity, or the NANs 1431-1433 may provide the measurements to the edge compute node(s) 1436 at low or high periodicity. Additionally or alternatively, the edge compute node(s) 1436 may obtain other relevant data from other edge compute node(s) 1436, core network functions (NFs), application functions (AFs), and/or other nodes 1410, 1420 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, etc.) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a hardware (HW) configuration/implementation or non-HW-specific, or may be based on various software parameters (e.g., OS type and version, etc.). Various configurations may be used to define any of the aforementioned data collection parameters. Such configurations may be defined by suitable specifications/standards, such as 3GPP, ETSI O-RAN, and/or any other like standards such as those discussed herein.

The UE 1421b is shown to be configured to access an access point (AP) 1433 via a connection 1407. In this example, the AP 1433 is shown to be connected to the Internet without connecting to the CN 1442 of the wireless system. The connection 1407 can comprise a local wireless connection, such as a connection consistent with any IEEE 802.11 protocol, wherein the AP 1433 would comprise a wireless fidelity (WiFi®) router. Additionally or alternatively, the UEs 1421 and IoT devices 1411 can be configured to communicate using suitable communication signals with each other or with any of the AP 1433 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1431 and 1432 that enable the connections 1403 may be referred to as "RAN nodes" or the like. The RAN nodes 1431, 1432 may comprise ground stations (e.g., terrestrial access points) or satellite stations providing coverage within a geographic area (e.g., a cell). The RAN nodes 1431, 1432 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1431 is embodied as a NodeB, evolved NodeB (eNB), or a next generation NodeB (gNB), and the RAN nodes 1432 are embodied as relay nodes, distributed units, or Road Side Unites (RSUs). Any other type of NANs can be used.

Any of the RAN nodes 1431, 1432 can terminate the air interface protocol and can be the first point of contact for the UEs 1421 and IoT devices 1411. Additionally or alternatively, any of the RAN nodes 1431, 1432 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. Additionally or alternatively, the nodes 1410, 1420 can be configured to communicate using OFDM communication signals with each other or with any of the NANs 1431, 1432 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the present disclosure is not limited in this respect.

For most cellular communication systems, the RAN function(s) operated by the RAN or individual NANs 1431-1432 organize downlink transmissions (e.g., from any of the RAN nodes 1431, 1432 to the nodes 1410, 1420) and uplink transmissions (e.g., from the nodes 1410, 1420 to RAN nodes 1431, 1432) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each node 1410, 1420 at each transmission time interval (TTI). A TTI is the duration of a transmission on a radio link 1403, 1405, and is related to the size of the data blocks passed to the radio link layer from higher network layers.

The NANs 1431/1432 may be configured to communicate with one another via respective interfaces or links (not shown), such as an X2 interface for LTE implementations (e.g., when CN 1442 is an Evolved Packet Core (EPC)), an Xn interface for 5G or NR implementations (e.g., when CN 1442 is an Fifth Generation Core (5GC)), or the like. The NANs 1431 and 1432 are also communicatively coupled to CN 1442. Additionally or alternatively, the CN 1442 may be an evolved packet core (EPC) network, a NextGen Packet Core (NPC) network, a 5G core (5GC), or some other type of CN. The CN 1442 may comprise a plurality of network elements, which are configured to offer various data and telecommunications services to customers/subscribers (e.g., users of UEs 1421 and IoT devices 1411) who are connected to the CN 1442 via a RAN. The components of the CN 1442 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 1442 may be referred to as a network slice, and a logical instantiation of a portion of the CN 1442 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1442 components/functions.

The CN 1442 is shown to be communicatively coupled to an application server 1450 and a network 1450 via an IP communications interface 1455. the one or more server(s) 1450 comprise one or more physical and/or virtualized systems for providing functionality (or services) to one or more clients (e.g., UEs 1421 and IoT devices 1411) over a network. The server(s) 1450 may include various computer devices with rack computing architecture component(s), tower computing architecture component(s), blade computing architecture component(s), and/or the like. The server(s) 1450 may represent a cluster of servers, a server farm, a cloud computing service, or other grouping or pool of servers, which may be located in one or more datacenters. The server(s) 1450 may also be connected to, or otherwise associated with one or more data storage devices (not shown). Moreover, the server(s) 1450 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1450 offer applications or services that use IP/network resources. As examples, the server(s) 1450 may provide traffic management services, cloud analytics, content streaming services, immersive gaming experiences, social networking and/or microblogging services, and/or other like services. In addition, the various services provided by the server(s) 1450 may include initiating and controlling software and/or firmware updates for applications or individual components implemented by the UEs 1421 and IoT devices 1411. The server(s) 1450 can also be configured to support one or more communication services (e.g., Voice-over-Internet Protocol (VoIP) sessions, PTT sessions, group communication sessions, social networking services, etc.) for the UEs 1421 and IoT devices 1411 via the CN 1442.

The Radio Access Technologies (RATs) employed by the NANs 1431-1433, the nodes 1410, 1420, and the other elements in FIG. 14 may include, for example, any of the communication protocols and/or RATs discussed herein. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.). These RATs may include one or more V2X RATs, which allow these elements to communicate directly with one another, with infrastructure equipment (e.g., NANs 1431-1433), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, IEEE 1609.0-2019, "IEEE Guide for Wireless Access in Vehicular Environments (WAVE) Architecture" (2019 Apr. 10) ("[IEEE16090]"), SAE Int'l, "V2X Communications Message Set Dictionary" (formerly "Dedicated Short Range Communication (DSRC) Message Set Dictionary") (2020 Jul. 23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018-03-02) ("[WiMAX]"). The term "DSRC"

refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020-01) (hereinafter "[EN302663]") and describes the access layer of the ITS-S reference architecture. The ITS-G5 access layer comprises [IEEE80211] (which now incorporates IEEE 802.11p) and IEEE 802.2 Logical Link Control (LLC) ("[IEEE8022]") and/or IEEE/ISO/IEC 8802-2-1998 protocols, as well as features for Decentralized Congestion Control (DCC) methods discussed in ETSI TS 102 687 V1.2.1 (2018-04) ("[TS102687]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03).

The cloud 1444 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1444 include application capabilities type, infrastructure capabilities type, and platform capabilities type. A cloud capabilities type is a classification of the functionality provided by a cloud service to a cloud service customer (e.g., a user of cloud 1444), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1444 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 1444 may represent one or more cloud servers, application servers, web servers, and/or some other remote infrastructure. The remote/cloud servers may include any one of a number of services and capabilities such as, for example, any of those discussed herein.

Additionally or alternatively, the cloud 1444 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 1444 may be a network that comprises computers, network connections among the computers, and software routines to enable communication between the computers over network connections. In this regard, the cloud 1444 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1444 may be via a wired or a wireless connection using the various communication protocols discussed infra. More than one network may be involved in a communication session between the illustrated devices. Connection to the cloud 1444 may require that the computers execute software routines which enable, for example, the seven layers of the OSI model of computer networking or equivalent in a wireless (cellular) phone network. Cloud 1444 may be used to enable relatively long-range communication such as, for example, between the one or more server(s) 1450 and one or more UEs 1421 and IoT devices 1411. Additionally or alternatively, the cloud 1444 may represent the Internet, one or more cellular networks, local area networks, or wide area networks including proprietary and/or enterprise networks, TCP/Internet Protocol (IP)-based network, or combinations thereof. In these implementations, the cloud 1444 may be associated with network operator who owns or controls equipment and other elements necessary to provide network-related services, such as one or more base stations or access points, one or more servers for routing digital data or telephone calls (e.g., a core network or backbone network), etc. The backbone links 1455 may include any number of wired or wireless technologies, and may be part of a LAN, a WAN, or the Internet. In one example, the backbone links 1455 are fiber backbone links that couple lower levels of service providers to the Internet, such as the CN 1412 and cloud 1444.

The edge compute nodes 1436 may include or be part of an edge system 1435 (or edge network 1435). The edge compute nodes 1436 may also be referred to as "edge hosts 1436" or "edge servers 1436." The edge system 1435 includes a collection of edge servers 1436 (e.g., MEC hosts/servers) and edge management systems (not shown by FIG. 14) necessary to run edge computing applications (e.g., MEC Apps) within an operator network or a subset of an operator network. The edge servers 1436 are physical computer systems that may include an edge platform (e.g., MEC platform) and/or virtualization infrastructure (VI), and provide compute, storage, and network resources to edge computing applications. Each of the edge servers 1436 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1420 and/or endpoints 1410. The VI of the edge servers 1436 provide virtualized environments and virtualized resources for the edge hosts, and the edge computing applications may run as VMs and/or application containers on top of the VI. One example implementation of the edge system 1435 is a MEC system 1435. It should be understood that the disclosed MEC systems and services deployment examples are only one illustrative example of edge computing systems/networks 1435, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

As shown by FIG. 14, each of the NANs 1431, 1432, and 1433 are co-located with edge compute nodes (or "edge servers") 1436*a*, 1436*b*, and 1436*c*, respectively. These implementations may be small-cell clouds (SCCs) where an edge compute node 1436 is co-located with a small cell (e.g., pico-cell, femto-cell, etc.), or may be mobile micro clouds (MCCs) where an edge compute node 1436 is co-located with a macro-cell (e.g., an eNB, gNB, etc.). The edge compute node 1436 may be deployed in a multitude of arrangements other than as shown by FIG. 14. In a first example, multiple NANs 1431-1433 are co-located or otherwise communicatively coupled with one edge compute node 1436. In a second example, the edge servers 1436 may be co-located or operated by RNCs, which may be the case for legacy network deployments, such as 3G networks. In a third example, the edge servers 1436 may be deployed at cell aggregation sites or at multi-RAT aggregation points that can be located either within an enterprise or used in public coverage areas. In a fourth example, the edge servers 1436 may be deployed at the edge of CN 1442. These implementations may be used in follow-me clouds (FMC), where cloud services running at distributed data centers follow the UEs 1421 as they roam throughout the network.

In any of the implementations discussed herein, the edge servers 1436 provide a distributed computing environment for application and service hosting, and also provide storage and processing resources so that data and/or content can be processed in close proximity to subscribers (e.g., users of nodes 1410, 1420) for faster response times The edge servers 1436 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1436 from the nodes 1410, 1420, CN 1442, cloud 1444, and/or server(s) 1450, or vice versa. For example, a device application or client application operating in a node 1410, 1420 may offload application tasks or workloads to one or more edge servers 1436. In another example, an edge server 1436 may offload application tasks or workloads to one or more nodes 1410, 1420 (e.g., for distributed ML computation or the like).

An example edge computing configuration includes a layer of processing referred to as an "edge cloud". The edge cloud is co-located at an edge location, such as aNAN 1431-1433, a local processing hub, or a central office, and thus may include multiple entities, devices, and equipment instances. The edge cloud is located much closer to the endpoint (consumer and producer) data sources (e.g., node 1410, 1420 including autonomous vehicles, business and industrial equipment, video capture devices, drones, smart cities and building devices, sensors and IoT devices, etc.) than a cloud data center (e.g., cloud 1444, server(s) 1450, etc.). Compute, memory, and storage resources which are offered at the edges in the edge cloud are critical to providing ultra-low latency response times for services and functions used by the endpoint data sources as well as reduce network backhaul traffic from the edge cloud toward cloud data center, thus, improving energy consumption and overall network usages among other benefits. In some embodiments, any of the data sources, edge cloud entities/elements, central office, and/or cloud/data center elements may be individual nodes 301 in a node chain 300 and/or be part of a TSN/TAN 100.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources. Aspects of an edge cloud architecture covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

As such, the edge cloud is formed from network components and functional features operated by and within edge gateway nodes, edge aggregation nodes, or other edge compute nodes among various network layers. The edge cloud, thus, may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud may be servers, multi-tenant servers, appliance computing devices, and/or any other type of computing devices. For example, the edge cloud may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 16. The edge cloud may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

FIG. 16 illustrates an example of components that may be present in a computing node 1650 for implementing the techniques (e.g., operations, processes, methods, and methodologies) described herein. The compute node 1650 provides a closer view of the respective components of node 1600 when implemented as or as part of a computing device (e.g., as a mobile device, a base station, server, gateway, etc.). The compute node 1650 may include any combinations of the hardware or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, hardware, hardware accelerators, software, firmware, or a combination thereof adapted in the compute node 1650, or as components otherwise incorporated within a chassis of a larger system.

In some embodiments, compute node 1650 may be individual nodes 301 in a node chain 300 and/or otherwise be part of a TSN/TAN 100. The compute node 1650 may be embodied as a type of device, appliance, computer, or other "thing" capable of communicating with other edge, networking, or endpoint components. For example, compute node 1650 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 1650 includes processing circuitry in the form of one or more processors 1652. The processor circuitry 1652 includes circuitry such as, but not limited to one or more processor cores and one or more of cache memory, low drop-out voltage regulators (LDOs), interrupt controllers, serial interfaces such as SPI, I$^2$C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1652 may include one or more hardware accelerators (e.g., same or similar to acceleration circuitry 1664), which may be microprocessors, programmable processing devices (e.g., FPGA, ASIC, etc.), or the like. The one or more accelerators may include, for example, computer vision and/or deep learning accelerators. In some implementations, the processor circuitry 1652 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1652 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special purpose processing unit and/or specialized processing unit, or any other known processing elements, or any suitable combination thereof. In some implementations, the processor circuitry 1652 may be embodied as a specialized x-processing unit (xPU) also known as a data processing unit (DPU), infrastructure processing unit (IPU), or network processing unit (NPU). An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or AI hardware (e.g., GPUs or programmed FPGAs). The xPU may be designed to receive programming to process one or more data streams and perform specific tasks and actions for the data streams (e.g., hosting microservices, performing service management or orchestration, organizing or managing server or data center hardware, managing service meshes, or collecting and distributing telemetry), outside of a CPU or general purpose processing hardware. However, an xPU, a SoC, a CPU, and other variations of the processor circuitry 1652 may work in coordination with each other to execute many types of operations and instructions within and on behalf of the compute node 1650.

The processors (or cores) 1652 may be coupled with or may include memory/storage and may be configured to execute instructions stored in the memory/storage to enable various applications or operating systems to run on the platform 1650. The processors (or cores) 1652 is configured to operate application software to provide a specific service to a user of the platform 1650. Additionally or alternatively, the processor(s) 1652 may be a special-purpose processor(s)/controller(s) configured (or configurable) to operate according to the elements, features, and implementations discussed herein.

As examples, the processor(s) 1652 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, Calif. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1652 may be a part of a system on a chip (SoC), System-in-Package (SiP), a multi-chip package (MCP), and/or the like, in which the processor(s) 1652 and other components are formed into a single integrated circuit, or a single package, such as the Edison™ or Galileo™ SoC boards from Intel® Corporation. Other examples of the processor(s) 1652 are mentioned elsewhere in the present disclosure.

The processor(s) 1652 may communicate with system memory 1654 over an interconnect (IX) 1656. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1658 may also couple to the processor 1652 via the IX 1656. In an example, the storage 1658 may be implemented via a solid-state disk drive (SSDD) and/or high-speed electrically erasable memory (commonly referred to as "flash memory"). Other devices that may be used for the storage 1658 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1654 and/or storage circuitry 1658 may also incorporate three-dimensional (3D) cross-point (XPOINT) memories from Intel® and Micron®.

In low power implementations, the storage 1658 may be on-die memory or registers associated with the processor 1652. However, in some examples, the storage 1658 may be implemented using a micro hard disk drive (HDD). Further, any number of new technologies may be used for the storage 1658 in addition to, or instead of, the technologies described, such resistance change memories, phase change memories, holographic memories, or chemical memories, among others.

The components of edge computing device 1650 may communicate over an interconnect (IX) 1656. The IX 1656 may represent any suitable type of connection or interface such as, for example, metal or metal alloys (e.g., copper, aluminum, etc.), fiber, and/or the like. The IX 1656 may include any number of IX, fabric, and/or interface technologies, including instruction set architecture (ISA), extended ISA (eISA), Inter-Integrated Circuit (I$^2$C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, Hyper-Transport IXs, NVLink provided by NVIDIA®, a Time-Trigger Protocol (TTP) system, a FlexRay system, PROFI-BUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 1656 may be a proprietary bus, for example, used in a SoC based system.

The IX 1656 couples the processor 1652 to communication circuitry 1666 for communications with other devices, such as a remote server (not shown) and/or the connected edge devices 1662. The communication circuitry 1666 is a hardware element, or collection of hardware elements, used to communicate over one or more networks (e.g., cloud 1663) and/or with other devices (e.g., edge devices 1662).

The transceiver 1666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1666 (or multiple transceivers) may communicate using multiple standards or radios for communications at a different range. For example, the compute node 1650 may communicate with close devices, e.g., within about 10 meters, using a local transceiver based on BLE, or another low power radio, to save power. More distant connected edge devices 1662, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1666 (e.g., a radio transceiver) may be included to communicate with devices or services in the edge cloud 1663 via local or wide area network protocols. The wireless network transceiver 1666 may be an LPWA transceiver that follows the IEEE 802.15.4, or IEEE 802.15.4g standards, among others. The compute node 1663 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1666, as described herein. For example, the transceiver 1666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1666 may include radios that are compatible with any number of 3GPP specifications, such as LTE and 5G/NR communication systems, discussed in further detail at the end of the present disclosure. A network interface controller (NIC) 1668 may be included to provide a wired communication to nodes of the edge cloud 1663 or to other devices, such as the connected edge devices 1662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 1668 may be included to enable connecting to a second network, for example, a first NIC 1668 providing communications to the cloud over Ethernet, and a second NIC 1668 providing communications to other devices over another type of network.

Given the variety of types of applicable communications from the device to another component or network, applicable communications circuitry used by the device may include or be embodied by any one or more of components 1664, 1666, 1668, or 1670. Accordingly, in various examples, applicable means for communicating (e.g., receiving, transmitting, etc.) may be embodied by such communications circuitry.

The compute node 1650 may include or be coupled to acceleration circuitry 1664, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1664 may comprise logic blocks or logic fabric and other interconnected resources that may be programmed (configured) to perform various functions, such as the procedures, methods, functions, etc. discussed herein. In such implementations, the acceleration circuitry 1664 may also include memory cells (e.g., EPROM, EEPROM, flash memory, static memory (e.g., SRAM, anti-fuses, etc.) used to store logic blocks, logic fabric, data, etc. in LUTs and the like.

The IX 1656 also couples the processor 1652 to a sensor hub or external interface 1670 that is used to connect additional devices or subsystems. The additional/external devices may include sensors 1672, actuators 1674, and positioning circuitry 1675.

The sensor circuitry 1672 includes devices, modules, or subsystems whose purpose is to detect events or changes in its environment and send the information (sensor data) about the detected events to some other a device, module, subsystem, etc. Examples of such sensors 1672 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1650); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1674, allow platform 1650 to change its state, position, and/or orientation, or move or control a mechanism or system. The actuators 1674 comprise electrical and/or mechanical devices for moving or controlling a mechanism or system, and converts energy (e.g., electric current or moving air and/or liquid) into some kind of motion. The actuators 1674 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1674 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 1650 may be configured to operate one or more actuators 1674 based on one or more captured events and/or instructions or control signals received from a service provider and/or various client systems.

The positioning circuitry 1675 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1675 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1675 may include a Micro-Technology for Positioning, Navigation, and Timing (Micro-PNT) IC that uses a master timing clock to perform position tracking/estimation without GNSS assistance. The positioning circuitry 1675 may also be part of, or interact with, the communication circuitry 1666 to communicate with the nodes and components of the positioning network. The positioning circuitry 1675 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1675 is, or includes an INS, which is a system or device that uses sensor circuitry 1672 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 1650 without the need for external references.

In some optional examples, various input/output (I/O) devices may be present within or connected to, the compute node 1650, which are referred to as input circuitry 1686 and output circuitry 1684 in FIG. 16. The input circuitry 1686 and output circuitry 1684 include one or more user interfaces designed to enable user interaction with the platform 1650 and/or peripheral component interfaces designed to enable peripheral component interaction with the platform 1650. Input circuitry 1686 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1684 may be included to show information or otherwise convey information, such as sensor readings, actuator position(s), or other like information. Data and/or graphics may be displayed on one or more user interface components of the output circuitry 1684. Output circuitry 1684 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 1650. The output circuitry 1684 may also include speakers or other audio emitting devices, printer(s), and/or the like. Additionally or alternatively, the sensor circuitry 1672 may be used as the input circuitry 1684 (e.g., an image capture device, motion capture device, or the like) and one or more actuators 1674 may be used as the output device circuitry 1684 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1676 may power the compute node 1650, although, in examples in which the compute node 1650 is mounted in a fixed location, it may have a power supply coupled to an electrical grid, or the battery may be used as a backup or for temporary capabilities. The battery 1676 may be a lithium ion battery, or a metal-air battery, such as a zinc-air battery, an aluminum-air battery, a lithium-air battery, and the like.

A battery monitor/charger 1678 may be included in the compute node 1650 to track the state of charge (SoCh) of the battery 1676, if included. The battery monitor/charger 1678 may be used to monitor other parameters of the battery 1676 to provide failure predictions, such as the state of health (SoH) and the state of function (SoF) of the battery 1676. The battery monitor/charger 1678 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1678 may communicate the information on the battery 1676 to the processor 1652 over the IX 1656. The battery monitor/charger 1678 may also include an analog-to-digital (ADC) converter that enables the processor 1652 to directly monitor the voltage of the battery 1676 or the current flow from the battery 1676. The battery parameters may be used to determine actions that the compute node 1650 may perform, such as transmission frequency, mesh network operation, sensing frequency, and the like.

A power block 1680, or other power supply coupled to a grid, may be coupled with the battery monitor/charger 1678 to charge the battery 1676. In some examples, the power block 1680 may be replaced with a wireless power receiver to obtain the power wirelessly, for example, through a loop antenna in the compute node 1650. A wireless battery charging circuit, such as an LTC4020 chip from Linear Technologies of Milpitas, Calif., among others, may be included in the battery monitor/charger 1678. The specific charging circuits may be selected based on the size of the battery 1676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1658 may include instructions 1683 in the form of software, firmware, or hardware commands to implement the techniques described herein. Although such instructions 1682, 1683 are shown as code blocks included in the memory 1654 and the storage 1658, any of the code blocks 1682, 1683 may be replaced with hardwired circuits, for example, built into an application specific integrated circuit (ASIC) or programmed into an FPGA, or the like.

In an example, the instructions 1681, 1682, 1683 provided via the memory 1654, the storage 1658, or the processor 1652 may be embodied as a non-transitory machine-readable medium (NTMRM) 1660 including code to direct the processor 1652 to perform electronic operations in the compute node 1650. The processor 1652 may access the NTMRM 1660 over the IX 1656. For instance, the NTMRM 1660 may be embodied by devices described for the storage 1658 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTMRM 1660 may include instructions to direct the processor 1652 to perform a specific sequence or flow of actions, for example, as described with respect to the flowchart(s) and block diagram (s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Computer program code for carrying out operations of the present disclosure (e.g., computational logic and/or instructions 1681, 1682, 1683) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 1681, 1682, 1683 for carrying out operations of the present disclosure may also be written in any combination of the programming languages discussed herein. The program code may execute entirely on the system 1650, partly on the system 1650, as a stand-alone software package, partly on the system 1650 and partly on a remote computer or entirely on the remote computer or server. In the latter scenario, the remote computer may be connected to the system 1650 through any type of network, including a LAN or WAN, or the connection may be made to an external computer (e.g., through the Internet using an Internet Service Provider).

In an example, the instructions 1681, 1682, 1683 on the processor circuitry 1652 (separately, or in combination with the instructions 1681, 1682, 1683) may configure execution or operation of a trusted execution environment (TEE) 1690. The TEE 1690 operates as a protected area accessible to the processor circuitry 1602 to enable secure access to data and secure execution of instructions. In some embodiments, the TEE 1690 may be a physical hardware device that is separate from other components of the system 1650 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1690 may be implemented as secure enclaves, which are isolated regions of code and/or data within the processor and/or memory/storage circuitry of the system 1650. Only code executed within a secure enclave may access data within the same secure enclave, and the secure enclave may only be accessible using the secure application (which may be implemented by an application processor or a tamper-resistant microcontroller). Various implementations of the TEE 1690, and an accompanying secure area in the processor circuitry 1652 or the memory circuitry 1654 and/or storage circuitry 1658 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1600 through the TEE 1690 and the processor circuitry 1652. Additionally or alternatively, the memory circuitry 1654 and/or storage circuitry 1658 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1604 and/or storage circuitry 1608 may be divided into one or more trusted memory regions for storing applications or software modules of the TEE 1690.

The compute node 1650 also includes clock circuitry 1692, which is a device (or collection of devices) that tracks the passage of time. In some implementations, the clock circuitry 1692 may be an atomic clock and/or a clock generator (electronic oscillator and/or timing-signal generator). In clock generator implementations, the clock circuitry 1692 may include resonant circuitry (e.g., crystal oscillator or the like) and amplifier circuitry to invert the signal from the resonant circuitry and feed a portion back into the resonant circuitry to maintain oscillation.

The crystal oscillator includes a piezoelectric resonator such as quartz, polycrystalline ceramics, thin-film resonators, and/or the like. Where crystal units are used, the clock circuitry 1692 may also include an oscillation circuit separate from the crystal clock. Where crystal oscillators are used, the crystal unit and oscillation circuit may be integrated into a single package or integrated circuit. Examples of such clock circuitry 1692 include crystal clocks (Y), crystal oscillators (XOs), calibrated dual XO (CDXO), microcomputer-compensated crystal oscillator (MCXO), oven controlled XOs (OCXOs), double OCXOs (DOCXOs), temperature-compensated crystal oscillator crystal oscillators (TCXOs), tactical miniature crystal oscillator (TMXO), temperature-sensing crystal oscillator (TSXO), voltage controlled XOs (VCXOs), and/or other suitable clocks and/or variants and/or combinations thereof. Any of the aforementioned crystal clocks and/or XOs may be formed from a suitable material such as quartz, rubidium (e.g., rubidium crystal oscillators (RbXO)), cesium (e.g., cesium beam atomic clocks), and/or other suitable materials and/or variants and/or combinations thereof.

The clock circuitry 1692 is configured to create a signal with a relatively precise frequency, which may be used by other components such as for example, keeping track of time, providing a clock signal for digital circuits, stabilizing frequencies for transmitters and receivers, and/or the like. In some implementations, the clock circuitry 1692 may be a stand-alone component (e.g., separate from the other components of compute node 1650), or may be part of another component (e.g., processor circuitry 1652 positioning circuitry 1675, and/or the like). Additionally or alternatively, the clock circuitry 1692 can be synchronized with a synchronization source. In one example, a timing indicated by GNSS signals (e.g., as provided by positioning circuitry 1675) can be used as a synchronization source in deployment scenarios where global synchronization is desired. Additionally or alternatively, a network time (or timing) can be used as a synchronization source in deployment scenarios where network-based synchronization is desired. Additionally or alternatively, a longwave radio clock or radio-controlled clock may be used as a synchronization source, where a dedicated terrestrial longwave radio transmitter connected to a time standard (e.g., an atomic clock) transmits a time code that is demodulated and decoded to determine the current time. Additionally or alternatively, a GM instance may be used as a synchronization source as described previously. Any combination of the previous synchronization sources may be used. Additionally or alternatively, any of the aforementioned synchronization sources as a primary synchronization source, and another one or more of the aforementioned synchronization sources can be used as secondary or fallback synchronization sources that is/are used when the primary synchronization source is unavailable. Additionally or alternatively, the clock circuitry 1692 may be configured with priority information for different synchronization sources, where each a highest priority synchronization source is used when available. The synchronization configuration may be signaled to, and provisioned in, the clock circuitry 1692 (via the communication circuitry).

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

FIG. 16 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

Figure 15:
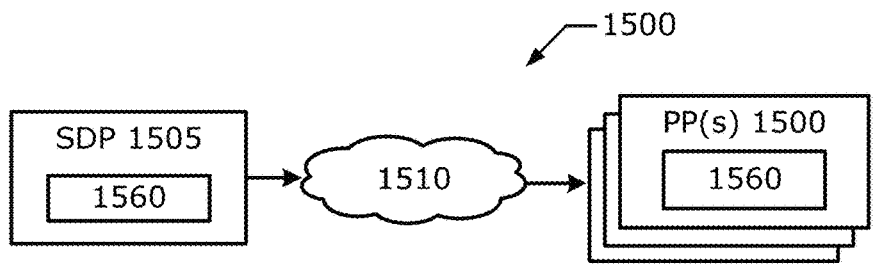
FIG. 15 illustrates an example software distribution platform.

FIG. 15 illustrates an example software (SW) distribution platform (SDP) 1505 to distribute software 1560, such as the example computer readable instructions 1681, 1682, 1683 of FIG. 16, to one or more devices, such as example processor platform(s) (pp) 1500 and/or example connected edge devices 1662 (see e.g., FIG. 16) and/or any of the other computing systems/devices discussed herein. The SDP 1505 may be implemented by any computer server, data facility, cloud service, etc., capable of storing and transmitting software to other computing devices (e.g., third parties, the example connected edge devices 1662 of FIG. 16). Example connected edge devices may be customers, clients, managing devices (e.g., servers), third parties (e.g., customers of an entity owning and/or operating the SDP 1505). Example connected edge devices may operate in commercial and/or home automation environments. In some examples, a third party is a developer, a seller, and/or a licensor of software such as the example computer readable media 1681, 1682, 1683 of FIG. 16. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In FIG. 15, the SDP 1505 includes one or more servers (referred to as "servers 1505") and one or more storage devices (referred to as "storage 1505"). The storage 1505 store the computer readable instructions 1560, which may correspond to the instructions 1681, 1682, 1683 of FIG. 16. The servers 1505 are in communication with a network 1510, which may correspond to any one or more of the Internet and/or any of the example networks as described herein. The servers 1505 are responsive to requests to transmit the software to a requesting party as part of a commercial transaction. Payment for the delivery, sale and/or license of the software may be handled by the servers 1505 and/or via a third-party payment entity. The servers 1505 enable purchasers and/or licensors to download the computer readable instructions 1560 from the SDP 1505. For example, the software 1560 may be downloaded to the pp 1500, which is/are to execute the computer readable instructions 1560 to implement time synchronization techniques discussed herein.

The servers 1505 are communicatively connected to one or more security domains and/or security devices through which requests and transmissions of the example computer readable instructions 1560 must pass. Additionally or alternatively, the servers 1505 periodically offer, transmit, and/or force updates to the software 1560 to ensure improvements, patches, updates, etc. are distributed and applied to the software at the end user devices. The computer readable instructions 1560 are stored on storage 1505 in a particular format. A format of computer readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.), and/or any other format such as those discussed herein. In some examples, the computer readable instructions 1560 stored in the SDP 1505 are in a first format when transmitted to the pp 1500. Additionally or alternatively, the first format is an executable binary in which particular types of the pp 1500 can execute. Additionally or alternatively, the first format is uncompiled code that requires one or more preparation tasks to transform the first format to a second format to enable execution on the pp

1500. For example, the receiving pp 1500 may need to compile the computer readable instructions 1560 in the first format to generate executable code in a second format that is capable of being executed on the pp 1500. Additionally or alternatively, the first format is interpreted code that, upon reaching the pp 1500, is interpreted by an interpreter to facilitate execution of instructions.

3. Example Implementations

Figure 13:
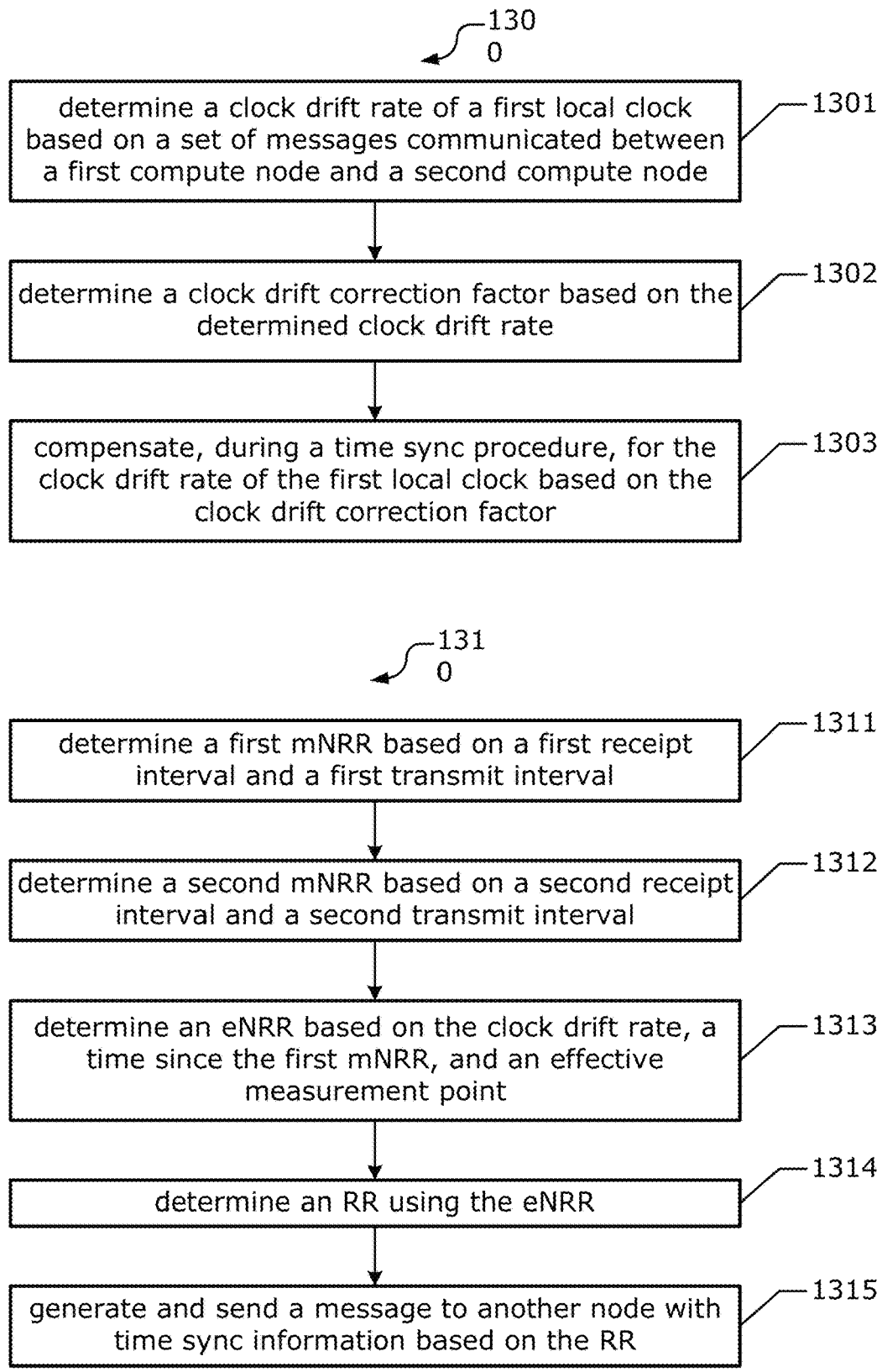
FIG. 13 depicts example processes for practicing the various embodiments discussed herein.

FIG. 13 depicts example procedure 1300 for synchronizing a first local clock of a first compute node in a time-aware network. Procedure 1300 begins at operation 1301 where the first compute node determines a clock drift rate (DR) of the first local clock based on a set of messages communicated between the first compute node and a second compute node. The clock drift rate is a frequency at which the first local clock diverges from another clock at another compute node such as a GM clock or a second clock of the second compute node. The clock drift rate may be determined based on a first mNRR, a second mNRR, and an amount of time since the first mNRR was measured. At operation 1302, the first compute node determines a clock drift correction factor based on the determined clock drift rate. At operation 1303, the first compute node compensates, during a time synchronization (sync) procedure, for the clock drift rate of the first local clock based on the clock drift correction factor.

FIG. 13 also depicts an example procedure 1310 for determining the clock drift rate. Procedure 1310 begins at operation 1301 where the first compute node determines a first mNRR based on a first receipt interval and a first transmit interval. The first receipt interval is based on a value of the first local clock when a first message of the set of messages is received at the first compute node and a value of the first local clock when a second message of the set of messages is received at the first compute node. The first transmit interval is based on a value of the second local clock when the first message is transmitted and a value of the second local clock when the second message is transmitted.

At operation 1312, the first compute node determines a second mNRR based on a second receipt interval and a second transmit interval. The second receipt interval is based on the value of the first local clock when the second message is received at the first compute node and a value of the first local clock when a third message of the set of messages is received at the first compute node. The second transmit interval is based on the value of the second local clock when the second message is transmitted and a value of the second local clock when the third message is transmitted At operation 1313, the first compute node determines an estimated NRR (eNRR) based on the clock drift rate, the amount of time since the first mNRR was measured, an effective measurement point (EMP), and the first mNRR. The EMP is a time within the first transmit interval or the first receipt interval. Additionally or alternatively, the first compute node determines the eNRR based on the clock drift rate, the amount of time since the second mNRR was measured, the EMP, and the second mNRR, wherein the EMP is a time within the second transmit interval or the second receipt interval. At operation 1314, the first compute node determines an RR using the eNRR. The RR may be calculated as a product of an RR of the second compute node, the eNRR, and the clock drift correction factor. At operation 1314, the first compute node generates another message to include a residence time of the first compute node, and sends the other message to a third compute node in the time-aware network, wherein the residence time is calculated based on the RR. The first compute node.

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example A01 includes a method for synchronizing a first local clock of a first compute node in a time-aware network, the method comprising: determining, by the first compute node, a clock drift rate of the first local clock based on a set of messages communicated between the first compute node and a second compute node, wherein the clock drift rate is a frequency at which the first local clock diverges from another clock at another compute node; determining, by the first compute node, a clock drift correction factor based on the determined clock drift rate; and compensating, by the first compute node during a time synchronization (sync) procedure, for the clock drift rate of the first local clock based on the clock drift correction factor.

Example A02 includes the method of example A01 and/or some other example(s) herein, wherein the determining the clock drift rate comprises: determining, by the first compute node, the clock drift rate based on a first measured neighbor rate ratio (mNRR), a second mNRR, and an amount of time since the first mNRR was measured.

Example A03 includes the method of example A02 and/or some other example(s) herein, wherein the determining the clock drift rate further comprises: determining, by the first compute node, a receipt interval based on a value of the first local clock when a first message of the set of messages is received at the first compute node and a value of the first local clock when a second message of the set of messages is received at the first compute node; determining, by the first compute node, a transmit interval based on a value of a second local clock when the first message is transmitted and a value of the second local clock when the second message is transmitted; and determining, by the first compute node, the first mNRR based on the receipt interval and the transmit interval.

Example A04 includes the method of example A03 and/or some other example(s) herein, wherein the receipt interval is a first receipt interval, the transmit interval is a first transmit interval, and the determining the clock drift rate further comprises: determining, by the first compute node, a second receipt interval based on the value of the first local clock when the second message is received at the first compute node and a value of the first local clock when a third message of the set of messages is received at the first compute node; determining, by the first compute node, a second transmit interval based on the value of the second local clock when the second message is transmitted and a value of the second local clock when the third message is transmitted; and determining, by the first compute node, the second mNRR based on the second receipt interval and the second transmit interval.

Example A05 includes the method of example A04 and/or some other example(s) herein, wherein: the first mNRR is a ratio of a frequency of the second local clock to a frequency of the first local clock during the first receipt interval or the first transmit interval; and the second mNRR is a ratio of the frequency of the second local clock to the frequency of the first local clock during the second receipt interval or the second transmit interval.

Example A06 includes the method of examples A02-A05 and/or some other example(s) herein, wherein the determining the clock drift rate further comprises: determining a quotient of a combination of the first mNRR and the second mNRR to the amount of time since the first mNRR was measured.

Example A07 includes the method of examples A04-A06 and/or some other example(s) herein, wherein the compensating for the clock drift rate comprises: determining an effective measurement point (EMP), the EMP being a time within the first transmit interval or the first receipt interval; and determining an estimated NRR (eNRR) based on the clock drift rate, the amount of time since the first mNRR was measured, the EMP, and the first mNRR.

Example A08 includes the method of examples A04-A06 and/or some other example(s) herein, wherein the compensating for the clock drift rate comprises: determining an EMP, the EMP being a time within the second transmit interval or the second receipt interval; and determining an eNRR based on the clock drift rate, the amount of time since the second mNRR was measured, the EMP, and the second mNRR.

Example A09 includes the method of example A07 or A08 and/or some other example(s) herein, further comprising: determining, by the first compute node, a rate ratio (RR) using the eNRR, wherein the RR is a measured ratio of the frequency of the first local clock to a frequency of a grandmaster (GM) clock.

Example A10 includes the method of example A09 and/or some other example(s) herein, the determining the RR further comprises: determining, by the first compute node, the RR as a product of an RR of the second compute node, the eNRR, and the clock drift correction factor.

Example A11 includes the method of example A10 and/or some other example(s) herein, further comprising: generating, by the first compute node, another message to be sent to a third compute node in the time-aware network; and inserting, by the first compute node, a residence time into a correction field of the other message, wherein the residence time is calculated based on the RR.

Example A12 includes the method of examples A01-A11 and/or some other example(s) herein, wherein the determining the clock drift correction factor comprises: determining, by the first compute node, the clock drift correction factor as a product of the clock drift rate and the amount of time since the first mNRR was measured.

Example A13 includes the method of examples A03-A12 and/or some other example(s) herein, wherein the other compute node is the second compute node, and the other clock is a second local clock local to the second compute node.

Example A14 includes the method of examples A02-A13 and/or some other example(s) herein, wherein the amount of time since the first mNRR was measured is a path delay interval.

Example A15 includes the method of examples A01-A14 and/or some other example(s) herein, wherein the set of messages include messages for measuring link delay between the first and second compute nodes, or the set of messages include messages for synchronizing the first local clock during the time sync procedure.

Example A16 includes the method of examples A01-A14 and/or some other example(s) herein, wherein each of the set of messages are path delay response messages generated during a two-step peer-to-peer (P2P) path delay algorithm employed by a full-duplex Ethernet local area network (LAN).

Example A17 includes the method of examples A01-A14 and/or some other example(s) herein, wherein each of the set of messages are timing measurement (TM) frames and corresponding acknowledgement (Ack) frames generated during a TM procedure or a fine TM (FTM) procedure defined by an IEEE 802.11 standard.

Example A18 includes the method of examples A01-A14 and/or some other example(s) herein, wherein each of the set of messages are gate messages and register request messages generated during an Ethernet Passive Optical Network (EPON) procedure defined by an IEEE 802.3 standard.

Example A19 includes the method of examples A16-A18 and/or some other example(s) herein, wherein the path delay response messages, the TM frames, the Ack frames, the gate messages, and the register request messages are coordinated shared network (CSNs) messages.

Example A20 includes the method of examples A01-A19 and/or some other example(s) herein, wherein the first compute node and the second compute node are individual precision time protocol (PTP) instances.

Example A21 includes the method of example A20 and/or some other example(s) herein, wherein the first compute node is a first PTP relay instance and the second compute node is a second PTP relay instance.

Example A22 includes the method of example A20 and/or some other example(s) herein, wherein the first compute node is a PTP relay instance and the second compute node is a GM PTP instance.

Example Z01 includes one or more computer readable media comprising instructions, wherein execution of the instructions by processor circuitry is to cause the processor circuitry to perform the method of any one of examples A01-A22 and/or some other example(s) herein.

Example Z02 includes computer program comprising the instructions of example Z01 and/or some other example (s) herein.

Example Z03 includes an Application Programming Interface defining functions, methods, variables, data structures, and/or protocols for the computer program of example Z02 and/or some other example(s) herein.

Example Z04 includes an apparatus comprising circuitry loaded with the instructions of example Z01 and/or some other example(s) herein.

Example Z05 includes an apparatus comprising circuitry operable to run the instructions of example Z01.

Example Z06 includes an integrated circuit comprising one or more of the processor circuitry of example Z01 and the one or more computer readable media of example Z01.

Example Z07 includes a computing system comprising the one or more computer readable media and the processor circuitry of example Z01.

Example Z08 includes an apparatus comprising means for executing the instructions of example Z01 and/or some other example(s) herein.

Example Z09 includes a signal generated as a result of executing the instructions of example Z01 and/or some other example(s) herein.

Example Z10 includes a data unit generated as a result of executing the instructions of example Z01 and/or some other example(s) herein.

Z11 includes the data unit of example 10, the data unit is a datagram, network packet, data frame, data segment, a Protocol Data Unit (PDU), a Service Data Unit (SDU), a message, or a database object.

Example Z12 includes a signal encoded with the data unit of example Z10 or Z11 and/or some other example(s) herein.

Example Z13 includes an electromagnetic signal carrying the instructions of example Z01 and/or some other example(s) herein.

Example Z14 includes an apparatus comprising means for performing the method of any one of examples A01-A22 and/or some other example(s) herein.

4. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "receipt" at least in some embodiments refers to any action (or set of actions) involved with receiving or obtaining an object, data, data unit, etc., and/or the fact of the object, data, data unit, etc. being received. The term "receipt" at least in some embodiments refers to an object, data, data unit, etc., being pushed to a device, system, element, etc. (e.g., often referred to as a push model), pulled by a device, system, element, etc. (e.g., often referred to as a pull model), and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some embodiments refers to the observation and/or quantification of attributes of an object, event, or phenomenon.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The terms "ego" (as in, e.g., "ego device") and "subject" (as in, e.g., "data subject") at least in some embodiments refers to an entity, element, device, system, etc., that is under consideration or being considered. The terms "neighbor" and "proximate" (as in, e.g., "proximate device") at least in some embodiments refers to an entity, element, device, system, etc., other than an ego device or subject device.

The terms "master" and "slave" at least in some embodiments refers to a model of asymmetric communication or control where one device, process, element, or entity (the "master") controls one or more other device, process, element, or entity (the "slaves"). The terms "master" and "slave" are used in this disclosure only for their technical meaning. The term "master" or "grandmaster" may be substituted with any of the following terms "main", "source", "primary", "initiator", "requestor", "transmitter", "host", "maestro", "controller", "provider", "producer", "client", "source", "mix", "parent", "chief", "manager", "reference" (e.g., as in "reference clock" or the like), and/or the like. Additionally, the term "slave" may be substituted with any of the following terms "receiver", "secondary", "subordinate", "replica", target", "responder", "device", "performer", "agent", "standby", "consumer", "peripheral", "follower", "server", "child", "helper", "worker", "node", and/or the like.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity. Additionally or alternatively, the term "device" at least in some embodiments refers to an entity implementing some functionality, e.g., a clock, a time-aware system, a port.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "terminal" at least in some embodiments refers to point at which a conductor from a component, device, or network comes to an end. Additionally or alternatively, the term "terminal" at least in some embodiments refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmut-mounted display devices, augmented reality (AR) devices, virtual reality (VR) devices, mixed reality (MR) devices, and/or other like systems or devices.

The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "base station" at least in some embodiments refers to a network element in a radio access network (RAN), such as a fourth-generation (4G) or fifth-generation (5G) mobile communications network which is responsible for the transmission and reception of radio signals in one or more cells to or from a UE. A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved Node B (eNB) or a next generation Node B (gNB). In some examples, the base station may operate or include compute hardware to operate as a compute node. However, in many of the scenarios discussed herein, a RAN node may be substituted with an access point (e.g., wireless network access point) or other network access hardware.

The term "Residential Gateway" or "RG" at least in some embodiments refers to a device providing, for example, voice, data, broadcast video, video on demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an Access Network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-RG" at least in some embodiments refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" at least in some embodiments refers to compute, storage, and/or network resources provided by physical hardware element(s). A "virtualized resource" at least in some embodiments refers to compute, storage, and/or network resources provided by virtualization infrastructure to an application, device, system, etc. The term "network resource" or "communication resource" at least in some embodiments refers to resources that are accessible by computer devices/systems via a communications network. The term "system resources" at least in some embodiments refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge.

The term "virtualized NF" (or VNF) indicates a software-based network function (NF) operating on multi-function, multi-purpose compute resources (e.g., x86, ARM processing architecture) which are used by NFV in place of dedicated physical equipment. Additionally or alternatively, several VNFs can operate on a data center, on one or more cloud compute nodes, and/or on an edge data center at the infrastructure Edge.

The term "edge compute node" or "edge compute device" at least in some embodiments refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Data Network" or "DN" at least in some embodiments refers to a network hosting data-centric services such as, for example, operator services, the internet, third-party services, or enterprise networks. Additionally or alternatively, a DN at least in some embodiments refers to service networks that belong to an operator or third party, which are offered as a service to a client or user equipment (UE). DNs are sometimes referred to as "Packet Data Networks" or "PDNs". The term "Local Area Data Network" or "LADN" at least in some embodiments refers to a DN that is accessible by the UE only in specific locations, that provides connectivity to a specific DNN, and whose availability is provided to the UE.

The term "Internet of Things" or "IoT" at least in some embodiments refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. The term "Edge IoT devices" at least in some embodiments refers to any kind of IoT devices deployed at a network's edge.

The term "radio technology" at least in some embodiments refers to technology for wireless transmission and/or reception of electromagnetic radiation for information transfer. The term "radio access technology" or "RAT" at least in some embodiments refers to the technology used for the underlying physical connection to a radio based communication network.

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "RAT type" may identify a transmission technology and/or communication protocol used in an access network, for example, new radio (NR), Long Term Evolution (LTE), narrowband IoT (NB-IOT), untrusted non-3GPP, trusted non-3GPP, trusted IEEE 802.11, non-3GPP access, MuLTEfire, WiMAX, wireline, wireline-cable, wireline broadband forum (wireline-BBF), etc. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), etc.); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), etc.), Generic Access Network (GAN)/Unlicensed Mobile Access (UMA), High Speed Packet Access (HSPA) (and variants thereof such as HSPA Plus (HSPA+), etc.), Long Term Evolution (LTE) (and variants thereof such as LTE-Advanced (LTE-A), Evolved UTRA (E-UTRA), LTE Extra, LTE-A Pro, LTE LAA, MuLTEfire, etc.), Fifth Generation (5G) or New Radio (NR), etc.; ETSI technologies such as High Performance Radio Metropolitan Area Network (HiperMAN) and the like; IEEE technologies such as WiFi (IEEE 802.11 and variants thereof), Worldwide Interoperability for Microwave Access (WiMAX) (IEEE 802.16 and variants thereof), Mobile Broadband Wireless Access (MBWA)/iBurst (IEEE 802.20 and variants thereof), etc.; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (IEEE 802.11ad, IEEE 802.11ay, etc.), etc.); short-range and/or wireless personal area network (WPAN) technologies/standards such as Bluetooth (and variants thereof such as Bluetooth 5.3, Bluetooth Low Energy (BLE), etc.), IEEE 802.15 technologies/standards (e.g., IEEE 802.15.4 (low rate WPAN), ZigBee, Thread, IPv6 over Low power WPAN (6LoWPAN), WirelessHART, MiWi, ISA100.11a, IEEE 802.15.6 (Body AreaNetworks (BANs), etc.), WiFi-direct, ANT/ANT+, Z-Wave, 3GPP Proximity Services (ProSe), Universal Plug and Play (UPnP), low power Wide Area Networks (LP-WANs), Long Range Wide Area Network (LoRA or LoRaWAN™), and the like; optical and/or visible light communication (VLC) technologies/standards such as IEEE 802.15.7 and the like; V2X communication including 3GPP cellular V2X (C-V2X), Wireless Access in Vehicular Environments (WAVE) (IEEE 802.11p), IEEE 802.11bd, Dedicated Short Range Communications (DSRC), Intelligent-Transport-Systems (ITS) (including the European ITS-G5, ITS-G5B, ITS-G5C, etc.); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), etc.); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, etc.); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "V2X" at least in some embodiments refers to vehicle to vehicle (V2V), vehicle to infrastructure (V2I), infrastructure to vehicle (I2V), vehicle to network (V2N), and/or network to vehicle (N2V) communications and associated radio access technologies.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information. Additionally or alternatively, the term "channel" at least in some embodiments refers to a frequency spectrum occupied by a signal, which may be specified by center frequency and bandwidth parameters.

The term "reliability" at least in some embodiments refers to the ability of a computer-related component (e.g., software, hardware, or network element/entity) to consistently perform a desired function and/or operate according to a specification. Reliability in the context of network communications (e.g., "network reliability") at least in some embodiments refers to the ability of a network to carry out communication. The term "network reliability" at least in some embodiments refers to a probability or measure of delivering a specified amount of data from a source to a destination (or sink).

The term "flow" at least in some embodiments refers to a sequence of data and/or data units (e.g., datagrams, packets, or the like) from a source entity/element to a destination entity/element. Additionally or alternatively, the terms "flow" or "traffic flow" at least in some embodiments refer to an artificial and/or logical equivalent to a call, connection, or link. Additionally or alternatively, the term "flow" at least in some embodiments refers to a stream of packets used to transport data of a certain priority from the source to the sink. Additionally or alternatively, the terms "flow" or "traffic flow" at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some embodiments refer to a set of data and/or data units (e.g., datagrams, packets, or the like) passing an observation point in a network during a certain time interval. Additionally or alternatively, the term "flow" at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms at least in some embodiments refers to different concepts.

The term "stream" at least in some embodiments refers to a sequence of data elements made available over time. At least in some embodiments, functions that operate on a stream, which may produce another stream, are referred to as "filters," and can be connected in pipelines, analogously to function composition. Filters may operate on one item of a stream at a time, or may base an item of output on multiple items of input, such as a moving average. Additionally or alternatively, the term "stream" or "streaming" refers to a manner of processing in which an object is not represented by a complete logical data structure of nodes occupying memory proportional to a size of that object, but are processed "on the fly" as a sequence of events The term "distributed computing" at least in some embodiments refers to computation resources that are geographically distributed within the vicinity of one or more localized networks' terminations.

The term "distributed computations" at least in some embodiments refers to a model in which components located on networked computers communicate and coordinate their actions by passing messages interacting with each other in order to achieve a common goal.

The term "service" at least in some embodiments refers to the provision of a discrete function within a system and/or environment. Additionally or alternatively, the term "service" at least in some embodiments refers to a functionality or a set of functionalities that can be reused.

The term "microservice" at least in some embodiments refers to one or more processes that communicate over a network to fulfil a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. Additionally or alternatively, the term "microservice architecture" at least in some embodiments refers to a variant of the service-oriented architecture (SOA) structural style wherein applications are arranged as a collection of loosely-coupled services (e.g., fine-grained services) and may use lightweight protocols.

The term "session" at least in some embodiments refers to a temporary and interactive information interchange between two or more communicating devices, two or more application instances, between a computer and user, and/or between any two or more entities or elements. Additionally or alternatively, the term "session" at least in some embodiments refers to a connectivity service or other service that provides or enables the exchange of data between two entities or elements. The term "network session" at least in some embodiments refers to a session between two or more communicating devices over a network. The term "web session" at least in some embodiments refers to session between two or more communicating devices over the Internet or some other network. The term "session identifier," "session ID," or "session token" at least in some embodiments refers to a piece of data that is used in network communications to identify a session and/or a series of message exchanges.

The term "quality" at least in some embodiments refers to a property, character, attribute, or feature of something as being affirmative or negative, and/or a degree of excellence of something. Additionally or alternatively, the term "quality" at least in some embodiments, in the context of data processing, refers to a state of qualitative and/or quantitative aspects of data, processes, and/or some other aspects of data processing systems.

The term "Quality of Service" or "QoS' at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein.

The term "queue" at least in some embodiments refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some embodiments refers to one or more operations of adding an element to the rear of a queue. The term "dequeue" at least in some embodiments refers to one or more operations of removing an element from the front of a queue.

The term "network coding" at least in some embodiments refers to a technique in which transmitted data is encoded and decoded to improve network performance.

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, International Mobile Equipment Identity (IMEI), IMEI Type Allocation Code (IMEA/TAC), International Mobile Subscriber Identity (IMSI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof.

The term "application identifier", "application ID", or "app ID" at least in some embodiments refers to an identifier that can be mapped to a specific application or application instance; in the context of 3GPP 5G/NR systems, an "application identifier" at least in some embodiments refers to an identifier that can be mapped to a specific application traffic detection rule.

The term "endpoint address" at least in some embodiments refers to an address used to determine the host/authority part of a target URI, where the target URI is used to access an NF service (e.g., to invoke service operations) of an NF service producer or for notifications to an NF service consumer.

The term "closed access group" or "CAG" at least in some embodiments refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term "CAG-ID" at least in some embodiments refers to an identifier of a CAG.

The term "port" in the context of computer networks, at least in some embodiments refers to a communication endpoint, a virtual data connection between two or more entities, and/or a virtual point where network connections start and end. Additionally or alternatively, a "port" at least in some embodiments is associated with a specific process or service.

The term "physical rate" or "PHY rate" at least in some embodiments refers to a speed at which one or more bits are actually sent over a transmission medium. Additionally or alternatively, the term "physical rate" or "PHY rate" at least in some embodiments refers to a speed at which data can move across a wireless link between a transmitter and a receiver. The term "data rate" at least in some embodiments refers to throughput and/or data transmitted in units of time usually in bits per second (bps).

The term "delay" at least in some embodiments refers to a time interval between two events. Additionally or alternatively, the term "delay" at least in some embodiments refers to a time interval between the propagation of a signal and its reception. The term "packet delay" at least in some embodiments refers to the time it takes to transfer any packet from one point to another. Additionally or alternatively, the term "packet delay" or "per packet delay" at least in some embodiments refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized. The term "processing delay" at least in some embodiments refers to an amount of time taken to process a packet in a network node. The term "transmission delay" at least in some embodiments refers to an amount of time needed (or necessary) to push a packet (or all bits of a packet) into a transmission medium. The term "propagation delay" at least in some embodiments refers to amount of time it takes a signal's header to travel from a sender to a receiver. The term "network delay" at least in some embodiments refers to the delay of an a data unit within a network (e.g., an IP packet within an IP network). The term "queuing delay" at least in some embodiments refers to an amount of time a job waits in a queue until that job can be executed. Additionally or alternatively, the term "queuing delay" at least in some embodiments refers to an amount of time a packet waits in a queue until it can be processed and/or transmitted. The term "delay bound" at least in some embodiments refers to a predetermined or configured amount of acceptable delay. The term "per-packet delay bound" at least in some embodiments refers to a predetermined or configured amount of acceptable packet delay where packets that are not processed and/or transmitted within the delay bound are considered to be delivery failures and are discarded or dropped. The term "packet drop rate" at least in some embodiments refers to a share of packets that were not sent to the target due to high traffic load or traffic management and should be seen as a part of the packet loss rate. The term "packet loss rate" at least in some embodiments refers to a share of packets that could not be received by the target, including packets dropped, packets lost in transmission and packets received in wrong format. The term "latency" at least in some embodiments refers to the amount of time it takes to transfer a first/initial data unit in a data burst from one point to another. The term "throughput" or "network throughput" at least in some embodiments refers to a rate of production or the rate at which something is processed. Additionally or alternatively, the term "throughput" or "network throughput" at least in some embodiments refers to a rate of successful message (date) delivery over a communication channel. The term "goodput" at least in some embodiments refers to a number of useful information bits delivered by the network to a certain destination per unit of time.

The term "application" at least in some embodiments refers to a computer program designed to carry out a specific task other than one relating to the operation of the computer itself. Additionally or alternatively, term "application" at least in some embodiments refers to a complete and deployable package, environment to achieve a certain function in an operational environment.

The term "algorithm" at least in some embodiments refers to an unambiguous specification of how to solve a problem or a class of problems by performing calculations, input/output operations, data processing, automated reasoning tasks, and/or the like.

The terms "instantiate," "instantiation," and the like at least in some embodiments refers to the creation of an instance. An "instance" also at least in some embodiments refers to a concrete occurrence of an object, which may occur, for example, during execution of program code.

The term "data processing" or "processing" at least in some embodiments refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "probability" at least in some embodiments refers to a numerical description of how likely an event is to occur and/or how likely it is that a proposition is true. The term "probability distribution" at least in some embodiments refers to a mathematical function that gives the probabilities of occurrence of different possible outcomes for an experiment or event. The term "probability distribution" at least in some embodiments refers to a function that gives the probabilities of occurrence of different possible outcomes for an experiment or event. Additionally or alternatively, the term "probability distribution" at least in some embodiments refers to a statistical function that describes all possible values and likelihoods that a random variable can take within a given range (e.g., a bound between minimum and maximum possible values). A probability distribution may have one or more factors or attributes such as, for example, a mean or average, mode, support, tail, head, median, variance, standard deviation, quantile, symmetry, skewness, kurtosis, etc. A probability distribution may be a description of a random phenomenon in terms of a sample space and the probabilities of events (subsets of the sample space). Example probability distributions include discrete distributions (e.g., Bernoulli distribution, discrete uniform, binomial, Dirac measure, Gauss-Kuzmin distribution, geometric, hypergeometric, negative binomial, negative hypergeometric, Poisson, Poisson binomial, Rademacher distribution, Yule-Simon distribution, zeta distribution, Zipf distribution, etc.), continuous distributions (e.g., Bates distribution, beta, continuous uniform, normal distribution, Gaussian distribution, bell curve, joint normal, gamma, chi-squared, noncentral chi-squared, exponential, Cauchy, lognormal, logitnormal, F distribution, t distribution, Dirac delta function, Pareto distribution, Lomax distribution, Wishart distribution, Weibull distribution, Gumbel distribution, Irwin-Hall distribution, Gompertz distribution, inverse Gaussian distribution (or Wald distribution), Chernoff's distribution, Laplace distribution, Pólya-Gamma distribution, etc.), and/or joint distributions (e.g., Dirichlet distribution, Ewens's sampling formula, multinomial distribution, multivariate normal distribution, multivariate t-distribution, Wishart distribution, matrix normal distribution, matrix t distribution, etc.).

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "user" in the context of reconfigurable radio equipment/systems, at least in some embodiments refers to an abstract representation of any entity issuing command requests (e.g., using the services) to the multiradio computer. Three types of users are distinguished based on the type of services used: administrator for multiradio management plane, mobility policy manager for control plane, and networking stack for user plane.

The term "datagram" at least in some embodiments at least in some embodiments refers to a basic transfer unit associated with a packet-switched network; a datagram may be structured to have header and payload sections. The term "datagram" at least in some embodiments may be referred to as a "data unit", a "protocol data unit" or "PDU", a "service data unit" or "SDU", a frame, a packet, and/or the like.

The term "information element" at least in some embodiments refers to a structural element containing one or more fields. The term "field" at least in some embodiments refers to individual contents of an information element, or a data element that contains content. The term "data frame" or "DF" at least in some embodiments refers to a data type that contains more than one data element in a predefined order.

The term "data element" or "DE" at least in some embodiments refers to a data type that contains one single data. Additionally or alternatively, the term "data element" at least in some embodiments refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some embodiments refers to a data type that contains one single data. Data elements may store data, which may be referred to as the data element's content (or "content items"). Content items may include text content, attributes, properties, and/or other elements referred to as "child elements." Additionally or alternatively, data elements may include zero or more properties and/or zero or more attributes, each of which may be defined as database objects (e.g., fields, records, etc.), object instances, and/or other data elements. An "attribute" at least in some embodiments refers to a markup construct including a name-value pair that exists within a start tag or empty element tag. Attributes contain data related to its element and/or control the element's behavior.

The term "reference" at least in some embodiments refers to data useable to locate other data and may be implemented a variety of ways (e.g., a pointer, an index, a handle, a key, an identifier, a hyperlink, etc.).

The term "logical data structure," "logical structure," or the like may be any organization or collection of data values and/or data elements, the relationships among the data values/elements, and/or the functions or operations that can be applied to the data values/elements provided. A "logical data structure" may be an aggregate, tree (e.g., abstract syntax tree or the like), graph (e.g., a directed acyclic graph (DAG)), finite automaton, finite state machine (FSM), or other like data structure including at least one parentless node (or root node) together with zero or more descendant nodes, plus all the attributes and namespaces of the parentless and descendant nodes.

The term "cryptographic hash function", "hash function", or "hash" at least in some embodiments refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert.

The term "basic service set" or "BSS" at least in some embodiments refers to a set of STAs that have successfully synchronized using a join service primitives and one STA that has used the START primitive. Alternatively, a set of STAs that have used a start primitive specifying matching mesh profiles where the match of the mesh profiles has been verified via the scanning procedure. Membership in a BSS does not imply that wireless communication with all other members of the BSS is possible.

The term "clear channel assessment (CCA) function" at least in some embodiments refers to a logical function in the physical layer (PHY) that determines the current state of use of a wireless medium.

The term "coordination function" at least in some embodiments refers to a logical function that determines when a STA is permitted to transmit PDUs via a WM.

The term "distributed coordination function" or "DCF" at least in some embodiments refers to a class of coordination function(s) where the same coordination function logic is active in every STA in a basic service set (BSS) whenever the network is in operation.

The term "distribution service" at least in some embodiments refers to a service that, by using association information, delivers medium access control (MAC) service tuples within a distribution system (DS).

The term "distribution system" or DS" at least in some embodiments refers to a system used to interconnect a set of basic service sets (BSSs) and integrated local area networks (LANs) to create an extended service set (ESS).

The term "accuracy" at least in some embodiments refers to the mean of the time or frequency error between a clock under test and a reference clock over an ensemble of measurements (see e.g., [IEEE1588]).

The term "bridge" at least in some embodiments refers to Either a MAC Bridge or a VLAN-aware Bridge, as specified in Clause 5 of IEEE Std 802.1Q-2018.

The term "clock" at least in some embodiments refers to a physical device that is capable of providing a measurement of the passage of time since a defined epoch.

The term "direct communication" at least in some embodiments refers to a communication of IEEE 802.1AS information between two PTP instances with no intervening PTP instance.

The term "end station" at least in some embodiments refers to a device attached to a local area network (LAN) or metropolitan area network (MAN) that acts as a source of, and/or destination for, traffic carried on the LAN or MAN.

The term "event message" at least in some embodiments refers to a message that is timestamped on egress from a PTP instance and ingress to a PTP instance.

The term "fractional frequency offset" at least in some embodiments refers to a fractional offset, y, between a measured clock and a reference clock as defined by: $y=f_m-f_r/f_r$, where $f_m$ is $f_r$ the frequency of the measured clock and $f_r$ is the frequency of the reference clock, and wherein the measurement units of $f_m$ and $f_r$ are the same.

The term "frequency offset" at least in some embodiments refers to the offset between a measured frequency and a reference frequency as defined by fm−fr, where fm is the frequency of the measured clock and fr is the frequency of the reference clock. The measurement units of fm and fr are the same.

The term "general message" at least in some embodiments refers to a message that is not timestamped.

The term "gPTP communication path" at least in some embodiments refers to a segment of a generalized precision time protocol (gPTP) domain that enables direct communication between two PTP instances.

The term "grandmaster-capable PTP instance", "GM-capable PTP instance", or GM-capable instance" at least in some embodiments refers to a PTP instance that is capable of being a grandmaster PTP instance.

The term "grandmaster clock" or "GM clock" at least in some embodiments refers to In the context of a single PTP domain, the synchronized time of a PTP instance that is the source of time to which all other PTP instances in the domain are synchronized.

The term "grandmaster PTP instance", "GM PTP instance", or "GM instance" at least in some embodiments refers to a PTP instance containing the Grandmaster Clock.

The term "local area network" or "LAN" at least in some embodiments refers to a network of devices, whether indoors or outdoors, covering a limited geographic area, e.g., a building or campus The term "local clock" at least in some embodiments refers to a free-running clock, embedded in a respective entity (e.g., PTP instance, CSN node, etc.), that provides a common time to that entity relative to an arbitrary epoch.

The term "message timestamp point" at least in some embodiments refers to a point within an event message serving as a reference point for when a timestamp is taken The term "message type" at least in some embodiments refers the name of a respective message, e.g., Sync, Announce, Timing Measurement Frame.

The term "precision" at least in some embodiments refers to a measure of the deviation from the mean of the time or frequency error between the clock under test and a reference clock (see IEEE Std 1588-2019).

The term "primary reference" at least in some embodiments refers to source of time and/or frequency that is traceable to international standards.

The term "PTP end instance" at least in some embodiments refers to a PTP instance that has exactly one PTP port.

The term "PTP instance" at least in some embodiments refers to an instance of the IEEE 802.1AS protocol, operating in a single time-aware system within exactly one domain. A PTP instance implements the portions of IEEE Std 802.1AS indicated as applicable to either a PTP relay instance or a PTP End Instance. Additionally or alternatively, the term "PTP instance" refers to an IEEE 1588 PTP instance that conforms to the requirements of IEEE Std 802.1AS.

The term "PTP link" at least in some embodiments refers to within a domain, a network segment between two PTP ports using the P2P delay mechanism of IEEE Std 802.1AS [IEEE802.1AS]. The P2P delay mechanism is designed to measure the propagation time over such a link. Additionally or alternatively, a "PTP link" between PTP ports of PTP instances is also a gPTP Communication Path.

The term "PTP relay instance" at least in some embodiments refers to a PTP instance that is capable of communicating synchronized time received on one PTP port to other PTP ports, using the IEEE 802.1AS protocol. In some implementations, a PTP relay instance could, for example, be contained in a bridge, a router, or a multi-port end station.

The term "recognized timing standard" at least in some embodiments refers to recognized standard time source that is a source external to IEEE 1588 precision time protocol (PTP) and provides time that is traceable to the international standards laboratories maintaining clocks that form the basis for the International Atomic Time (TAI) and Coordinated Universal Time (UTC) timescales. Examples of these sources are National Institute of Standards and Technology (NIST) timeservers and global navigation satellite systems (GNSSs).

The term "reference plane" at least in some embodiments refers to boundary between a PTP port of a PTP instance and the network physical medium. Timestamp events occur as frames cross this interface.

The term "residence time" at least in some embodiments refers to a duration of the time interval between the receipt of a time-synchronization event message by a PTP instance and the sending of the next subsequent time-synchronization event message on another PTP port of that PTP instance. Residence time can be different for different PTP ports. Additionally or alternatively, the term "residence time" at least in some embodiments applies only to the case where syncLocked is TRUE. If a PTP port of a PTP instance sends a time-synchronization event message without having received a timesynchronization event message, e.g., if syncLocked is FALSE or if sync receipt timeout occurs, the duration of the interval between the most recently received time-synchronization event message and the sent timesynchronization event message is mathematically equivalent to residence time; however, this interval is not normally called a residence time.

The term "stability" in the context of a clock or clock signal, at least in some embodiments refers to a measure of the variations over time of the frequency error (of the clock or clock signal). The frequency error typically varies with time due to aging and various environmental effects, e.g., temperature.

The term "synchronized time" at least in some embodiments refers to the time of an event relative to the Grandmaster Clock. If there is a change in the Grandmaster PTP instance or its time base, the synchronized time can experience a phase and/or frequency step.

The term "synchronized clocks" at least in some embodiments refers to, absent relativistic effects, two clocks are synchronized to a specified uncertainty if they have the same epoch and their measurements of the time of a single event at an arbitrary time differ by no more than that uncertainty.

The term "syntonized clocks" at least in some embodiments refers to, absent relativistic effects, two clocks are syntonized to a specified uncertainty if the duration of a second is the same on both, which means the time as measured by each advances at the same rate within the specified uncertainty. The two clocks might or might not share the same epoch.

The term "time-aware system" at least in some embodiments refers to a device that contains one or more PTP instances and/or PTP services (e.g., Common Mean Link Delay Service). In some implementations, a time-aware system can contain more than one PTP instance in the same domain and/or different domains.

The term "timestamp measurement plane" at least in some embodiments refers to a plane at which timestamps are captured. If the timestamp measurement plane is different from the reference plane, the timestamp is corrected for ingressLatency and/or egressLatency.

The term "reconfiguration" at least in some embodiments refers to any intentional modification of the system structure or of the device-level content, including updates of any type.

The term "disturbance" at least in some embodiments refers to any malfunction or stall of a process/machine, which is followed by production loss or by an unacceptable degradation of production quality.

The term "transmission selection algorithms" at least in some embodiments refers to a set of algorithms for traffic selection, which include, for example, Strict Priority, the Credit-based shaper and Enhanced Transmission Selection.

The term "time-sensitive stream" at least in some embodiments refers to a stream of traffic, transmitted from a single source station, destined for one or more destination stations, where the traffic is sensitive to timely delivery, and in particular, requires transmission latency to be bounded.

The term "frequency stability" at least in some embodiments refers to the variation of output frequency of a crystal oscillator due to external conditions such as temperature variation, voltage variation, output load variation, and frequency aging. Frequency stability may be expressed in parts per million (ppm) or parts per billion (ppb), which can be represented in the form of frequency (e.g., Hertz (Hz)).

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. A first compute node in a time-aware network, comprising:
    clock circuitry to implement a first local clock entity of the first compute node;
    interface circuitry to communicate a set of messages with a second compute node; and
    processor circuitry connected to memory circuitry, the clock circuitry, and the interface circuitry, the processor circuitry to:
    determine a clock drift rate of the first local clock entity based on the set of messages, wherein the clock drift rate is a frequency at which the first local clock entity diverges from another clock at another compute node, the clock drift rate further determined based on a first measured neighbor rate ratio (mNRR), a second mNRR, and an amount of time since the first mNRR was measured;
    determine a clock drift correction factor based on the determined clock drift rate; and
    compensate, during a time synchronization (sync) procedure, for the clock drift rate of the first local clock entity based on the clock drift correction factor.

2. The first compute node of claim 1, wherein the amount of time since the first mNRR was measured is a path delay interval.

3. The first compute node of claim 1, wherein the other compute node is the second compute node, and the other clock is the second local clock entity of the second compute node.

4. The first compute node of claim 1, wherein the processor circuitry is further to:
    determine a receipt interval based on a value of the first local clock entity when a first message of the set of messages is received at the first compute node and a value of the first local clock entity when a second message of the set of messages is received at the first compute node;
    determine a transmit interval based on a value of a second local clock when the first message is transmitted and a value of the second local clock when the second message is transmitted; and
    determine the first mNRR based on the receipt interval and the transmit interval.

5. The first compute node of claim 4, wherein the receipt interval is a first receipt interval, the transmit interval is a first transmit interval, and wherein the processor circuitry is further to:
    determine a second receipt interval based on the value of the first local clock entity when the second message is received at the first compute node and a value of the first local clock entity when a third message of the set of messages is received at the first compute node;
determine a second transmit interval based on the value of the second local clock entity when the second message is transmitted and a value of the second local clock entity when the third message is transmitted; and
determine the second mNRR based on the second receipt interval and the second transmit interval.

6. The first compute node of claim 5, wherein the processor circuitry is further to:
determine an effective measurement point (EMP), the EMP being a time within the first transmit interval or the first receipt interval; and
determine an estimated NRR (eNRR) based on the clock drift rate, the amount of time since the first mNRR was measured, the EMP, and the first mNRR.

7. The first compute node of claim 6, wherein the processor circuitry is further to:
determine a rate ratio (RR) using the eNRR, wherein the RR is a measured ratio of the frequency of the first local clock entity to a frequency of a grandmaster (GM) clock.

8. The first compute node of claim 7, wherein the processor circuitry is further to:
generate another message to be sent to a third compute node in the time-aware network; and
insert a residence time into a correction field of the other message, wherein the residence time is calculated based on the RR.

9. The first compute node of claim 8, wherein the interface circuitry is further to: send the other message to the third compute node.

10. The first compute node of claim 1, wherein the set of messages include messages for measuring link delay between the first and second compute nodes, or the set of messages include messages for synchronizing the first local clock entity during the time sync procedure.

11. The first compute node of claim 1, wherein each of the set of messages include:
path delay response messages generated during a two-step peer-to-peer (P2P) path delay algorithm employed by a full-duplex Ethernet local area network (LAN);
timing measurement (TM) frames and corresponding acknowledgement (Ack) frames generated during a TM procedure or a fine TM (FTM) procedure defined by an IEEE 802.11 standard; or
gate messages and register request messages generated during an Ethernet Passive Optical Network (EPON) procedure defined by an IEEE 802.3 standard.

12. The first compute node of claim 1, wherein the first compute node and the second compute node are individual precision time protocol (PTP) instances.

13. The first compute node of claim 12, wherein the first compute node is a PTP relay instance and the second compute node is another PTP relay instance or a GM PTP instance.

14. The first compute node of claim 1, wherein the clock circuitry comprises one or more of a quartz crystal oscillators (XO), a rubidium XO (RbXO), a cesium atomic clock, a calibrated dual XO (CDXO), a microcomputer-compensated XO (MCXO), an oven controlled XO (OCXO), a double OCXO (DOCXO), a temperature-compensated crystal oscillator XO (TCXO), a tactical miniature XO (TMXO), a temperature-sensing XO (TSXO), and a voltage controlled XO (VCXO).

15. One or more non-transitory computer readable media (NTCRM) comprising instructions for synchronizing a first local clock of a first compute node in a time-aware network, wherein execution of the instructions by one or more processors of a first compute node is to cause the first compute node to:
determine a clock drift rate of the first local clock based on a set of messages communicated between the first compute node and a second compute node, wherein the clock drift rate is a frequency at which the first local clock diverges from another clock at another compute node, the clock drift rate further determined based on a first measured neighbor rate ratio (mNRR), a second mNRR, and an amount of time since the first mNRR was measured;
determine a clock drift correction factor based on the determined clock drift rate; and
compensate, during a time synchronization (sync) procedure, for the clock drift rate of the first local clock based on the clock drift correction factor.

16. The one or more NTCRM of claim 15, wherein, to determine the clock drift rate, execution of the instructions is to further cause the first compute node to:
determine the clock drift rate as a quotient of a combination of the first mNRR and the second mNRR to the amount of time since the first mNRR was measured.

17. The one or more NTCRM of claim 15, wherein, to determine the clock drift correction factor, execution of the instructions is to further cause the first compute node to:
determine the clock drift correction factor as a product of the clock drift rate and the amount of time since the first mNRR was measured.

18. The one or more NTCRM of claim 15, wherein, to determine the clock drift rate, execution of the instructions is to cause the first compute node to:
determine a receipt interval based on a value of the first local clock when a first message of the set of messages is received at the first compute node and a value of the first local clock when a second message of the set of messages is received at the first compute node;
determine a transmit interval based on a value of a second local clock when the first message is transmitted and a value of the second local clock when the second message is transmitted; and
determine the first mNRR based on the receipt interval and the transmit interval.

19. The one or more NTCRM of claim 18, wherein the receipt interval is a first receipt interval, the transmit interval is a first transmit interval, and wherein, to determine the clock drift rate, execution of the instructions is to cause the first compute node to:
determine a second receipt interval based on the value of the first local clock when the second message is received at the first compute node and a value of the first local clock when a third message of the set of messages is received at the first compute node;
determine a second transmit interval based on the value of the second local clock when the second message is transmitted and a value of the second local clock when the third message is transmitted; and
determine the second mNRR based on the second receipt interval and the second transmit interval.

20. The one or more NTCRM of claim 18, wherein, to compensate for the clock drift rate, execution of the instructions is to cause the first compute node to:
determine an effective measurement point (EMP), the EMP being a time within the first transmit interval or the first receipt interval; and determine an estimated NRR (eNRR) based on the clock drift rate, the amount of time since the first mNRR was measured, the EMP, and the first mNRR.

21. The one or more NTCRM of claim 20, wherein execution of the instructions is to cause the first compute node to:
determine a rate ratio (RR) using the eNRR, wherein the RR is a measured ratio of the frequency of the first local clock to a frequency of a grandmaster (GM) clock.

22. The one or more NTCRM of claim 21, wherein execution of the instructions is to cause the first compute node to:
determine the RR as a product of an RR of the second compute node, the eNRR, and the clock drift correction factor.

23. The one or more NTCRM of claim 15, wherein execution of the instructions is to cause the first compute node to:
generate another message to be send to a third compute node in the time-aware network; and
insert a residence time into a correction field of the other message, wherein the residence time is calculated based on a rate ratio (RR).

24. A network appliance, comprising:
a network interface to communicate a set of messages with a set of compute nodes, wherein the set of messages include messages for measuring link delay or the set of messages include messages for synchronizing a first local clock entity during a time sync procedure;
a memory to store instructions; and
at least one processor connected with the memory and the network interface, wherein the instructions, when operated by the at least one processor, are to cause the at least one processor to:
determine a clock drift rate of a local clock entity of the network appliance based on the set of messages, wherein the clock drift rate is a frequency at which the local clock entity diverges from another clock entity of a compute node of the set of compute nodes, the clock drift rate further determined based on a first measured neighbor rate ratio (mNRR), a second mNRR, and an amount of time since the first mNRR was measured;
determine a clock drift correction factor based on the determined clock drift rate; and
compensate, during a time synchronization (sync) procedure, for the clock drift rate of the local clock entity based on the clock drift correction factor.

25. The network appliance of claim 24, wherein the instructions, when operated by the at least one processor, are to cause the at least one processor to:

determine a first receipt interval based on a value of the local clock entity when a first message of the set of messages is received at the network appliance and a value of the local clock entity when a second message of the set of messages is received at the network appliance;
determine a first transmit interval based on a value of the other clock entity when the first message is transmitted and a value of the other clock entity when the second message is transmitted;
determine the first mNRR based on the receipt interval and the first transmit interval;
determine a second receipt interval based on the value of the local clock entity when the second message is received at the network appliance and a value of the local clock entity when a third message of the set of messages is received at the network appliance;
determine a second transmit interval based on the value of the other clock other clock entity entity when the second message is transmitted and a value of the other clock entity when the third message is transmitted; and
determine the second mNRR based on the second receipt interval and the second transmit interval.

26. The network appliance of claim 25, wherein the at least one processor is further to:
determine an effective measurement point (EMP), the EMP being a time within the first transmit interval or the first receipt interval; and
determine an estimated NRR (eNRR) based on the clock drift rate, the amount of time since the first mNRR was measured, the EMP, and the first mNRR; and
determine a rate ratio (RR) using the eNRR, wherein the RR is a measured ratio of the frequency of the local clock entity to a frequency of a primary clock entity.

27. The network appliance of claim 24, further comprising:
clock circuitry to operate as the local clock entity, wherein the clock circuitry comprises one or more of a quartz crystal oscillators (XO), a rubidium XO (RbXO), a cesium atomic clock, a calibrated dual XO (CDXO), a microcomputer-compensated XO (MCXO), an oven controlled XO (OCXO), a double OCXO (DOCXO), a temperature-compensated crystal oscillator XO (TCXO), a tactical miniature XO (TMXO), a temperature-sensing XO (TSXO), and a voltage controlled XO (VCXO).

* * * * *